United States Patent
Buckley et al.

(10) Patent No.: US 11,620,928 B2
(45) Date of Patent: Apr. 4, 2023

(54) DISPLAY DEGRADATION COMPENSATION

(71) Applicant: META PLATFORMS TECHNOLOGIES, LLC, Menlo Park, CA (US)

(72) Inventors: Edward Buckley, Redmond, WA (US); Michael Yee, Kirkland, WA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 0 days.

(21) Appl. No.: 17/532,692

(22) Filed: Nov. 22, 2021

(65) Prior Publication Data
US 2022/0165193 A1 May 26, 2022

Related U.S. Application Data

(63) Continuation of application No. 16/998,860, filed on Aug. 20, 2020, now Pat. No. 11,217,142, which is a
(Continued)

(51) Int. Cl.
*G09G 3/20* (2006.01)
*G02B 27/01* (2006.01)

(52) U.S. Cl.
CPC .......... *G09G 3/20* (2013.01); *G02B 27/0172* (2013.01); *G02B 2027/0178* (2013.01); *G09G 2310/08* (2013.01); *G09G 2320/0242* (2013.01); *G09G 2320/0271* (2013.01); *G09G 2320/041* (2013.01); *G09G 2320/043* (2013.01)

(58) Field of Classification Search
CPC ...... G09G 3/20; G09G 3/2074; G09G 3/3291; G09G 2330/10; G02B 27/0172
See application file for complete search history.

(56) References Cited

U.S. PATENT DOCUMENTS 7,145,529 B2 * 12/2006 Vulto .................. G09G 3/3208 345/84
9,715,848 B2 * 7/2017 Kim .................... G09G 3/3208
(Continued)

FOREIGN PATENT DOCUMENTS

WO 03100756 A2 12/2003

OTHER PUBLICATIONS

International Search Report and Written Opinion for International Application No. PCT/US2020/052154, dated Dec. 11, 2020, 14 Pages.

*Primary Examiner* — Sardis F Azongha
(74) *Attorney, Agent, or Firm* — Baker Botts L.L.P.

(57) ABSTRACT

In one embodiment, a computing system may access an image to be displayed on a display. The system may perform compensation operations on the display to compensate for degradation effects of the display. The system may determine a change in an electric signal level associated with one or more light-emitting elements of the display. The change may be caused by the compensation operations. The system may determine a wavelength shift of the light-emitting elements of the display. The wavelength shift may be caused by the change of the electric signal level. The system may adjust values of RGB color components of the pixel values of the image based on the wavelength shift of the light-emitting elements of the display. The system may output the pixel values with the adjusted values of the RGB color components to the display.

20 Claims, 30 Drawing Sheets

Related U.S. Application Data continuation-in-part of application No. 16/600,387, filed on Oct. 11, 2019, now Pat. No. 10,950,199.

(56) References Cited

U.S. PATENT DOCUMENTS

| | | | |
|---|---|---|---|
| 9,997,135 B2* | 6/2018 | Sullivan | G09G 5/06 |
| 10,943,541 B1* | 3/2021 | Tan | G09G 3/32 |
| 2006/0244476 A1 | 11/2006 | Zhang et al. | |

* cited by examiner

600A

600B

810A

| -0.0062 | -0.0079 | -0.0759 | -0.0079 | -0.0062 |
|---|---|---|---|---|
| -0.0128 | 0.0266 | 0.1561 | 0.0266 | -0.0128 |
| 0.0136 | -0.1029 | 0 | -0.1029 | 0.0136 |
| -0.0128 | 0.0266 | 0.1561 | 0.0266 | -0.0128 |
| -0.0062 | -0.0079 | -0.0759 | -0.0079 | -0.0062 |

810B

| -0.1138 | 0.1590 | -0.1162 | 0.1590 | -0.1138 |
|---|---|---|---|---|
| 0.1566 | -0.1446 | -0.1998 | -0.1446 | 0.1566 |
| -0.0959 | -0.2000 | 1 | -0.2000 | -0.0959 |
| 0.1566 | -0.1446 | -0.1998 | -0.1446 | 0.1566 |
| -0.1138 | 0.1590 | -0.1162 | 0.1590 | -0.1138 |

810C

| 0.0250 | -0.0523 | 0.0339 | -0.0523 | 0.0250 |
|---|---|---|---|---|
| -0.0757 | -0.0499 | 0.0961 | -0.0499 | -0.0757 |
| 0.1078 | 0.0385 | 0 | 0.0385 | 0.1078 |
| -0.0757 | -0.0499 | 0.0961 | -0.0499 | -0.0757 |
| 0.0250 | -0.0523 | 0.0339 | -0.0523 | 0.0250 |

| -0.1227 | 0.1932 | -0.1337 | 0.1932 | -0.1227 |
|---|---|---|---|---|
| 0.2002 | -0.1933 | -0.1661 | -0.1993 | 0.2002 |
| -0.1222 | -0.1964 | 1 | -0.1964 | -0.1222 |
| 0.2002 | -0.1993 | -0.1661 | -0.1993 | 0.2002 |
| -0.1227 | 0.1932 | -0.1337 | 0.1932 | -0.1227 |

820B

| -0.0410 | 0.0536 | -0.0714 | 0.0536 | -0.0410 |
|---|---|---|---|---|
| 0.0202 | -0.0515 | 0.0313 | -0.0515 | 0.0202 |
| -0.0402 | 0.0734 | 0 | 0.0734 | -0.0402 |
| 0.0202 | -0.0515 | 0.0313 | -0.0515 | 0.0202 |
| -0.0410 | 0.0536 | -0.0714 | 0.0536 | -0.0410 |

820C

| 0.0146 | -0.0780 | 0.1202 | -0.0780 | 0.0146 |
|---|---|---|---|---|
| -0.0421 | -0.0191 | -0.0436 | -0.0191 | -0.0421 |
| 0.0097 | 0.1130 | 0 | 0.1130 | 0.0097 |
| -0.0421 | -0.0191 | -0.0436 | -0.0191 | -0.0421 |
| 0.0146 | -0.0780 | 0.1202 | -0.0780 | 0.0146 |

| 0.0185 | -0.0503 | 0.1168 | -0.0503 | 0.0185 |
|---|---|---|---|---|
| -0.0454 | -0.1176 | -0.0301 | -0.1176 | -0.0454 |
| 0.0392 | 0.2718 | 0 | 0.2718 | 0.0392 |
| -0.0454 | -0.1176 | -0.0301 | -0.1176 | -0.0454 |
| 0.0185 | -0.0503 | 0.1168 | -0.0503 | 0.0185 |

830B

| -0.0267 | 0.0155 | -0.0330 | 0.0155 | -0.0267 |
|---|---|---|---|---|
| -0.0015 | -0.0547 | 0.0777 | -0.0547 | -0.0015 |
| -0.0026 | 0.0651 | 0 | 0.0651 | -0.0026 |
| -0.0015 | -0.0547 | 0.0777 | -0.0547 | -0.0015 |
| -0.0267 | 0.0155 | -0.0330 | 0.0155 | -0.0267 |

830C

| 0.0479 | -0.1708 | 0.3167 | -0.1708 | 0.0479 |
|---|---|---|---|---|
| -0.0131 | -0.1693 | -0.1490 | -0.1693 | -0.0131 |
| 0.0941 | -0.1531 | 1 | -0.1531 | 0.0941 |
| -0.0131 | -0.1693 | -0.1490 | -0.1693 | -0.0131 |
| 0.0479 | -0.1708 | 0.3167 | -0.1708 | 0.0479 |

*FIG. 8D*

DISPLAY DEGRADATION COMPENSATION

PRIORITY

This application is a continuation under 35 U.S.C. § 120 of U.S. patent application Ser. No. 16/998,860, filed 20 Aug. 2020, which a continuation-in-part under 35 U.S.C. § 120 of U.S. patent application Ser. No. 16/600,387 filed 11 Oct. 2019, which is incorporated herein by reference.

TECHNICAL FIELD

This disclosure generally relates to artificial reality, such as virtual reality and augmented reality.

BACKGROUND

Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured content (e.g., real-world photographs). The artificial reality content may include video, audio, haptic feedback, or some combination thereof, and any of which may be presented in a single channel or in multiple channels (such as stereo video that produces a three-dimensional effect to the viewer). Artificial reality may be associated with applications, products, accessories, services, or some combination thereof, that are, e.g., used to create content in an artificial reality and/or used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

SUMMARY OF PARTICULAR EMBODIMENTS

Particular embodiments described herein relate to systems and methods for using scaling factors to scale pixel values of images to compensate for display degradation caused by temperature change or display aging. For temperature-caused degradation, the system may use one or more temperature sensors to determine temperature distribution across the light-emitting element array. The system may determine a degradation level (e.g., a reduced light emitting intensity) for each light-emitting element based on its temperature and a pre-determined function mapping temperature to light emitting intensity. Then, the system may determine a scaling factor for each light-emitting element based on the degradation level of that light-emitting element. For example, the system may determine that light-emitting element has a reduction in intensity of 80% with respect to its reference intensity. The system may determine a scaling factor of 1.25, which when applied to the pixel value for that light-emitting element, could compensate the reduced light intensity (e.g., 0.8×1.25=1.0). The system may determine a scaling factor for each individual light-emitting element in the array. The scaling factors may be incorporated into a correction matrix for correcting non-uniformity or hiding dead pixels and may be applied to the pixel values of the images through the correction matrix. By applying the scaling factors to the pixel values of the images, the displayed images may have improved display quality and uniformity with the temperature caused degradation being compensated.

For degradation caused by aging, the system may use a mesh grid to determine the scaling factors for the light-emitting elements in the array. The system may estimate light-emitting elements' degradation levels based on a number of factors (e.g., µLED locations within respective arrays, accumulative usage duration, ages of the device, etc.). For example, the light-emitting elements in the center area of the view may degrade faster than the light-emitting elements in the edge areas because the center area may be used more frequently. The degradation levels of the light-emitting elements may change gradually in one or more areas. The system may determine degradation levels for all light-emitting elements in the array and calculate scaling factors using a mesh grid for compensating the degradation across the field of view (or within one or more areas having gradually changing gradation levels). The mesh grid may have a same scaling factor for each mesh grid region (e.g., one mesh grid region covering 32×32 light-emitting elements). The scaling factor values may be determined based on the degradation levels of the light-emitting element in each mesh grid region and may be incorporated into a correction matrix which is also used for correcting dead pixels and non-uniformity of the display. At run time, the system may access the correction matrix and apply the matrix values to corresponding pixel values of images before sending the images to display. As a result, the scaling factors for compensating aging caused degradation may be applied to the pixel values of the images, and the displayed images may have better display quality with the degradation effect being compensated.

As another example, an area for displaying time indicators may degrade faster than other areas because the time indicators may be always displayed when the display is turned on. The time indicators display area may have a specific degradation pattern because of the time indicator display pattern (e.g., light-emitting element for displaying numbers being seriously degraded in contrast to the background area). For such areas, the system may use a pixel-level compensation method to compensate for the degradation. The system may determine a scaling factor for each individual light-emitting element in the area based on the degradation level of that particular light-emitting element. The scaling factors may be incorporated into a correction matrix (which is also used for correcting dead pixels and non-uniformity of the display) and may be applied to the images to be displayed for scaling the pixel values of the images. By scaling the images using the scaling factors, the displayed images may have better display quality with the aging caused degradation effect being compensated.

The embodiments disclosed herein are only examples, and the scope of this disclosure is not limited to them. Particular embodiments may include all, some, or none of the components, elements, features, functions, operations, or steps of the embodiments disclosed above. Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

BRIEF DESCRIPTION OF THE DRAWINGS

FIG. 8B illustrates example mask values for the set of three masks for correcting a green dead pixel.

FIG. 8C illustrates example mask values for a set of three masks for correcting a red dead pixel.

FIG. 8D illustrates example mask values for a set of three masks for correcting a blue dead pixel.

DESCRIPTION OF EXAMPLE EMBODIMENTS

Figure 1A:
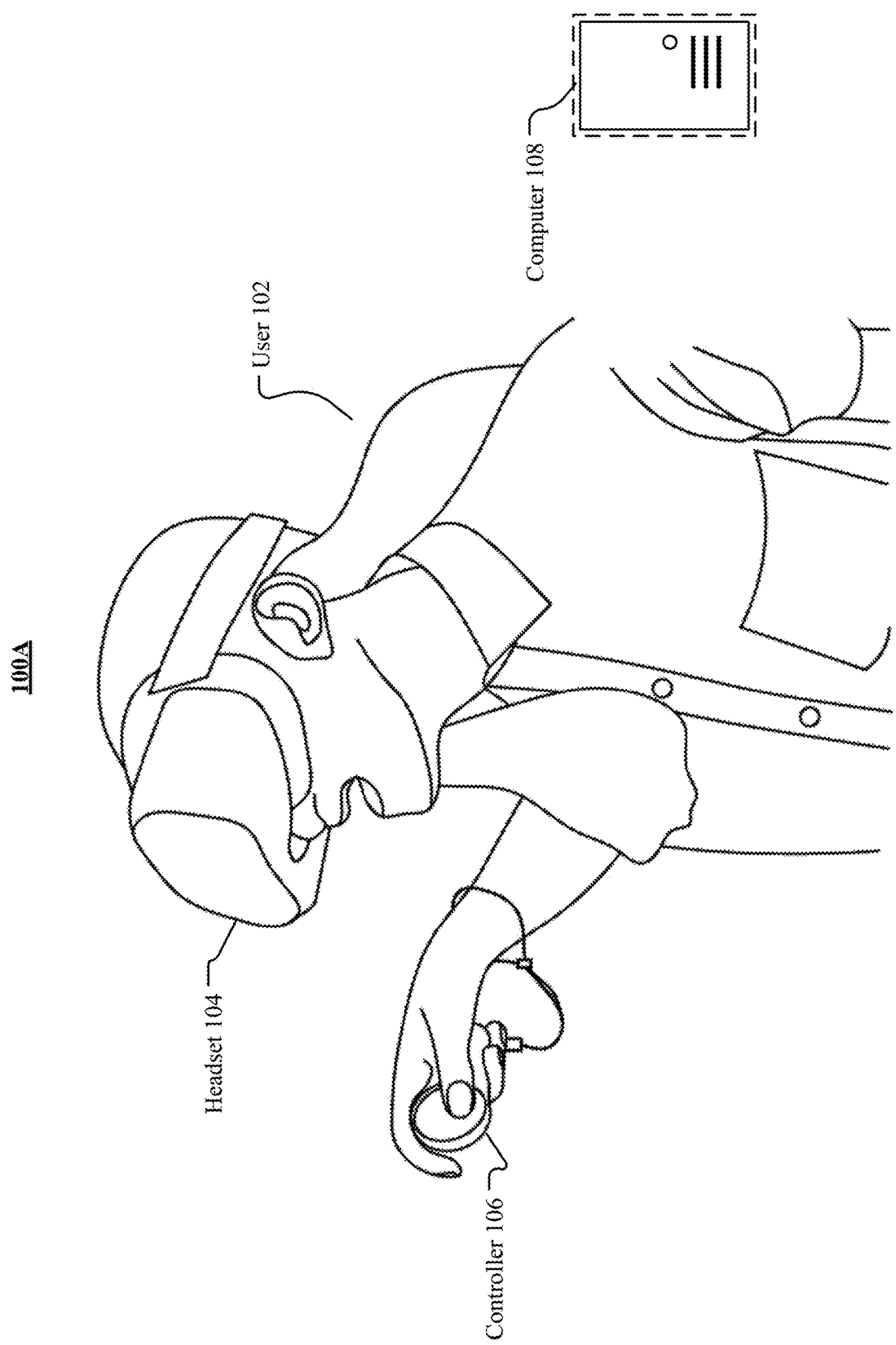
FIG. 1A illustrates an example artificial reality system.

FIG. 1A illustrates an example artificial reality system 100A. In particular embodiments, the artificial reality system 100 may comprise a headset 104, a controller 106, and a computing system 108. A user 102 may wear the headset 104 that may display visual artificial reality content to the user 102. The headset 104 may include an audio device that may provide audio artificial reality content to the user 102. The headset 104 may include one or more cameras which can capture images and videos of environments. The headset 104 may include an eye tracking system to determine the vergence distance of the user 102. The headset 104 may be referred as a head-mounted display (HDM). The controller 106 may comprise a trackpad and one or more buttons. The controller 106 may receive inputs from the user 102 and relay the inputs to the computing system 108. The controller 206 may also provide haptic feedback to the user 102. The computing system 108 may be connected to the headset 104 and the controller 106 through cables or wireless connections. The computing system 108 may control the headset 104 and the controller 106 to provide the artificial reality content to and receive inputs from the user 102. The computing system 108 may be a standalone host computer system, an on-board computer system integrated with the headset 104, a mobile device, or any other hardware platform capable of providing artificial reality content to and receiving inputs from the user 102.

Figure 1B:
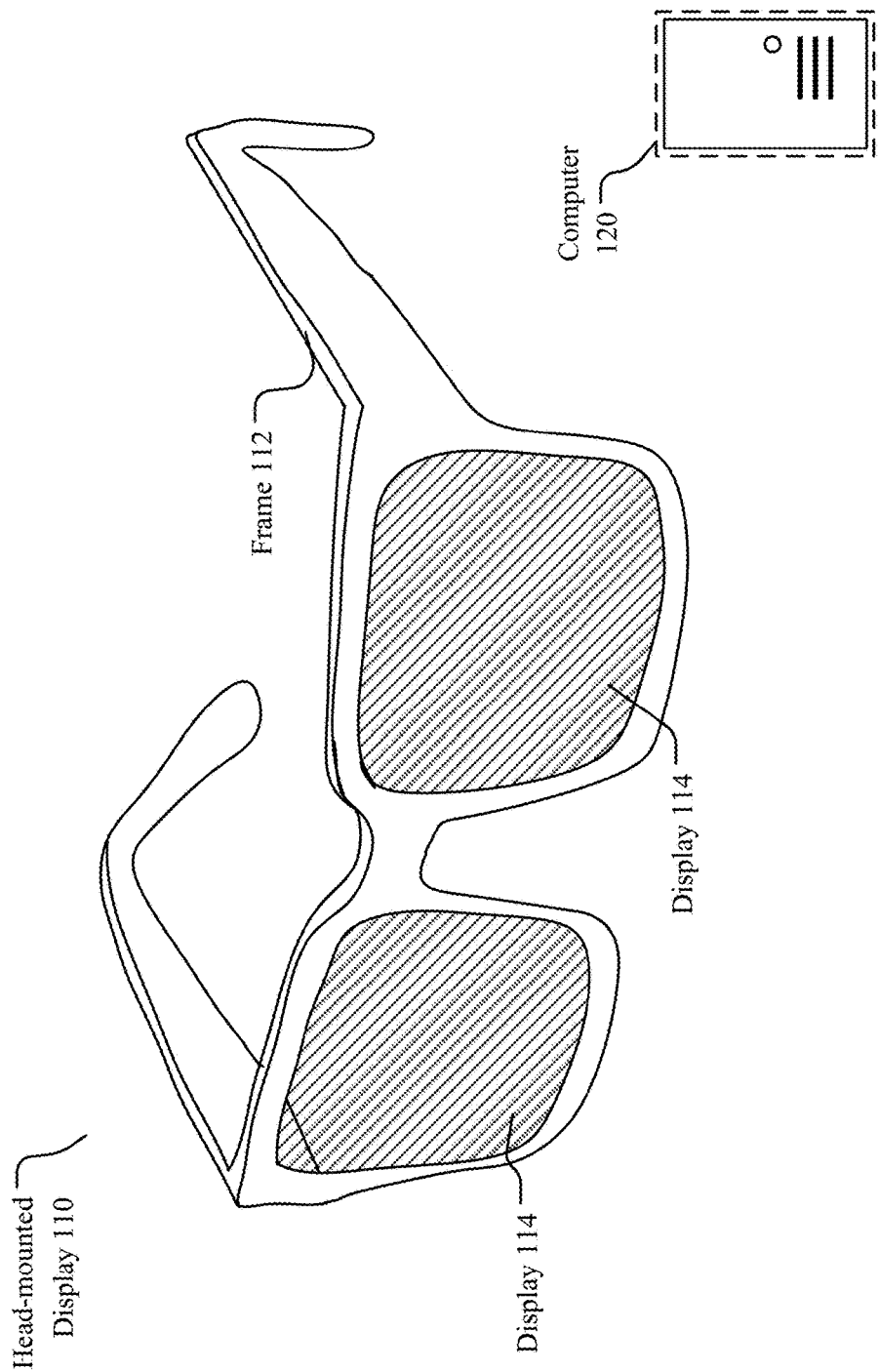
FIG. 1B illustrates an example augmented reality system.

FIG. 1B illustrates an example augmented reality system 100B. The augmented reality system 100B may include a head-mounted display (HMD) 110 (e.g., glasses) comprising a frame 112, one or more displays 114, and a computing system 120. The displays 114 may be transparent or translucent allowing a user wearing the HMD 110 to look through the displays 114 to see the real world and displaying visual artificial reality content to the user at the same time. The HMD 110 may include an audio device that may provide audio artificial reality content to users. The HMD 110 may include one or more cameras which can capture images and videos of environments. The HMD 110 may include an eye tracking system to track the vergence movement of the user wearing the HMD 110. The augmented reality system 100B may further include a controller comprising a trackpad and one or more buttons. The controller may receive inputs from users and relay the inputs to the computing system 120. The controller may also provide haptic feedback to users. The computing system 120 may be connected to the HMD 110 and the controller through cables or wireless connections. The computing system 120 may control the HMD 110 and the controller to provide the augmented reality content to and receive inputs from users. The computing system 120 may be a standalone host computer system, an on-board computer system integrated with the HMD 110, a mobile device, or any other hardware platform capable of providing artificial reality content to and receiving inputs from users.

Figure 1C:
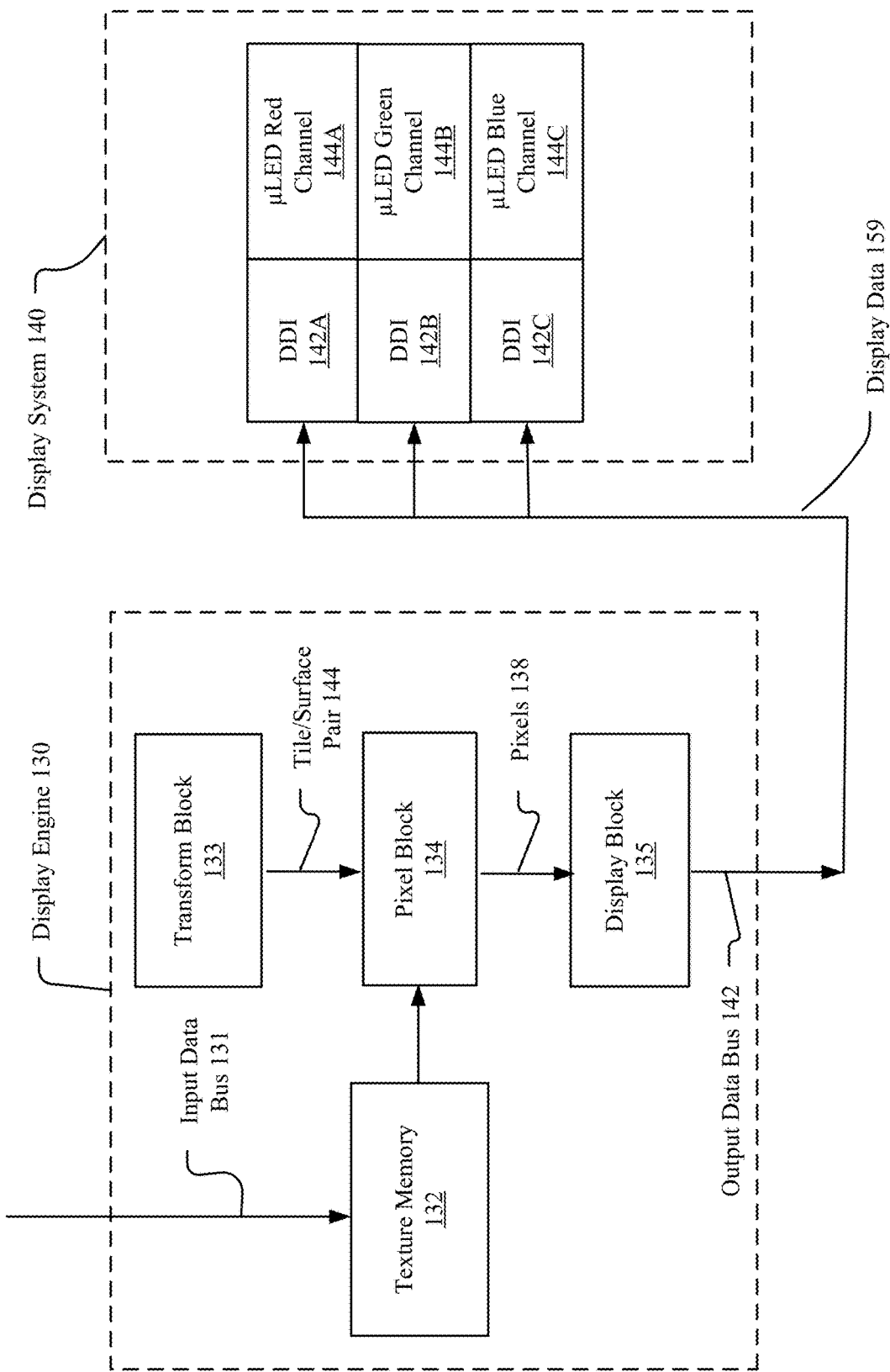
FIG. 1C illustrates an example architecture of a display engine.

FIG. 1C illustrates an example architecture 100C of a display engine 130. In particular embodiments, the processes and methods as described in this disclosure may be embodied or implemented within a display engine 130 (e.g., in the display block 135). The display engine 130 may include, for example, but is not limited to, a texture memory 132, a transform block 133, a pixel block 134, a display block 135, input data bus 131, output data bus 142, etc. In particular embodiments, the display engine 130 may include one or more graphic pipelines for generating images to be rendered on the display. For example, the display engine may use the graphic pipeline(s) to generate a series of subframe images based on a mainframe image and a viewpoint or view angle of the user as measured by one or more eye tracking sensors. The mainframe image may be generated or/and loaded in to the system at a mainframe rate of 30-90 Hz and the subframe rate may be generated at a subframe rate of 1-2 kHz. In particular embodiments, the display engine 130 may include two graphic pipelines for the user's left and right eyes. One of the graphic pipelines may include or may be implemented on the texture memory 132, the transform block 133, the pixel block 134, the display block 135, etc. The display engine 130 may include another set of transform block, pixel block, and display block for the other graphic pipeline. The graphic pipeline(s) may be controlled by a controller or control block (not shown) of the display engine 130. In particular embodiments, the texture memory 132 may be included within the control block or may be a memory unit external to the control block but local to the display engine 130. One or more of the components of the display engine 130 may be configured to communicate via a high-speed bus, shared memory, or any other suitable methods. This communication may include transmission of data as well as control signals, interrupts or/and other instructions. For example, the texture memory 132 may be configured to receive image data through the input data bus 211. As another example, the display block 135 may send the pixel values to the display system 140 through the output data bus 142. In particular embodiments, the display system 140 may include three color channels (e.g., 114A, 114B, 114C) with respective display driver ICs (DDIs) of 142A, 142B, and 143B. In particular embodiments, the display system 140 may include, for example, but is not limited to, light-emitting diode (LED) displays, organic light-emitting diode (OLED) displays, active matrix organic light-emitting diode (AMLED) displays, liquid crystal display (LCD), micro light-emitting diode (μLED) display, electroluminescent displays (ELDs), or any suitable displays.

In particular embodiments, the display engine 130 may include a controller block (not shown). The control block may receive data and control packages such as position data and surface information from controllers external to the display engine 130 though one or more data buses. For example, the control block may receive input stream data from a body wearable computing system. The input data stream may include a series of mainframe images generated at a mainframe rate of 30-90 Hz. The input stream data including the mainframe images may be converted to the required format and stored into the texture memory 132. In particular embodiments, the control block may receive input from the body wearable computing system and initialize the graphic pipelines in the display engine to prepare and finalize the image data for rendering on the display. The data and control packets may include information related to, for example, one or more surfaces including texel data, position data, and additional rendering instructions. The control block may distribute data as needed to one or more other blocks of the display engine 130. The control block may initiate the graphic pipelines for processing one or more frames to be displayed. In particular embodiments, the graphic pipelines for the two eye display systems may each include a control block or share the same control block.

In particular embodiments, the transform block 133 may determine initial visibility information for surfaces to be displayed in the artificial reality scene. In general, the transform block 133 may cast rays from pixel locations on the screen and produce filter commands (e.g., filtering based on bilinear or other types of interpolation techniques) to send to the pixel block 134. The transform block 133 may perform ray casting from the current viewpoint of the user (e.g., determined using the headset's inertial measurement units, eye tracking sensors, and/or any suitable tracking/localization algorithms, such as simultaneous localization and mapping (SLAM)) into the artificial scene where surfaces are positioned and may produce tile/surface pairs 144 to send to the pixel block 134. In particular embodiments, the transform block 133 may include a four-stage pipeline as follows. A ray caster may issue ray bundles corresponding to arrays of one or more aligned pixels, referred to as tiles (e.g., each tile may include 16×16 aligned pixels). The ray bundles may be warped, before entering the artificial reality scene, according to one or more distortion meshes. The distortion meshes may be configured to correct geometric distortion effects stemming from, at least, the eye display systems the headset system. The transform block 133 may determine whether each ray bundle intersects with surfaces in the scene by comparing a bounding box of each tile to bounding boxes for the surfaces. If a ray bundle does not intersect with an object, it may be discarded. After the tile-surface intersections are detected, the corresponding tile/surface pairs may be passed to the pixel block 134.

In particular embodiments, the pixel block 134 may determine color values or grayscale values for the pixels based on the tile-surface pairs. The color values for each pixel may be sampled from the texel data of surfaces received and stored in texture memory 132. The pixel block 134 may receive tile-surface pairs from the transform block 133 and may schedule bilinear filtering using one or more filer blocks. For each tile-surface pair, the pixel block 134 may sample color information for the pixels within the tile using color values corresponding to where the projected tile intersects the surface. The pixel block 134 may determine pixel values based on the retrieved texels (e.g., using bilinear interpolation). In particular embodiments, the pixel block 134 may process the red, green, and blue color components separately for each pixel. In particular embodiments, the display may include two pixel blocks for the two eye display systems. The two pixel blocks of the two eye display systems may work independently and in parallel with each other. The pixel block 134 may then output its color determinations (e.g., pixels 138) to the display block 135. In particular embodiments, the pixel block 134 may composite two or more surfaces into one surface to when the two or more surfaces have overlapping areas. A composed surface may need less computational resources (e.g., computational units, memory, power, etc.) for the resampling process.

In particular embodiments, the display block 135 may receive pixel color values from the pixel block 134, covert the format of the data to be more suitable for the scanline output of the display, apply one or more brightness corrections to the pixel color values, and prepare the pixel color values for output to the display. In particular embodiments, the display block 135 may each include a row buffer and may process and store the pixel data received from the pixel block 134. The pixel data may be organized in quads (e.g., 2×2 pixels per quad) and tiles (e.g., 16×16 pixels per tile). The display block 135 may convert tile-order pixel color values generated by the pixel block 134 into scanline or row-order data, which may be required by the physical displays. The brightness corrections may include any required brightness correction, gamma mapping, and dithering. The display block 135 may output the corrected pixel color values directly to the driver of the physical display (e.g., pupil display) or may output the pixel values to a block external to the display engine 130 in a variety of formats. For example, the eye display systems of the headset system may include additional hardware or software to further customize backend color processing, to support a wider interface to the display, or to optimize display speed or fidelity.

In particular embodiments, the dithering methods and processes (e.g., spatial dithering method, temporal dithering methods, and spatio-temporal methods) as described in this disclosure may be embodied or implemented in the display block 135 of the display engine 130. In particular embodiments, the display block 135 may include a model-based dithering algorithm or a dithering model for each color channel and send the dithered results of the respective color channels to the respective display driver ICs (DDIs) (e.g., 142A, 142B, 142C) of display system 140. In particular embodiments, before sending the pixel values to the respective display driver ICs (e.g., 142A, 142B, 142C), the display block 135 may further include one or more algorithms for correcting, for example, pixel non-uniformity, LED non-ideality, waveguide non-uniformity, display defects (e.g., dead pixels), etc. U.S. patent application Ser. No. 16/998, 916, entitled "Display Non-uniformity Correction," first named inventor "Edward Buckley," filed on 20 Aug. 2020, which discloses example systems, methods, and processes for display non-uniformity corrections, is incorporated herein by reference.

In particular embodiments, graphics applications (e.g., games, maps, content-providing apps, etc.) may build a scene graph, which is used together with a given view position and point in time to generate primitives to render on a GPU or display engine. The scene graph may define the logical and/or spatial relationship between objects in the scene. In particular embodiments, the display engine 130 may also generate and store a scene graph that is a simplified form of the full application scene graph. The simplified scene graph may be used to specify the logical and/or spatial relationships between surfaces (e.g., the primitives rendered by the display engine 130, such as quadrilaterals or contours, defined in 3D space, that have corresponding textures generated based on the mainframe rendered by the application). Storing a scene graph allows the display engine 130 to render the scene to multiple display frames and to adjust each element in the scene graph for the current viewpoint (e.g., head position), the current object positions (e.g., they could be moving relative to each other) and other factors that change per display frame. In addition, based on the scene graph, the display engine 130 may also adjust for the geometric and color distortion introduced by the display subsystem and then composite the objects together to generate a frame. Storing a scene graph allows the display engine 130 to approximate the result of doing a full render at the desired high frame rate, while actually running the GPU or display engine 130 at a significantly lower rate.

Figure 1D:
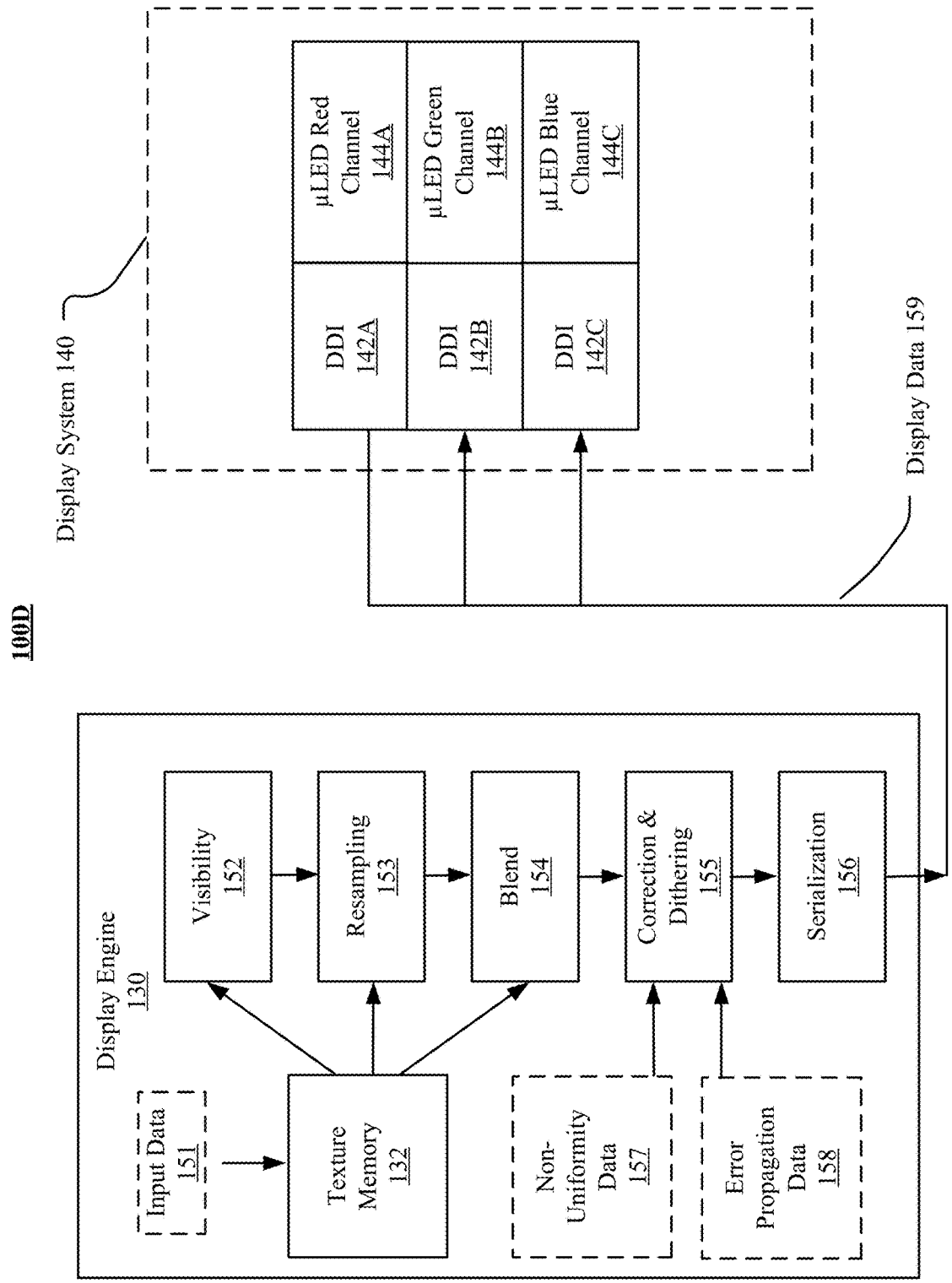
FIG. 1D illustrates an example graphic pipeline of the display engine for generating display image data.

FIG. 1D illustrates an example graphic pipeline 100D of the display engine 130 for generating display image data. In particular embodiments, the graphic pipeline 100D may include a visibility step 152, where the display engine 130 may determine the visibility of one or more surfaces received from the body wearable computing system. The visibility step 152 may be performed by the transform block (e.g., 2133 in FIG. 1C) of the display engine 130. The display engine 130 may receive (e.g., by a control block or a controller) input data 151 from the body-wearable computing system. The input data 151 may include one or more surfaces, texel data, position data, RGB data, and rendering instructions from the body wearable computing system. The input data 151 may include mainframe images with 30-90 frames per second (FPS). The main frame image may have color depth of, for example, 24 bits per pixel. The display engine 130 may process and save the received input data 151 in the texel memory 132. The received data may be passed to the transform block 133 which may determine the visibility information for surfaces to be displayed. The transform block 133 may cast rays for pixel locations on the screen and produce filter commands (e.g., filtering based on bilinear or other types of interpolation techniques) to send to the pixel block 134. The transform block 133 may perform ray casting from the current viewpoint of the user (e.g., determined using the headset's inertial measurement units, eye trackers, and/or any suitable tracking/localization algorithms, such as simultaneous localization and mapping (SLAM)) into the artificial scene where surfaces are positioned and produce surface-tile pairs to send to the pixel block 134.

In particular embodiments, the graphic pipeline 100D may include a resampling step 153, where the display engine 130 may determine the color values from the tile-surfaces pairs to produce pixel color values. The resampling step 153 may be performed by the pixel block 134 in FIG. 1C) of the display engine 130. The pixel block 134 may receive tile-surface pairs from the transform block 133 and may schedule bilinear filtering. For each tile-surface pair, the pixel block 134 may sample color information for the pixels within the tile using color values corresponding to where the projected tile intersects the surface. The pixel block 134 may determine pixel values based on the retrieved texels (e.g., using bilinear interpolation) and output the determined pixel values to the respective display block 135.

In particular embodiments, the graphic pipeline 100D may include a bend step 154, a correction and dithering step 155, a serialization step 156, etc. In particular embodiments, the bend step, correction and dithering step, and serialization steps of 154, 155, and 156 may be performed by the display block (e.g., 135 in FIG. 1C) of the display engine 130. The display engine 130 may blend the display content for display content rendering, apply one or more brightness corrections to the pixel color values, perform one or more dithering algorithms for dithering the quantization errors both spatially and temporally, serialize the pixel values for scanline output for the physical display, and generate the display data 159 suitable for the display system 140. The display engine 130 may send the display data 159 to the display system 140.

In particular embodiments, the display system 140 may include three display driver ICs (e.g., 142A, 142B, 142C) for the pixels of the three color channels of RGB (e.g., 144A, 144B, 144C).

Figure 2A:
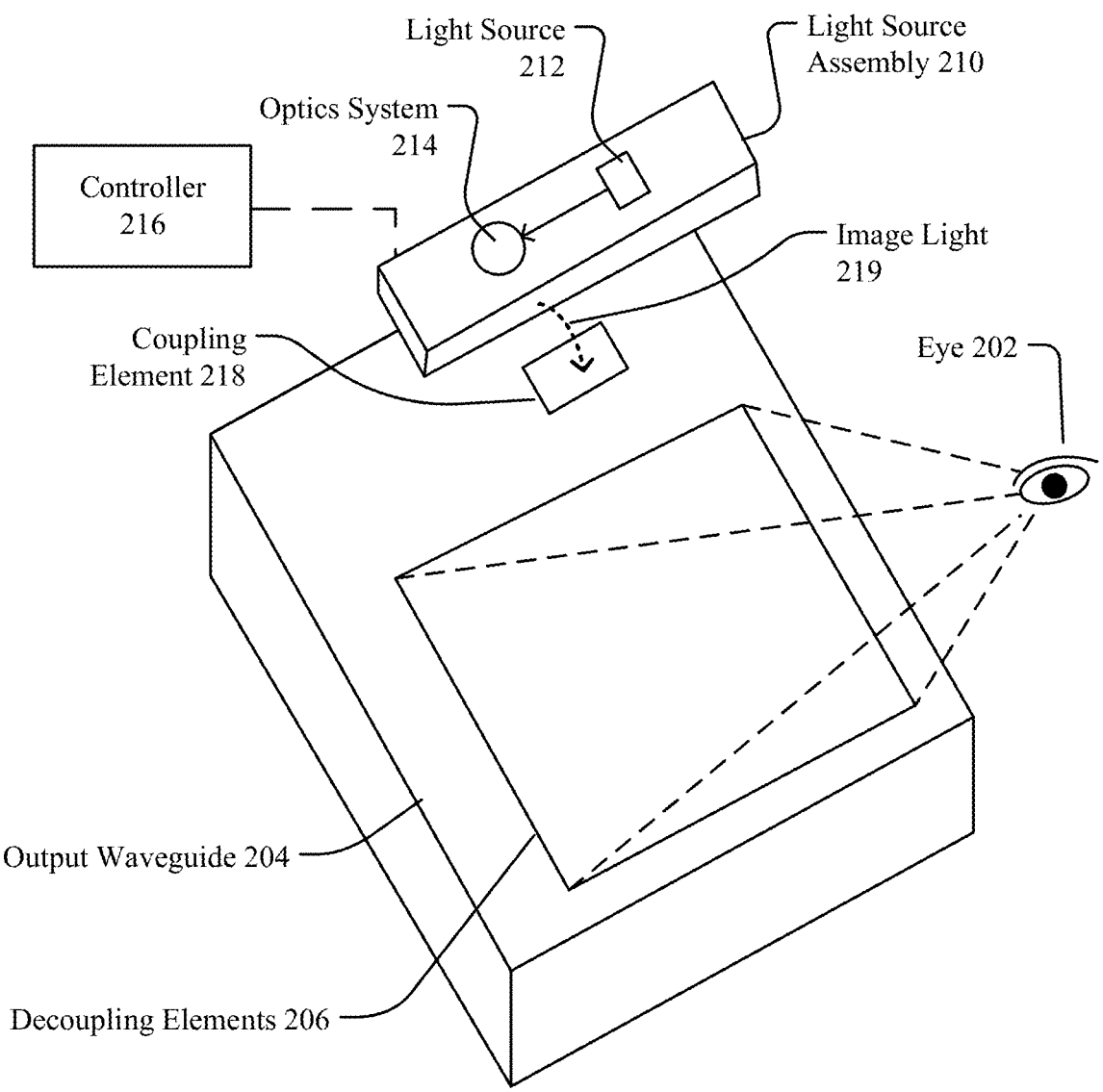
FIG. 2A illustrates an example scanning waveguide display.
Figure 3A:
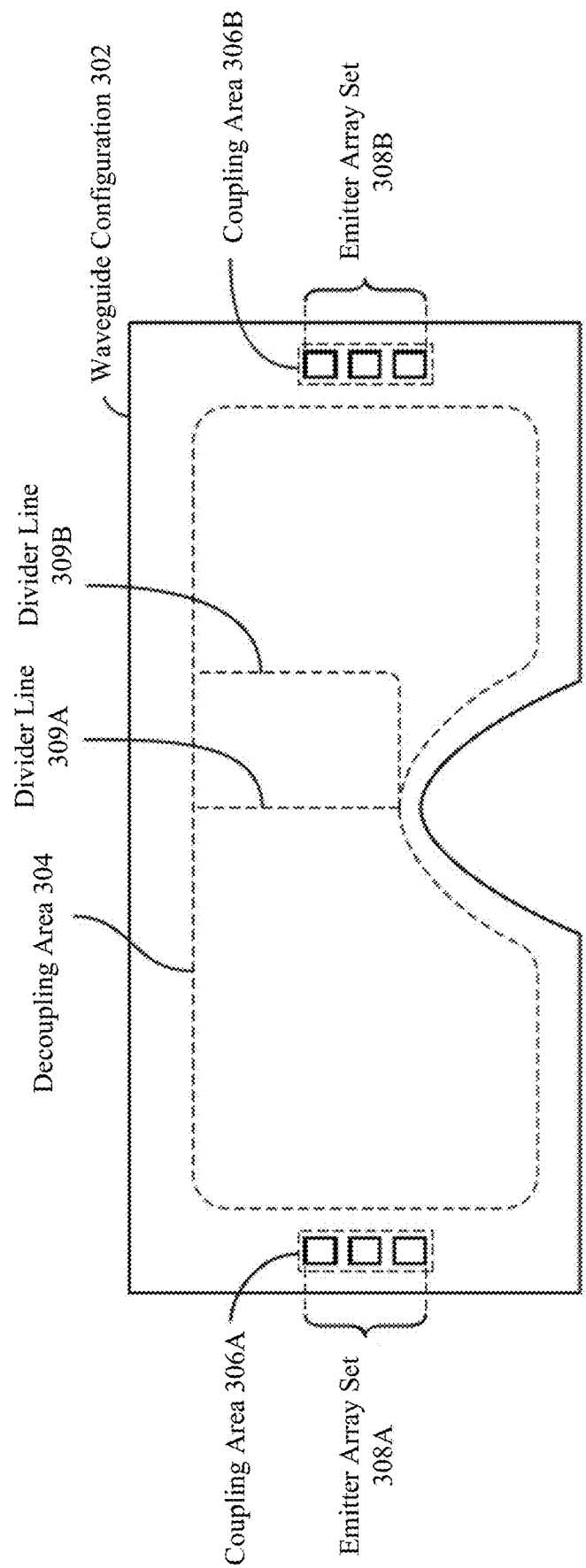
FIG. 3A illustrates an example 2D micro-LED waveguide display.

FIG. 2A illustrates an example scanning waveguide display 200A. In particular embodiments, the head-mounted display (HMD) of the AR/VR system may include a near eye display (NED) which may be a scanning waveguide display 200A. The scanning waveguide display 200A may include a light source assembly 210, an output waveguide 204, a controller 216, etc. The scanning waveguide display 200A may provide images for both eyes or for a single eye. For purposes of illustration, FIG. 3A shows the scanning waveguide display 200A associated with a single eye 202. Another scanning waveguide display (not shown) may provide image light to the other eye of the user and the two scanning waveguide displays may share one or more components or may be separated. The light source assembly 210 may include a light source 212 and an optics system 214. The light source 212 may include an optical component that could generate image light using an array of light emitters. The light source 212 may generate image light including, for example, but not limited to, red image light, blue image light, green image light, infra-red image light, etc. The optics system 214 may perform a number of optical processes or operations on the image light generated by the light source 212. The optical processes or operations performed by the optics systems 214 may include, for example, but are not limited to, light focusing, light combining, light conditioning, scanning, etc.

In particular embodiments, the optics system 214 may include a light combining assembly, a light conditioning assembly, a scanning mirror assembly, etc. The light source assembly 210 may generate and output an image light 219 to a coupling element 218 of the output waveguide 204. The output waveguide 204 may be an optical waveguide that could output image light to the user eye 202. The output waveguide 204 may receive the image light 219 at one or more coupling elements 218 and guide the received image light to one or more decoupling elements 206. The coupling element 218 may be, for example, but is not limited to, a diffraction grating, a holographic grating, any other suitable elements that can couple the image light 219 into the output waveguide 204, or a combination thereof. As an example and not by way of limitation, if the coupling element 350 is a diffraction grating, the pitch of the diffraction grating may be chosen to allow the total internal reflection to occur and the image light 219 to propagate internally toward the decoupling element 206. The pitch of the diffraction grating may be in the range of 300 nm to 600 nm. The decoupling element 206 may decouple the total internally reflected image light from the output waveguide 204. The decoupling element 206 may be, for example, but is not limited to, a diffraction grating, a holographic grating, any other suitable element that can decouple image light out of the output waveguide 204, or a combination thereof. As an example and not by way of limitation, if the decoupling element 206 is a diffraction grating, the pitch of the diffraction grating may be chosen to cause incident image light to exit the output waveguide 204. The orientation and position of the image light exiting from the output waveguide 204 may be controlled by changing the orientation and position of the image light 219 entering the coupling element 218. The pitch of the diffraction grating may be in the range of 300 nm to 600 nm.

In particular embodiments, the output waveguide 204 may be composed of one or more materials that can facilitate total internal reflection of the image light 219. The output waveguide 204 may be composed of one or more materials including, for example, but not limited to, silicon, plastic, glass, polymers, or some combination thereof. The output waveguide 204 may have a relatively small form factor. As an example and not by way of limitation, the output waveguide 204 may be approximately 50 mm wide along X-dimension, 30 mm long along Y-dimension and 0.5-1 mm thick along Z-dimension. The controller 216 may control the scanning operations of the light source assembly 210. The controller 216 may determine scanning instructions for the light source assembly 210 based at least on the one or more display instructions for rendering one or more images. The display instructions may include an image file (e.g., bitmap) and may be received from, for example, a console or computer of the AR/VR system. Scanning instructions may be used by the light source assembly 210 to generate image light 219. The scanning instructions may include, for example, but are not limited to, an image light source type (e.g., monochromatic source, polychromatic source), a scanning rate, a scanning apparatus orientation, one or more illumination parameters, or some combination thereof. The controller 216 may include a combination of hardware, software, firmware, or any suitable components supporting the functionality of the controller 216.

Figure 2B:
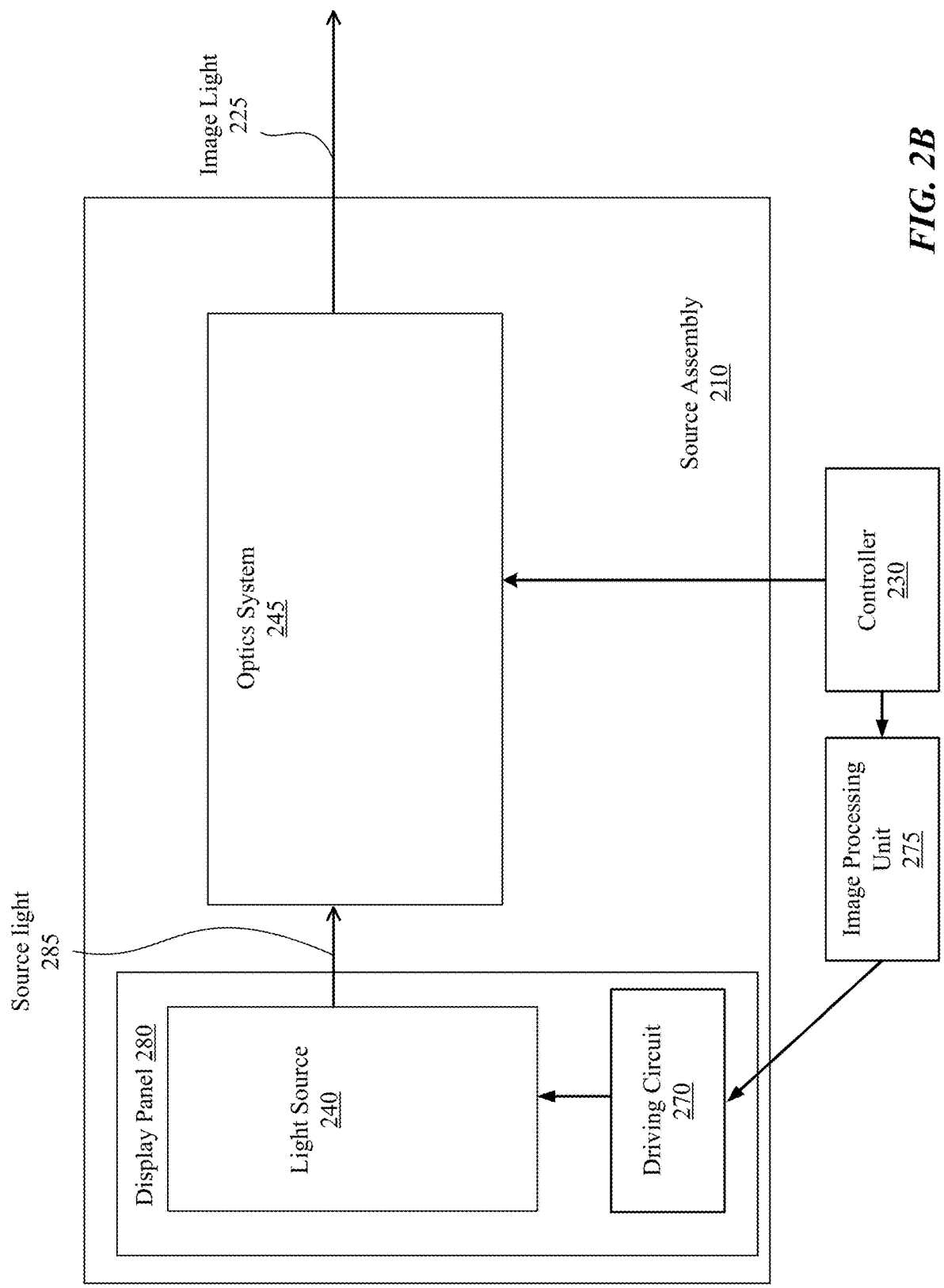
FIG. 2B illustrates an example source assembly in accordance with an embodiment.

FIG. 2B illustrates an example source assembly 210 in accordance with an embodiment. The source assembly 210 may include the light source 240 that emits light that is processed optically by the optics system 245 to generate image light 235 that will be projected on an image field (not shown). The light source 240 may be driven by the driving circuit 270 based on the data sent from a controller 230 or an image processing unit 275. In one embodiment, the driving circuit 270 may be the circuit panel that connects to and mechanically holds various light emitters of the light source 240. The driving circuit 270 and the light source 240 combined may be referred to as a display panel 280 or an LED panel (if some forms of LEDs are used as the light emitters).

In particular embodiments, the light source 240 may generate a spatially coherent or a partially spatially coherent image light. The light source 240 may include multiple light emitters. The light emitters can be vertical cavity surface emitting laser (VCSEL) devices, light emitting diodes (LEDs), microLEDs, tunable lasers, and/or some other light-emitting devices. In one embodiment, the light source 240 may include a matrix of light emitters. In another embodiment, the light source 240 may include multiple sets of light emitters with each set grouped by color and arranged in a matrix form. The light source 240 may emit light in a visible band (e.g., from about 390 nm to 700 nm). The light source 240 may emit light in accordance with one or more illumination parameters that are set by the controller 230 and potentially adjusted by image processing unit 275 and driving circuit 270. An illumination parameter may be an instruction used by the light source 240 to generate light. An illumination parameter may include, for example, but are not limited to, source wavelength, pulse rate, pulse amplitude, beam type (continuous or pulsed), other parameter(s) that affect the emitted light, or some combination thereof. The light source 240 may emit source light 285. In some embodiments, the source light 285 may include multiple beams of Red light, Green light, and Blue light, or some combination thereof.

In particular embodiments, the optics system 245 may include one or more optical components that optically adjust and potentially re-direct the light from the light source 240.

One form of example adjustment of light may include conditioning the light. Conditioning the light from the light source 240 may include, for example, but are not limited to, expanding, collimating, correcting for one or more optical errors (e.g., field curvature, chromatic aberration, etc.), some other adjustment of the light, or some combination thereof. The optical components of the optics system 245 may include, for example, but are not limited to, lenses, mirrors, apertures, gratings, or some combination thereof. Light emitted from the optics system 245 may be referred to as an image light 255.

In particular embodiments, the optics system 245 may redirect image light via its one or more reflective and/or refractive portions so that the image light 255 may be projected at a particular orientation toward the output waveguide 204 (shown in FIG. 2A). Where the image light is redirected toward is based on specific orientations of the one or more reflective and/or refractive portions. In some embodiments, the optics system 245 may include a single scanning mirror that scans in at least two dimensions. In other embodiments, the optics system 245 may include a plurality of scanning mirrors that each scan in orthogonal directions to each other. The optics system 245 may perform a raster scan (horizontally, or vertically), a biresonant scan, or some combination thereof. In some embodiments, the optics system 245 may perform a controlled vibration along the horizontal and/or vertical directions with a specific frequency of oscillation to scan along two dimensions and generate a two-dimensional projected line image of the media presented to user's eyes. In other embodiments, the optics system 245 may also include a lens that serves similar or same function as one or more scanning mirror.

In some embodiments, the optics system 245 includes a galvanometer mirror. For example, the galvanometer mirror may represent any electromechanical instrument that indicates that it has sensed an electric current by deflecting a beam of image light with one or more mirrors. The galvanometer mirror may scan in at least one orthogonal dimension to generate the image light 255. The image light 255 from the galvanometer mirror represents a two-dimensional line image of the media presented to the user's eyes. In some embodiments, the source assembly 210 may not include an optics system. The light emitted by the light source 240 may be projected directly to the waveguide 204 (shown in FIG. 2A).

In particular embodiments, the controller 230 may control the operations of light source 240 and, in some cases, the optics system 245. In some embodiments, the controller 230 may be the graphics processing unit (GPU) of a display device. In other embodiments, the controller 230 may be other kinds of processors. The operations performed by the controller 230 includes taking content for display, and dividing the content into discrete sections. The controller 230 may instruct the light source 240 to sequentially present the discrete sections using light emitters corresponding to a respective row in an image ultimately displayed to the user. The controller 230 may instruct the optics system 245 to perform different adjustment of the light. For example, the controller 230 may control the optics system 245 to scan the presented discrete sections to different areas of a coupling element of the output waveguide 204 (shown in FIG. 2A). Accordingly, at the exit pupil of the output waveguide 204, each discrete portion may be presented in a different location. While each discrete section is presented at different times, the presentation and scanning of the discrete sections may occur fast enough such that a user's eye integrates the different sections into a single image or series of images. The controller 230 may also provide scanning instructions to the light source 240 that may include an address corresponding to an individual source element of the light source 240 and/or an electrical bias applied to the individual source element.

In particular embodiments, the image processing unit 275 may be a general-purpose processor and/or one or more application-specific circuits that are dedicated to performing the features described herein. In one embodiment, a general-purpose processor may be coupled to a memory to execute software instructions that cause the processor to perform certain processes described herein. In another embodiment, the image processing unit 275 may be one or more circuits that are dedicated to performing certain features. While in FIG. 2B the image processing unit 275 is shown as a stand-alone unit that is separate from the controller 330 and the driving circuit 370, in other embodiments, the image processing unit 275 may be a sub-unit of the controller 230 or the driving circuit 270. In other words, in those embodiments, the controller 230 or the driving circuit 270 may perform various image processing procedures of the image processing unit 275. The image processing unit 275 may also be referred to as an image processing circuit.

Figure 2C:
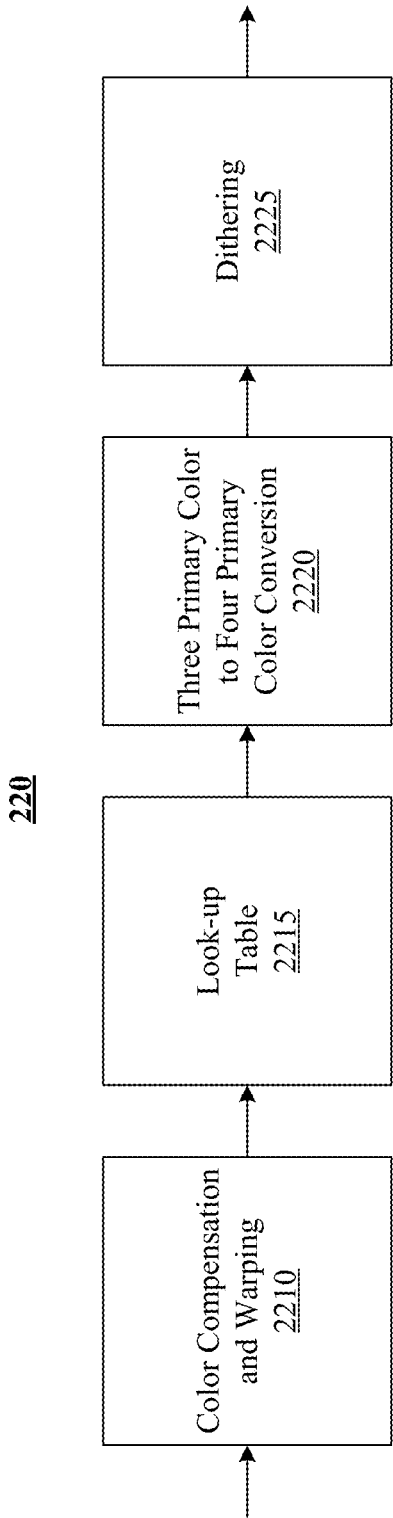
FIG. 2C illustrates an example image processing operation that is associated with processing pixel data for a display device.

FIG. 2C illustrates an example image processing operation 220 that is associated with processing pixel data for a display device. The image processing operation 220 may be performed by an image processing unit 275 shown in FIG. 2B. After receiving multiple sets of input pixel data (each set may correspond to a color value at a pixel location), the display device may perform color compensation and warping 2210 to generate compensated pixel data. Color compensation and warping 2210 may include various image processing for the perception of the human users. For example, color compensation may be performed based on user settings to make the images appear to be warmer, more vivid, more dynamic, etc. Color compensation and warping may also be performed to account for any curvature or other unique dimensions for HMD or NED so that raw data of a flat image may appear more similar to the reality from the perception of the human users.

In the image processing operation 220, the compensated pixel data representing a color coordinate in a first color coordinate space (e.g., the RGB coordinate space) is then converted to an updated color coordinate by a look-up table 2215. The updated color coordinate may be in a second color coordinate space such as the tristimulus values XYZ. Alternative to a look-up table, the conversion may also be done by a linear transformation operation. The display device then performs a conversion 2220 to change three primary colors to four primary colors that include red, first green, second green, and blue. A dithering 2225 may be performed to generate dithered pixel data. The dithering may be a vectorized dither operation that changes the bit depths of the pixel data (such as reducing the bit depths) and also accounts for any quantization imprecision in the pixel data. The dithering may be performed on all bits of red color (e.g., 8 bits red) and all bits of blue color (8 bits blue). The dithering may be separately performed on two green colors. For example, the first green color may correspond to the MSBs of the green color of the input pixel data (e.g., 4 bits MSB green) while the second green color may correspond to the LSBs of the green color of the input pixel data (e.g., 4 bits LSB green). After dithering, the processed pixel data may be sent to a driving circuit (e.g., the driving circuit 270 shown in FIG. 2B) for the generation of PWM signals for various light emitters.

In particular embodiments, the image processing operation 2200 associated with a quadrilateral gamut may have certain advantages and disadvantages. One advantage is that the operation may be an expanded gamut. Hence, any color in the quadrilateral gamut can be expressed as a linear combination of four primary colors. However, the operation 2200 may require extra processing and may sometimes be computationally challenging to achieve. For example, the only green color that is separated into two primary colors due to the significant color shift in green color, blue color and red color, which both also experience certain degrees of color shift, may also be separated into additional primary colors (e.g., having 5 or 6 primary colors). However, computation in various processes in the image processing operation 2200 may be challenging when additional primary colors are added. Also, color compensation and warping 2210 may be designed with only three primary colors. Hence, color compensation and warping 2210 may need to be performed before three primary colors are converted to four primary colors. As a result, the primary color conversion and dithering for compensated pixel data may involve a very fast pixel clock. In addition, the multi-primary color dithering may also be associated with a significant overhead because the MSBs and the LSBs associated with the green colors are separately dithered.

Figure 2D:
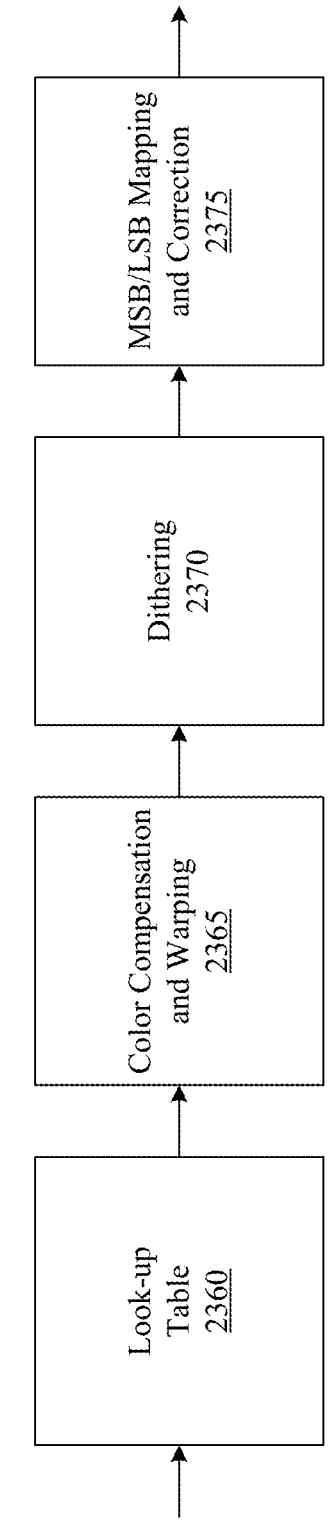
FIG. 2D illustrates another example image processing operation that is associated with processing pixel data for a display device.

FIG. 2D illustrates another example image processing operation 230 that is associated with processing pixel data for a display device. The image processing operation 230 may be performed by an image processing unit 275 shown in FIG. 2B. After receiving multiple sets of input pixel data (each set may correspond to a color value at a pixel location), the display device may convert the pixel data by a look-up table 2360. For instance, the input pixel data represents an original color coordinate in a first color coordinate space (such as the RGB space) is converted to points within the common gamut 2370. Hence, an original color coordinate that is beyond the common color gamut 2370 may be converted to an updated color coordinate within the common color gamut according to a mapping scheme. The mapping scheme may be a transformation process that maps points in one gamut to another gamut. For example, the points in the sRGB gamut may be mapped to the points in the common color gamut using a transformation process such as a linear transformation. The transformation may be performed under a constant-hue mapping operation. In other words, the transformation may not really change the perceived hue of the original color coordinate. The updated color coordinates may be in tristimulus values XYZ instead of RGB.

In one embodiment, the transformation process may be performed "on the fly." In other words, as input pixel data are received, a processor may use a stored transformation matrix to carry out a matrix multiplication to determine the updated color coordinates that are within the common gamut. In another embodiment, the transformation to a discrete number of values in the color space may be quantized and a look-up table 2360 may be stored in a memory. In one embodiment, the look-up table 2360 may be the same the look-up table 2215 in the operation 220. The look-up table 2360 may be a three-dimensional look-up table that includes calculated values of the matrix multiplication given different vectors of values of input color coordinates. For example, for a particular vector of RGB values, the look-up table 2360 may save the answer of the matrix multiplication of the transformation matrix multiplying the vector. The look-up table 2360 may reduce the time for matrix multiplication "on the fly" and may speed up the conversion process.

The updated pixel data that includes the updated color coordinates may then undergo a color compensation and warping process 2365 to generate compensated pixel data. The color compensation and warping process 2365 may be similar to the color compensation and warping process 2210. Hence, it may include various image processing for the perception of the human users. For example, color compensation may be performed based on user settings and/or to account for the dimensions of HMD or NED. Since the common gamut is also a triangular gamut that is defined by three primary colors, the color compensation and warping process 2365 may be performed after the conversion using the look-up table 2360, unlike the operation 220.

The display device may further process the updated pixel data by dithering 2370 to generate dithered pixel data. In the dithering 2370, a version of the updated pixel data may be used. The version may be the updated pixel data generated by the look-up table 2360 or the compensated pixel data if compensation and/or warping is performed. Dithering 2370 may be a vectorized dither operation that reduces the bit depths of the pixel data to match the capabilities of the light emitters. The input pixel data may be in the range of 8 to 10 bits, while the light emitters may be capable of displaying fewer bits. In one embodiment, unlike the image processing operation 220, the dithering 2370 may not separate the color value into two separate green colors corresponding to the MSBs and LSBs. Hence, data processing is significantly simplified.

The display device may also perform MSB/LSB mapping and correction 2375 to the updated pixel data to generate two outputs, one for the MSB light emitters and another for the LSB light emitters. Again, the MSB/LSB mapping and correction 2375 may be performed on a version of the updated pixel data. The version may be updated pixel data generated by the look-up table 2360, the compensated pixel data if compensation and/or warping 865 is performed, or the dithered pixel data if dithering 2370 is performed.

Figure 2E:
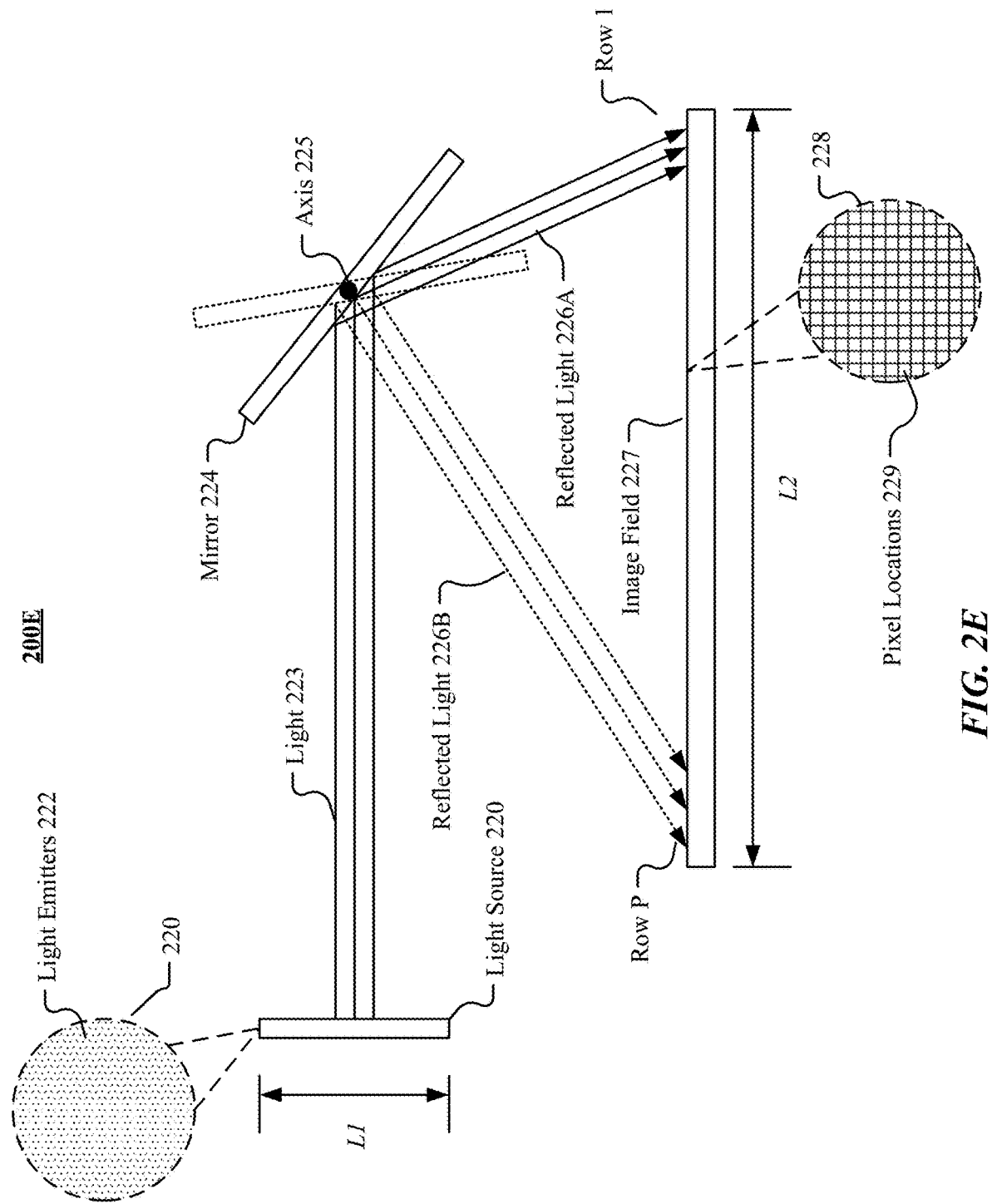
FIG. 2E illustrates an example scanning operation of the scanning waveguide display.

FIG. 2E illustrates an example scanning operation of a scanning waveguide display 200B. The light source 220 may include an array of light emitters 222 (as represented by the dots in inset) with multiple rows and columns. The light 223 emitted by the light source 220 may include a set of collimated beams of light emitted by each column of light emitters 222. Before reaching the mirror 224, the light 223 may be conditioned by different optical devices such as the conditioning assembly (not shown). The mirror 224 may reflect and project the light 223 from the light source 220 to the image field 227 by rotating about an axis 225 during scanning operations. The mirror 224 may be a microelectromechanical system (MEMS) mirror or any other suitable mirror. As the mirror 224 rotates about the axis 225, the light 223 may be projected to a different part of the image field 227, as illustrated by the reflected part of the light 226A in solid lines and the reflected part of the light 226B in dash lines.

In particular embodiments, the image field 227 may receive the light 226A-B as the mirror 224 rotates about the axis 225 to project the light 226A-B in different directions. For example, the image field 227 may correspond to a portion of the coupling element 218 or a portion of the decoupling element 206 in FIG. 2A. In particular embodiments, the image field 227 may include a surface of the coupling element 206. The image formed on the image field 227 may be magnified as light travels through the output waveguide 220. In particular embodiments, the image field 227 may not include an actual physical structure but include an area to which the image light is projected to form the images. The image field 227 may also be referred to as a scan field. When the light 223 is projected to an area of the image field 227, the area of the image field 227 may be illuminated by the light 223. The image field 227 may include a matrix of pixel locations 229 (represented by the blocks in inset 228) with multiple rows and columns. The pixel location 229 may be spatially defined in the area of the image field 227 with a pixel location corresponding to a single pixel. In particular embodiments, the pixel locations 229 (or the pixels) in the image field 227 may not include individual physical pixel elements. Instead, the pixel locations 229 may be spatial areas that are defined within the image field 227 and divide the image field 227 into pixels. The sizes and locations of the pixel locations 229 may depend on the projection of the light 223 from the light source 220. For example, at a given rotation angle of the mirror 224, light beams emitted from the light source 220 may fall on an area of the image field 227. As such, the sizes and locations of pixel locations 229 of the image field 227 may be defined based on the location of each projected light beam. In particular embodiments, a pixel location 229 may be subdivided spatially into subpixels (not shown). For example, a pixel location 229 may include a red subpixel, a green subpixel, and a blue subpixel. The red, green and blue subpixels may correspond to respective locations at which one or more red, green and blue light beams are projected. In this case, the color of a pixel may be based on the temporal and/or spatial average of the pixel's subpixels.

In particular embodiments, the light emitters 222 may illuminate a portion of the image field 227 (e.g., a particular subset of multiple pixel locations 229 on the image field 227) with a particular rotation angle of the mirror 224. In particular embodiment, the light emitters 222 may be arranged and spaced such that a light beam from each of the light emitters 222 is projected on a corresponding pixel location 229. In particular embodiments, the light emitters 222 may include a number of light-emitting elements (e.g., micro-LEDs) to allow the light beams from a subset of the light emitters 222 to be projected to a same pixel location 229. In other words, a subset of multiple light emitters 222 may collectively illuminate a single pixel location 229 at a time. As an example and not by way of limitation, a group of light emitter including eight light-emitting elements may be arranged in a line to illuminate a single pixel location 229 with the mirror 224 at a given orientation angle.

In particular embodiments, the number of rows and columns of light emitters 222 of the light source 220 may or may not be the same as the number of rows and columns of the pixel locations 229 in the image field 227. In particular embodiments, the number of light emitters 222 in a row may be equal to the number of pixel locations 229 in a row of the image field 227 while the light emitters 222 may have fewer columns than the number of pixel locations 229 of the image field 227. In particular embodiments, the light source 220 may have the same number of columns of light emitters 222 as the number of columns of pixel locations 229 in the image field 227 but fewer rows. As an example and not by way of limitation, the light source 220 may have about 1280 columns of light emitters 222 which may be the same as the number of columns of pixel locations 229 of the image field 227, but only a handful rows of light emitters 222. The light source 220 may have a first length L1 measured from the first row to the last row of light emitters 222. The image field 530 may have a second length L2, measured from the first row (e.g., Row 1) to the last row (e.g., Row P) of the image field 227. The L2 may be greater than L1 (e.g., L2 is 50 to 10,000 times greater than L1).

In particular embodiments, the number of rows of pixel locations 229 may be larger than the number of rows of light emitters 222. The display device 200B may use the mirror 224 to project the light 223 to different rows of pixels at different time. As the mirror 520 rotates and the light 223 scans through the image field 227, an image may be formed on the image field 227. In some embodiments, the light source 220 may also has a smaller number of columns than the image field 227. The mirror 224 may rotate in two dimensions to fill the image field 227 with light, for example, using a raster-type scanning process to scan down the rows then moving to new columns in the image field 227. A complete cycle of rotation of the mirror 224 may be referred to as a scanning period which may be a predetermined cycle time during which the entire image field 227 is completely scanned. The scanning of the image field 227 may be determined and controlled by the mirror 224 with the light generation of the display device 200B being synchronized with the rotation of the mirror 224. As an example and not by way of limitation, the mirror 224 may start at an initial position projecting light to Row 1 of the image field 227, and rotate to the last position that projects light to Row P of the image field 227, and then rotate back to the initial position during one scanning period. An image (e.g., a frame) may be formed on the image field 227 per scanning period. The frame rate of the display device 200B may correspond to the number of scanning periods in a second. As the mirror 224 rotates, the light may scan through the image field to form images. The actual color value and light intensity or brightness of a given pixel location 229 may be a temporal sum of the color various light beams illuminating the pixel location during the scanning period. After completing a scanning period, the mirror 224 may revert back to the initial position to project light to the first few rows of the image field 227 with a new set of driving signals being fed to the light emitters 222. The same process may be repeated as the mirror 224 rotates in cycles to allow different frames of images to be formed in the scanning field 227.

Figure 3B:
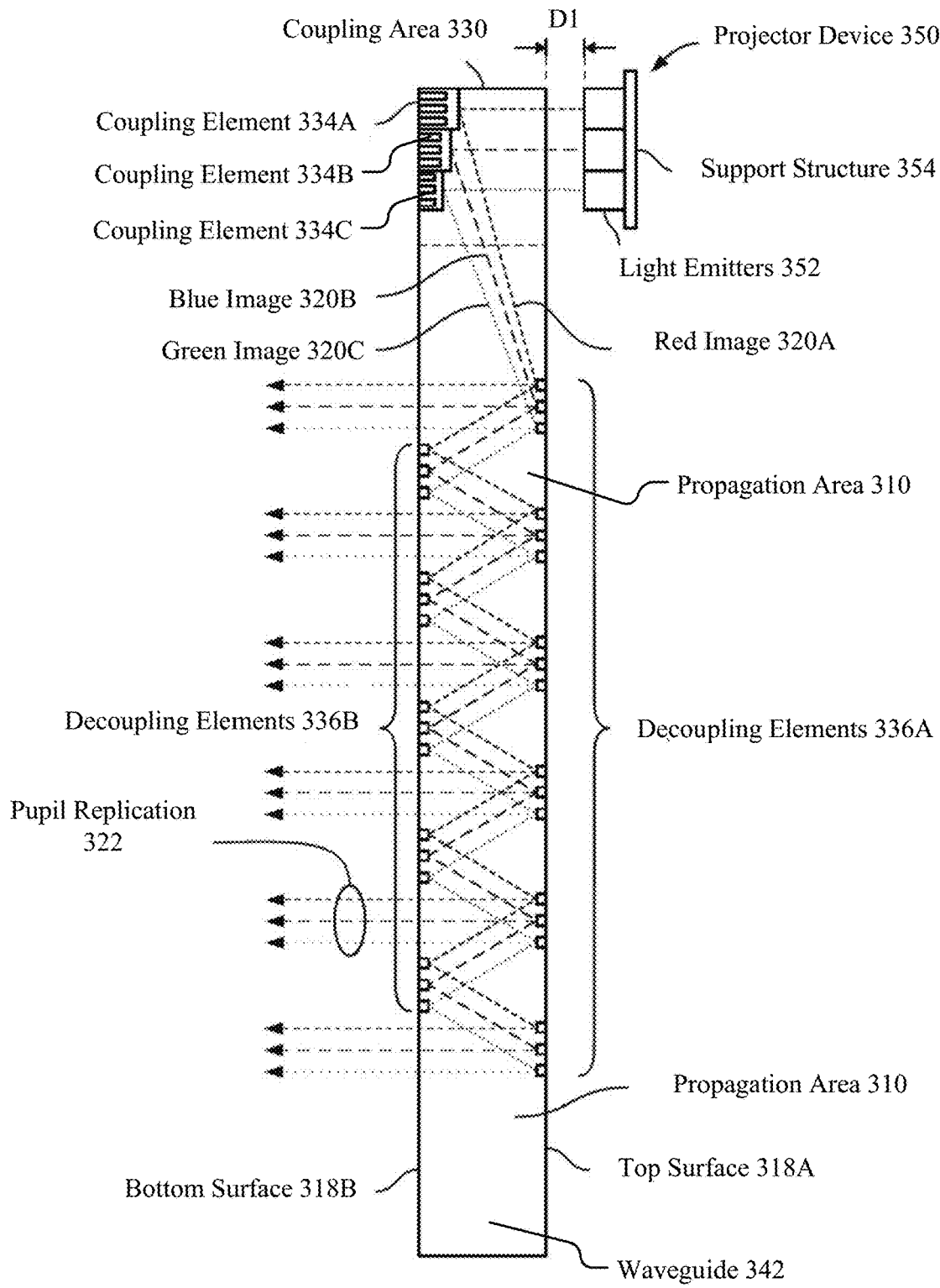
FIG. 3B illustrates an example waveguide configuration for the 2D micro-LED waveguide display.

FIG. 3A illustrates an example 2D micro-LED waveguide display 300A. In particular embodiments, the display 300A may include an elongate waveguide configuration 302 that may be wide or long enough to project images to both eyes of a user. The waveguide configuration 302 may include a decoupling area 304 covering both eyes of the user. In order to provide images to both eyes of the user through the waveguide configuration 302, multiple coupling areas 306A-B may be provided in a top surface of the waveguide configuration 302. The coupling areas 306A and 306B may include multiple coupling elements to receive image light from light emitter array sets 308A and 308B, respectively. Each of the emitter array sets 308A-B may include a number of monochromatic emitter arrays including, for example, but not limited to, a red emitter array, a green emitter array, and a blue emitter array. In particular embodiments, the emitter array sets 308A-B may further include a white emitter array or an emitter array emitting other colors or any combination of any multiple colors. In particular embodiments, the waveguide configuration 302 may have the emitter array sets 308A and 308B covering approximately identical portions of the decoupling area 304 as divided by the divider line 309A. In particular embodiments, the emitter array sets 308A and 308B may provide images to the waveguide of the waveguide configuration 302 asymmetrically as divided by the divider line 309B. For example, the emitter array set 308A may provide image to more than half of the decoupling area 304. In particular embodiments, the emitter array sets 308A and 308B may be arranged at opposite sides (e.g., 180° apart) of the waveguide configuration 302 as shown in FIG. 3B. In other embodiments, the emitter array sets 308A and 308B may be arranged at any suitable angles. The waveguide configuration 302 may be planar or may have a curved cross-sectional shape to better fit to the face/head of a user.

FIG. 3B illustrates an example waveguide configuration 300B for the 2D micro-LED waveguide display. In particular embodiments, the waveguide configuration 300B may include a projector device 350 coupled to a waveguide 342. The projector device 320 may include a number of light emitters 352 (e.g., monochromatic emitters) secured to a support structure 354 (e.g., a printed circuit board or other suitable support structure). The waveguide 342 may be separated from the projector device 350 by an air gap having a distance of D1 (e.g., approximately 50 μm to approximately 500 μm). The monochromatic images projected by the projector device 350 may pass through the air gap toward the waveguide 342. The waveguide 342 may be formed from a glass or plastic material. The waveguide 342 may include a coupling area 330 including a number of coupling elements 334A-C for receiving the emitted light from the projector device 350. The waveguide 342 may include a decoupling area with a number of decoupling elements 336A on the top surface 318A and a number of decoupling elements 336B on the bottom surface 318B. The area within the waveguide 342 in between the decoupling elements 336A and 336B may be referred as a propagation area 310, in which image light received from the projector device 350 and coupled into the waveguide 342 by the coupling element 334 may propagate laterally within the waveguide 342.

The coupling area 330 may include coupling elements (e.g., 334A, 334B, 334C) configured and dimensioned to couple light of predetermined wavelengths (e.g., red, green, blue). When a white light emitter array is included in the projector device 350, the portion of the white light that falls in the predetermined wavelengths may be coupled by each of the coupling elements 334A-C. In particular embodiments, the coupling elements 334A-B may be gratings (e.g., Bragg gratings) dimensioned to couple a predetermined wavelength of light. In particular embodiments, the gratings of each coupling element may exhibit a separation distance between gratings associated with the predetermined wavelength of light and each coupling element may have different grating separation distances. Accordingly, each coupling element (e.g., 334A-C) may couple a limited portion of the white light from the white light emitter array of the projector device 350 if white light emitter array is included in the projector device 350. In particular embodiments, each coupling element (e.g., 334A-C) may have the same grating separation distance. In particular embodiments, the coupling elements 334A-C may be or include a multiplexed coupler.

As illustrated in FIG. 3B, a red image 320A, a blue image 320B, and a green image 320C may be coupled by the coupling elements 334A, 334B, 334C, respectively, into the propagation area 310 and may begin to traverse laterally within the waveguide 342. A portion of the light may be projected out of the waveguide 342 after the light contacts the decoupling element 336A for one-dimensional pupil replication, and after the light contacts both the decoupling elements 336A and 336B for two-dimensional pupil replication. In two-dimensional pupil replication, the light may be projected out of the waveguide 342 at locations where the pattern of the decoupling element 336A intersects the pattern of the decoupling element 336B. The portion of the light that is not projected out of the waveguide 342 by the decoupling element 336A may be reflected off the decoupling element 336B. The decoupling element 336B may reflect all incident light back toward the decoupling element 336A. Accordingly, the waveguide 342 may combine the red image 320A, the blue image 320B, and the green image 320C into a polychromatic image instance which may be referred as a pupil replication 322. The polychromatic pupil replication 322 may be projected to the user's eyes which may interpret the pupil replication 322 as a full color image (e.g., an image including colors addition to red, green, and blue). The waveguide 342 may produce tens or hundreds of pupil replication 322 or may produce a single replication 322.

In particular embodiments, the AR/VR system may use scanning waveguide displays or 2D micro-LED displays for displaying AR/VR content to users. In order to miniaturize the AR/VR system, the display system may need to miniaturize the space for pixel circuits and may have limited number of available bits for the display. The number of available bits in a display may limit the display's color depth or gray scale level, and consequently limit the quality of the displayed images. Furthermore, the waveguide displays used for AR/VR systems may have nonuniformity problem cross all display pixels. The compensation operations for pixel nonuniformity may result in loss on image grayscale and further reduce the quality of the displayed images. For example, a waveguide display with 8-bit pixels (i.e., 256 gray level) may equivalently have 6-bit pixels (i.e., 64 gray level) after compensation of the nonuniformity (e.g., 8:1 waveguide nonuniformity, 0.1% dead micro-LED pixel, and 20% micro-LED intensity nonuniformity).

To improve the displayed image quality, displays with limited color depth or gray scale level may use spatio-temporal dithering to spread quantization errors to neighboring pixels and generate the illusion of increased color depth or gray scale level. To further increase the color depth or gray scale level, displays may generate a series of temporal subframe images with fewer gray level bits to give the illusion of a target image which has more gray level bits. Each subframe image may be dithered using spatio-temporal dithering techniques within that subframe image. The average of the series of subframe image may correspond to the image as perceived by the viewer. For example, for display an image with 8-bit pixels (i.e., 256 gray level), the system may use four subframe images each having 6-bit pixels (i.e., 64 gray level) to represent the 8-bit target image. As another example, an image with 8-bit pixels (i.e., 256 gray level) may be represented by 16 subframe images each having 4-bit pixels (i.e., 16 gray level). This would allow the display system to render images of more gray level (e.g., 8-bit pixels) with pixel circuits and supporting hardware for fewer gray levels (e.g., 6-bit pixels or 4-bit pixels), and therefore reduce the space and size of the display system.

Display panels (e.g., μLED panels) used by AR/VR systems may have dead pixels due to limitations of the state of art in manufacturing. The dead pixels may negatively impact display quality and user experience of the AR/VR systems. Particular embodiments of the system may hide dead pixels of display panels by modifying the image to be output by the display. For example, the system may use a mask including an array of scaling factors to alter the pixel values of the image in a pixel region containing the dead pixel position. The image after being modified and output by the display may cause the dead pixel of the display to be invisible or have reduced visibility than the image before the modification, and therefore provide better display quality and improved user experience.

In particular embodiments, the RGB display panels of an AR/VR system may operate independently and not share color data between the three display panels. In particular embodiments, for correcting or hiding the dead pixels, the system may use luminance correction methods to correct the luminance of the pixel values of each color channel without using the color information between different color channels. The dead pixels may be independently associated with any color channel of the display. In particular embodiments, the system may use a luminance mask to modify the images before outputting the images on the display. The modified images may have their pixels values being altered (e.g., brightened or dimmed) in the pixel region containing the dead pixel position. The images, after being modified and output by the display may cause the dead pixels of the display to have a lower visibility than the images without the modification. In particular embodiments, the system may modify the images by using a dithering algorithm (e.g., a spatial dithering algorithm such as Floyd-Steinberg dithering) or a luminance mask to alter the pixel values in a pixel region containing the dead pixel position, as will be described below.

Figure 4B:
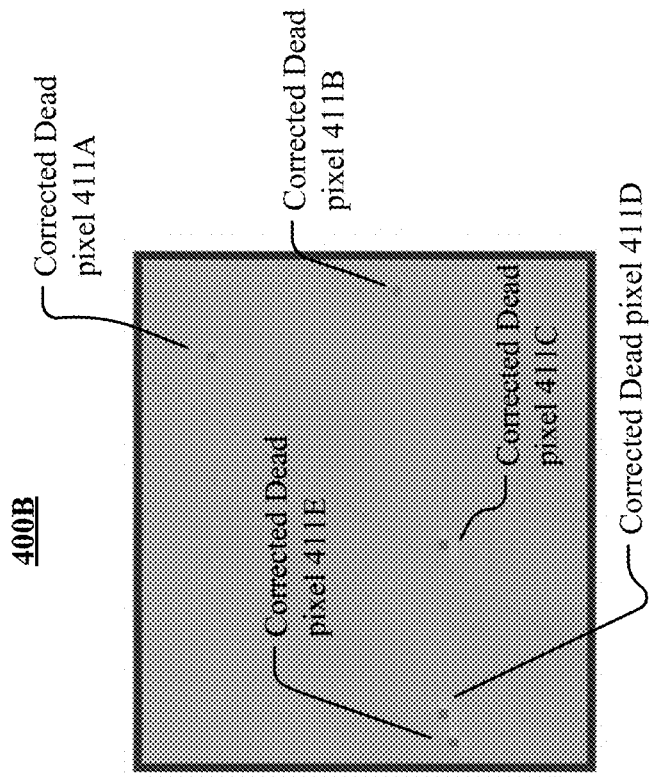
FIG. 4B illustrates an example image with corrected dead pixels using Floyd-Steinberg dithering.
Figure 4A:
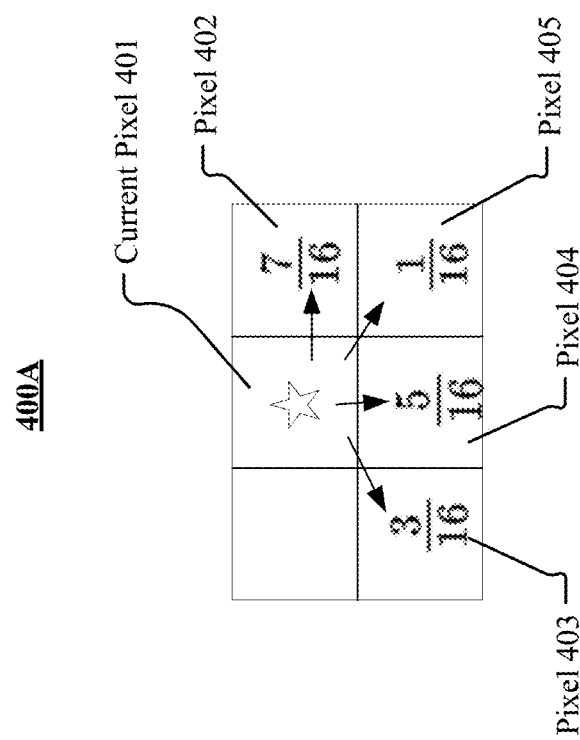
FIG. 4A illustrates an example process for hiding dead pixels using Floyd-Steinberg dithering.

FIG. 4A illustrates an example process 400A for hiding dead pixels using Floyd-Steinberg dithering. As an example and not by way of limitation, the system may use a scalar dithering algorithm (e.g., a Floyd-Steinberg dithering algorithm) to spread the pixel value at the dead pixel position to the neighboring pixels (e.g., the next pixel on the right, pixels below the dead pixel position) to reduce the visibility of the dead pixels. As shown in FIG. 4A, the Floyd-Steinberg dithering algorithm may propagate a dithering value (e.g., a pixel value, a quantization error) associated with a current pixel 401 to its neighboring pixels using a pre-determined set of dithering coefficients, as shown in FIG. 4A. The system may scan the image from left to right and top to bottom to process (e.g., quantize) each pixel value one by one. For a current pixel 401, the system may determine a dithering value, for example, a quantization error, to be spread onto neighboring pixels. The Floyd-Steinberg dithering algorithm may push 7/16 of the dithering value to the pixel 402 which is next to the current pixel 401 on the right and in the same row, push 3/16 of the dithering value to the pixel 403 which is in the next row and a former column to the current pixel 401, push 5/16 of the dithering value to the pixel 404 which is in the next row and the same column to the current pixel 401, and push 1/16 of the dithering value to the pixel 405 which is in the next row and next column to the current pixel 405.

FIG. 4B illustrates an example image 400B with corrected dead pixels (e.g., 411A, 411B, 411C, 411D) using Floyd-Steinberg dithering. In particular embodiments, for correcting a dead pixel, the system may access or receive a dead pixel position corresponding to the dead pixel and a corresponding target pixel value in the image to be displayed. Then, the system may set the dithered pixel value (e.g., the actual pixel value to be displayed) as zero for the pixel at the dead pixel position (since the dead pixel may emit no light). The Floyd-Steinberg dithering algorithm may determine a dithering value (e.g., based on the difference of the target pixel value and the dithered pixel value) equal to the target pixel value. The algorithm may dither a portion of the target pixel value to each of the four neighboring pixels as shown in FIG. 4A. As a result, the four neighboring pixels of the pixel at the dead pixel position may be brightened to maintain the correct average brightness to compensate for the dead pixel defect. The average brightness of the modified image in the region containing the dead pixel position may be substantially the same (e.g., within a threshold value) to the average brightness of the corresponding region of the image before the modification. As shown in FIG. 4B, the corrected dead pixels (e.g., 411A, 411B, 411C, 411D) may have a reduced visibility in the modified image as output by the display with dead pixels.

In particular embodiments, the system may include one or more dithering algorithms for propagating quantization errors spatially or/and temporally. For the systems that already include a Floyd-Steinberg dithering algorithm, the system may use the same dithering algorithm for correcting dead pixels without implementing separate dithering algorithms. The Floyd-Steinberg dithering algorithm may use a row buffer to store one or more dithering values and may effectively propagate the dithering values to the forward pixels along the scanning order. In particular embodiments, the system that uses the dithering algorithm for correcting dead pixels may correct any number of dead pixels at any locations of the display. For example, the system may use the dithering algorithm to correct a number of dead pixels at a number of arbitrary locations of the display. It is notable that the Floyd-Steinberg dithering algorithm is for example purpose only and the dithering algorithm is not limited thereto. For example, the dithering algorithm may be any suitable dithering algorithms with any suitable dithering coefficients that can propagate dithering values to surrounding or neighboring pixels.

In particular embodiments, instead of using a dithering algorithm, the system may generate and use a mask to modify the images to be output by the display to reduce the visibility of the dead pixels of the display. In particular embodiments, the mask for modifying the images may be a luminance mask for altering pixel values in a corresponding pixel region of the images in the luminance domain (without using the color information between different color channels). For correcting a particular dead pixel, the same luminance mask may be applied to all three color channels of the images in a corresponding pixel region containing the dead pixel position. The mask may be centered at the corresponding dead pixel position and have the same size with the pixel region. The size of the mask may be determined based on the likely minimum pixel distance between the dead pixels of the display. For example, if a display has a minimum pixel distance of 5 times of the pixel size, the system may generate a mask having a size of 5×5 pixels corresponding to a pixel region that contains no more than a single dead pixel.

In particular embodiments, the mask may be generated to minimize the mean-squared error over the support (e.g., real-valued functions being the subset of the domain containing elements that are not mapped to zero) of the mask based on a point spread function that is matched to human vision. As an example and not by way of limitation, the mask may be generated by solving an optimization equation as following:

$$\operatorname*{argmin}_{x}\|M(F\{x\}-F\{I\})\|^2 \qquad (1)$$

where, x is the scaling factor value of the mask, F{x} is a Fourier transform of the mask, M is a modulation transfer function of human eyes, I is an identity matrix. By solving the above optimization equation, the system may generate a luminance mask by minimizing the mean-squared error over the support of the mask based on a point spread function (which is the spatial domain version of the optical transfer function or modulation transfer function) that is matched to human vision. The mask may be circularly symmetric as determined by the point spread function of human vision.

Figures 5A, 5B:
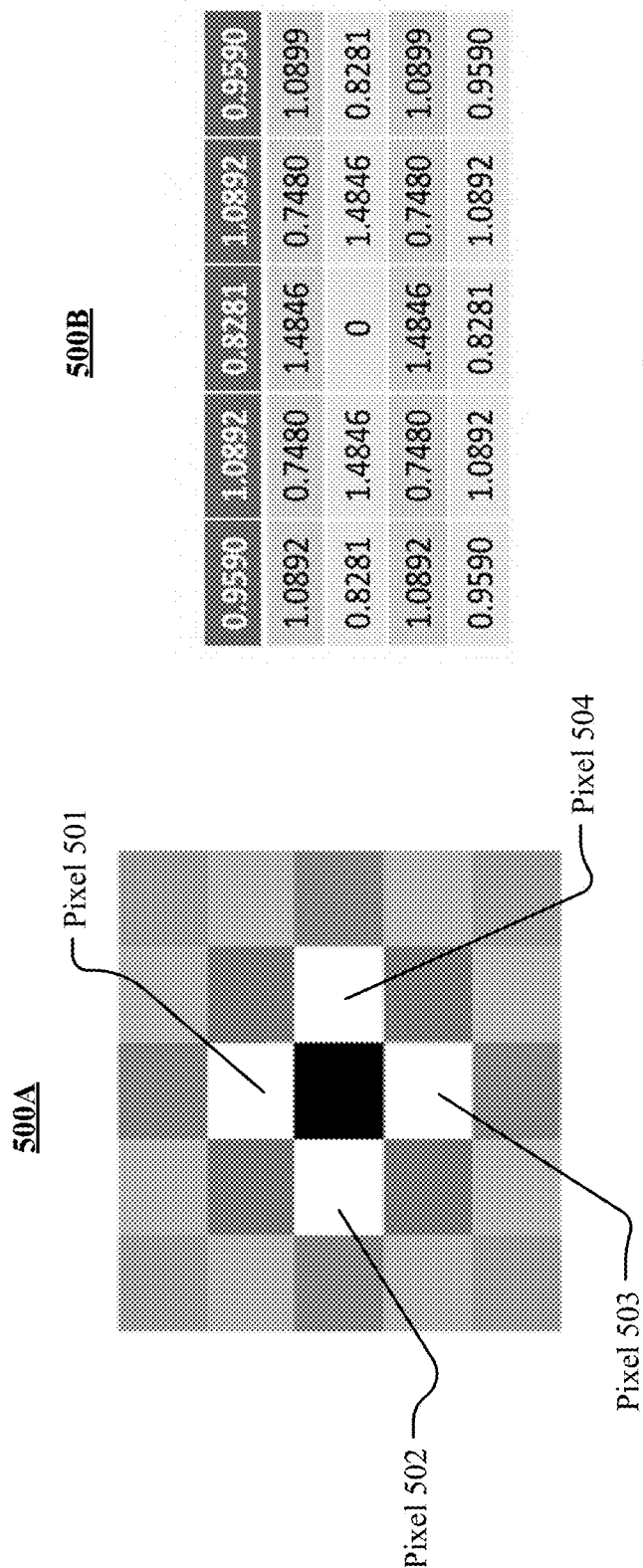
FIG. 5A illustrates an example luminance mask for correcting dead pixels.
FIG. 5B illustrates an example array of scaling factors corresponding to the mask in FIG. 5A.

FIG. 5A illustrates an example luminance mask 500A for correcting dead pixels. FIG. 5B illustrates an example array of scaling factors 500B corresponding to the mask 500A in FIG. 5A. As an example and not by way of limitation, the display of the AR/VR system may have a minimum dead pixel distance of 5 pixels. In other words, the display may have no more than one dead pixel in a 5×5 pixel region of the display. The system may generate a mask having a size of 5×5 pixels, as shown in FIG. 5A. The mask may include an array of scaling factors, as shown in FIG. 5B, for scaling pixel values of the image in the corresponding pixel region. The center of the mask corresponding to the dead pixel position may correspond to a scaling factor equal to zero. Some scaling factors in the array may be greater than 1 for brightening a corresponding pixel value or smaller than 1 for dimming a corresponding pixel value. The scaling factor values at the symmetric positions (e.g., pixels 501, 502, 503, and 504) with respect to the center pixel of the mask may have the same value (e.g., 1.4846 for pixels 501, 502, 503, and 504). In particular embodiments, the system may generate and optimize the luminance mask offline and store the generated mask in memory storage. At run time, the system may access the stored mask for modifying images to be displayed to reduce the visibility of the dead pixels of the display.

In particular embodiments, the system may apply the mask to an image in a pixel region containing the dead pixel position to alter the pixel values in that pixel region to reduce the visibility of the dead pixel. In particular embodiments, the system may first scale all pixel values of the image by an overall scaling factor β which is less than 1 (e.g., 0.8) to allow the pixel values to have headroom for later scaling process by the scaling factors of the mask. As shown in the example mask in FIGS. 4A-4B, one or more scaling factors in the mask may be greater than 1 (e.g., the scaling factors equal to 1.4846 in FIG. 5B). When a large pixel value (e.g., close to the maximum pixel value) is multiplied by a scaling factor greater than 1, the modified pixel value may be greater than the maximum pixel value supported by the display. Scaling the pixel values of the whole image by an overall scaling factor (e.g., 0.8) may allow the pixel values to have appropriate headroom (e.g., 20% of the maximum pixel value for the overall scaling factor of 0.8) although the image may have reduced overall brightness (e.g., 20% loss for the overall scaling factor of 0.8).

In particular embodiments, for modifying the image to be displayed, the system may access a dead pixel position corresponding to a dead pixel of the display. The system may access an image to be displayed and modify the image by applying a mask to a pixel region of the image containing a particular pixel value. The mask and the corresponding pixel region may be centered at the dead pixel position. As described above, the mask may include an array of scaling factors for scaling pixels values in the pixel region. The array of scaling factors may be configured to alter (e.g., brighten or dim) one or more of the pixel values surrounding the particular pixel value corresponding to the dead pixel position. For applying the mask to the pixel region, the system may access each pixel value within the pixel region of the image and access a corresponding scaling factor from the array of scaling factors of the mask. Then, the system may determine a modified pixel value by multiplying that pixel value by the corresponding scaling factor accessed from the array of scaling factors. The system may repeat this process to determine each modified pixel value in the pixel region containing the dead pixel position.

In particular embodiments, when the image includes multiple dead pixels, the system may repeatedly apply the same mask to each pixel region containing a dead pixel position to alter the pixel values around the dead pixel position. The same mask may be applied to all three color channels (e.g., RGB) of the image. After all dead pixels being corrected in the image, the system may cause the modified image to be output by the display. As a result, the modified image as output by the display may cause the dead pixels of the display to have a lower visibility level than the images without modification. In particular embodiments, although the pixel values of the image may have been scaled down by the overall scaling factor before applying the mask, the result of the modified pixel value may still be greater than the maximum pixel value supported by the display hardware. The system may clip the modified pixel values to a normalized range of [0, 1] corresponding to the maximum pixel value supported by the display before sending the image to the display. It is notable that the minimum dead pixel distance of the display as a condition for applying a luminance mask with a corresponding size is for example purpose only. The application of the luminance mask is not limited to the displays having a corresponding minimum dead pixel distance. Even if a display does not satisfy the minimum dead pixel distance corresponding the mask size for all dead pixels, the mask may still be applied to that display to correct a subset of the dead pixels. For example, a display may have some dead pixels having a minimum dead pixel distance smaller than 5 pixels. The mask having a size of 5×5 pixels may still be applied to the display to correct the dead pixels that have a distance greater than 5 pixels. It is notable that the mask size of 5×5 pixels is for example purpose only and the mask size is not limited thereto. For example, the mask may have a size of N×N pixels, wherein N is any suitable integer number.

Figure 6A:
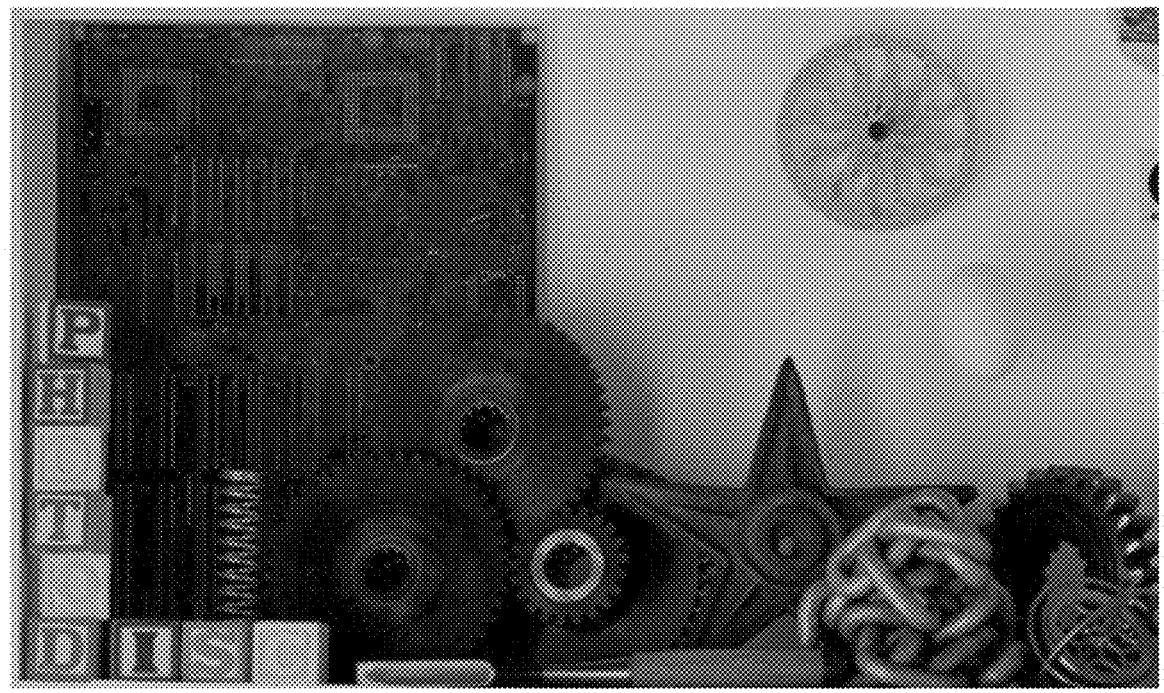
FIG. 6A illustrates an example image with uncorrected dead pixels.
Figure 6B:
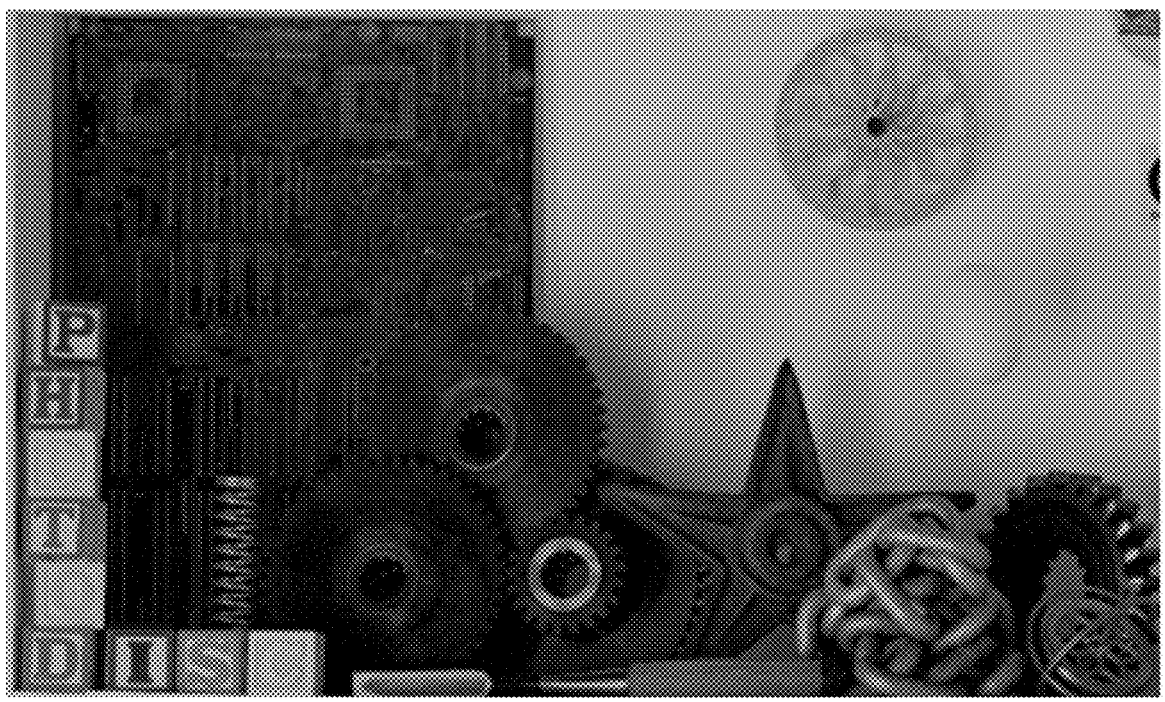
FIG. 6B illustrates an example image with dead pixels being corrected using a luminance mask.
Figure 6C:
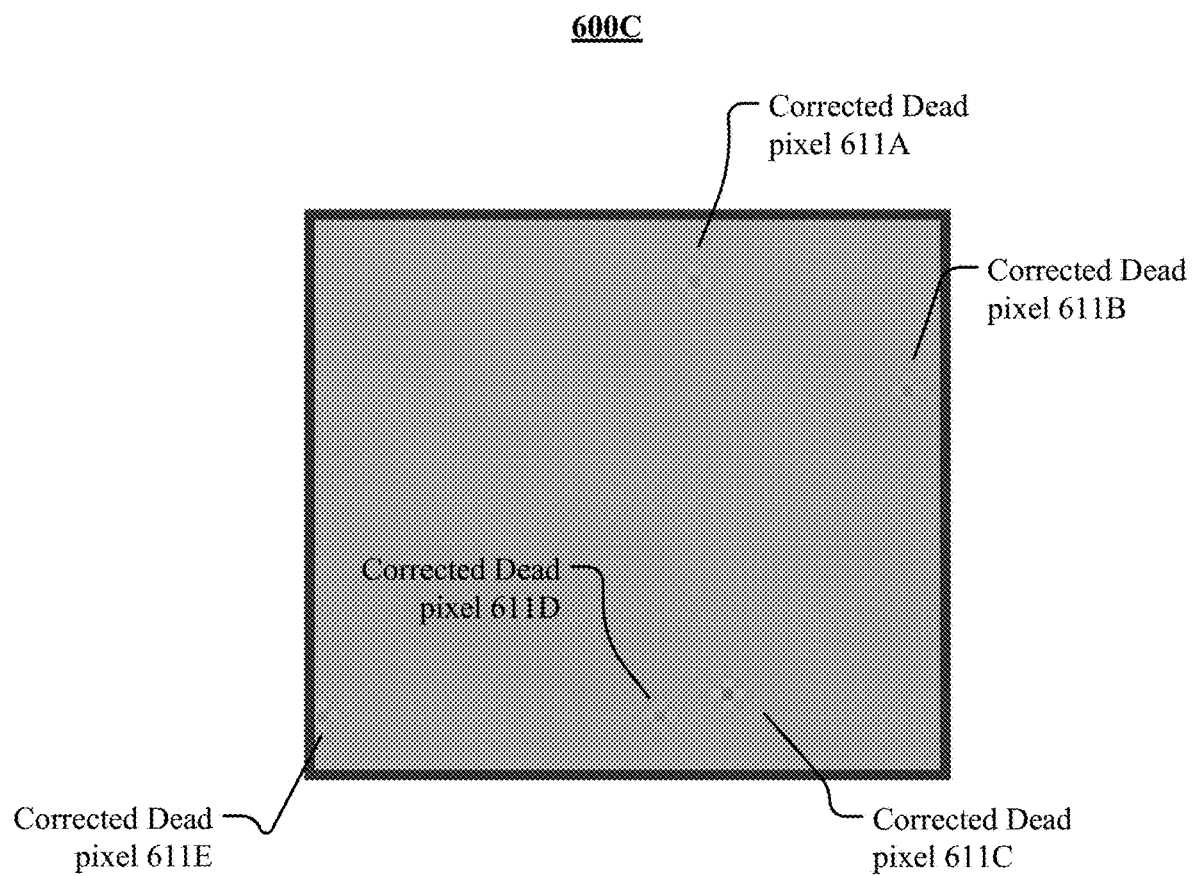
FIG. 6C illustrates an example image portion with corrected dead pixels.

FIG. 6A illustrates an example image with uncorrected dead pixels. FIG. 6B illustrates an example image with dead pixels being corrected using a luminance mask. FIG. 6C illustrates an example image portion with corrected dead pixels (e.g., 611A-611E). As shown from FIGS. 6B and 6C, the system may effectively reduce the visibility of the dead pixels by applying the luminance mask to the pixel regions of the image containing respective dead pixel positions. In particular embodiments, the modified image may maintain a correct average brightness in the pixel region containing the dead pixel position to compensate for the dead pixel defect of the display. For example, the image after being modified may have a first average brightness in the pixel region within a threshold range with respect to a second average brightness of that pixel region of the image before being modified. In particular embodiments, by using the luminance mask, the system may correct the dead pixels without using a line buffer or row buffer as in the dithering algorithms. Applying a mask with a size of N×N pixels may need N×N−1 multiplication operations. The altered pixel values may be any pixel in the pixel region containing the dead pixel position and may not be limited to the forward and downward pixels of the current pixels as in the Floyd-Steinberg dithering algorithm. As a result, the modified image by the luminance mask may not have temporal artifacts, and therefore provide better display quality and improved user experience.

In particular embodiments, the display (e.g., an OLED display, a micro-LED display) of the AR/VR system may have larger red and blue pixels than green pixels. As an example and not by way of limitation, the display may have a larger number of green pixels than the red pixels or blue pixels while the red and blues pixels may have greater size than the green pixels. Each red pixel and each blue pixel may be surrounded by four respective green pixels. In particular embodiments, the systems, methods, and processes for correcting dead pixels may be applicable to displays with larger red and blue pixels. In particular embodiments, the corrected dead pixels (e.g., large red or blue pixels) may have reduced visibility to human eyes after being corrected by the mask matched to the point spread function of the human vision. In particular embodiments, the system may effectively correct dead pixels for displays for binocular vision.

In particular embodiments, the image may be modified for correcting dead pixels during one or more execution steps of a graphic pipeline implemented on a display engine. In particular embodiments, the graphic pipeline may include steps including, for example, but not limited to, warping one or more surfaces associated with the image, determining one or more pixel values of the image by sampling a plurality of texels, correcting one or more distortions of the image, propagating, by one or more spatial or temporal dithering processes, quantization errors of the image spatially or/and temporally. In particular embodiments, the image may be modified using the luminance mask for dead pixel correction before being processed by the one or more spatial or/and temporal dithering processes for propagating quantization errors.

Figure 7:
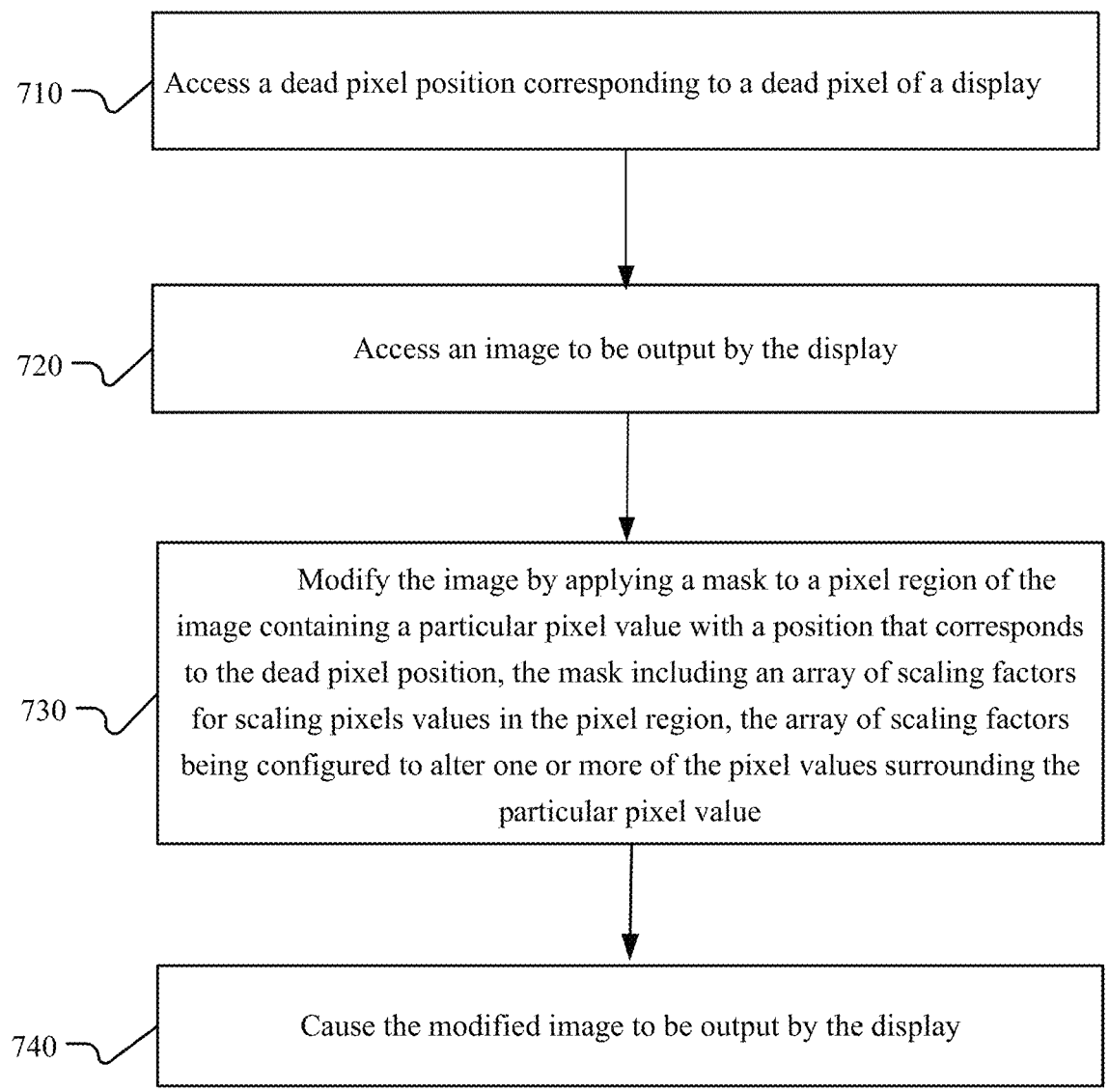
FIG. 7 illustrates an example method for correcting dead pixels using a luminance mask.

FIG. 7 illustrates an example method 700 for correcting dead pixels using a luminance mask. The method 700 may begin at step 710, where the system may access a dead pixel position corresponding to a dead pixel of a display. At step 720, the system may access an image to be output by the display having one or more dead pixels. At step 730, the system may modify the image by applying a mask to a pixel region of the image containing a particular pixel value with a position that corresponds to the dead pixel position. The mask may include an array of scaling factors for scaling pixels values in the pixel region. The array of scaling factors may be configured to alter one or more of the pixel values surrounding the particular pixel value corresponding to the dead pixel position. At step 740, the system may cause the modified image to be output by the display.

In particular embodiments, the mask may be generated by minimizing a mean-squared error caused by the dead pixel as modulated by a point spread function matched to human vision. In particular embodiments, the image after being modified may have a first average brightness in the pixel region being within a threshold range with respect to a second average brightness of the pixel region of the image before being modified. In particular embodiments, the mask may be circular symmetric as determined by the point spread function matched to human vision. In particular embodiments, the modified image may cause the dead pixel of the display to have a lower visibility level than the image before being modified. In particular embodiments, the array of scaling factor may be configured to brighten or dim one or more of the pixels values surrounding the particular pixel value corresponding to the dead pixel position.

In particular embodiments, the system may scale each pixel value of the image by an overall scaling factor before applying the luminance mask to the image. In particular embodiments, the overall scaling factor may be equal to 0.8 and the mask may include a 5×5 array of scaling factors. In particular embodiments, the mask may be applied to the pixel region by: accessing each pixel value within the pixel region of the image, accessing a corresponding scaling factor from the array of scaling factors, and determining a modified pixel value by multiplying that pixel value by the corresponding scaling factor accessed from the array of scaling factors of the mask. In particular embodiments, the system may clip the modified pixel value to a normalized range of [0, 1]. In particular embodiments, the pixel region of the image may be centered at the dead pixel position and the mask may have a same size to the pixel region containing the dead pixel position. In particular embodiments, the mask may include a center scaling factor being equal to zero in a center position of the mask and the center scaling factor may be applied to the dead pixel position of the image.

In particular embodiments, the image may be modified by one or more processes of a graphic pipeline implemented on a display engine. The graphic pipeline may include one or more steps of: warping one or more surfaces associated with the image, determining one or more pixel values of the image by sampling a plurality of texels, correcting one or more distortions of the image, or propagating, by one or more spatial or temporal dithering processes, quantization errors of the image spatially or temporally. In particular embodiments, the image may be modified before being processed by one or more spatial or temporal dithering processes for propagating quantization errors.

In particular embodiments, the dead pixel of the display may be associated with a color channel of RGB color channels of the display and the mask may be applied to each color channel of the RGB color channels. In particular embodiments, the dead pixel of the display may be a green pixel associated with a green color channel, and the green pixel may have a size smaller than pixels of red and blue color channels. In particular embodiments, the dead pixel of the display may be a red or blue pixel and the dead pixel may have a larger size than pixels of a green color channel. In particular embodiments, the display may be a micro-LED display having a single dead pixel within a display region corresponding a size of the mask. In particular embodiments, the system may access three pixel correction matrixes each comprising an array of second scaling factors for scaling pixel values of an associated color channel of the image for correcting pixel non-uniformity of the display. The system may combine the mask into each pixel correction matrix by multiplying each mask value in the mask to an associated second scaling factor of that pixel correction matrix. The mask value and the associated second scaling factor may be associated with the same pixel. In particular embodiments, the system may apply the three pixel correction matrixes to respective color channels of the image by multiplying each matrix value to a corresponding pixel value of the image to correct pixel non-uniformity and the dead pixel using the same process and at the same time.

Particular embodiments may repeat one or more steps of the method of FIG. 7, where appropriate. Although this disclosure describes and illustrates particular steps of the method of FIG. 7 as occurring in a particular order, this disclosure contemplates any suitable steps of the method of FIG. 7 occurring in any suitable order. Moreover, although this disclosure describes and illustrates an example method for correcting dead pixels using a luminance mask including the particular steps of the method of FIG. 7, this disclosure contemplates any suitable method for correcting dead pixels using a luminance mask including any suitable steps, which may include all, some, or none of the steps of the method of FIG. 7, where appropriate. Furthermore, although this disclosure describes and illustrates particular components, devices, or systems carrying out particular steps of the method of FIG. 7, this disclosure contemplates any suitable combination of any suitable components, devices, or systems carrying out any suitable steps of the method of FIG. 7.

Display panels (e.g., μLED panels) used by AR/VR systems may have some dead pixels due to limitations of the state of art in manufacturing. The dead pixels may negatively impact display quality and user experience of the AR/VR systems. Particular embodiments of the system may hide dead pixels of display panels by modifying the images to be output by the display by applying a single luminance mask on all three color channels. To further improve the display quality and reduce the visibility of the dead pixels, particular embodiments of the system may use a set of three masks for altering the pixel values of respective three color channels of the image. Each mask of the set of three mask may include an array of scaling factors to alter the pixel values of an associated color channel of the image in a pixel region containing the dead pixel position. The images after being modified and output by the display may cause the dead pixels of the display to be invisible or have reduced visibility than the images without modification, and therefore provide better display quality and improved user experience for the AR/VR systems.

In particular embodiments, the opponent color space may be a color space corresponding to how colors are perceived by human vision (which is not well represented by the RGB color space). In particular embodiments, the opponent color space may include three elements as represented in the following equation:

$$\begin{bmatrix} L \\ O_1 \\ O_2 \end{bmatrix} = \begin{bmatrix} 1 & 1 & 1 \\ -1 & 1 & 0 \\ -1 & -1 & 1 \end{bmatrix} \begin{bmatrix} R \\ G \\ B \end{bmatrix} \quad (2)$$

where, L, $O_1$, and $O_2$ are the three elements of the opponent color space, R, G, and B are the color elements of the RGB color space. In other words, L may correspond to the luminance change (R+G+B), $O_1$ may correspond to a red-green difference channel (G-R), and $O_2$ may correspond to a blue-yellow different channel (B-Y) or (B-(R+G)). In particular embodiments, the opponent color space may be represented in the following equation:

$$\begin{bmatrix} L \\ O_1 \\ O_2 \end{bmatrix} = \begin{bmatrix} 0.2814 & 0.6938 & 0.0638 \\ -0.0917 & 0.1458 & -0.0250 \\ -0.0930 & -0.2529 & 0.4665 \end{bmatrix} \begin{bmatrix} R \\ G \\ B \end{bmatrix} \quad (3)$$

where, L, $O_1$, and $O_2$ are the three elements of the opponent color space, R, G, and B are the color elements of the RGB color space. It is notable that the opponent color spaces as represented by Equations (2) and (3) are for example purpose only and the opponent color space is not limited thereto. For example, the opponent color space used in the optimization process may have any suitable coefficients for transforming the RGB color space to the opponent color space.

In particular embodiments, for correcting a dead pixel of a particular color channel, the system may use a set of three masks for altering the pixel value of three color channels of the image, respectively (instead of applying the same mask to all three color channels as described in earlier section of this disclosure). The system may generate three sets of masks including a first set of masks for red dead pixels, a second set of masks for green dead pixels, and a third set of masks for blue dead pixels. Each set of masks may include three masks corresponding to three color channels. The masks may be generated to minimize the mean-squared error caused by the dead pixel in an opponent color space as modulated by the modulation transfer function (MTF) of the display and the modulation transfer function (MTF) of the human eyes. In particular embodiments, the system may generate the three sets of masks by solving an optimization problem as represented by the following equation:

$$\underset{x}{\operatorname{argmin}} \| W_1 W_2 C(F\{x - I\}) \|^2 \quad (4)$$

where, x is the scaling factor value of the mask, I is the identify matrix, F{ } is the Fourier transform in an RGB color space, C is a color space transform for transforming an RGB color space into an opponent color space, $W_1$ is a filter in the opponent color space corresponding to a first modulation transfer function of human eyes, and $W_2$ is a filter in the opponent color space corresponding to a second modulation transfer function (MTF) of the display system. The modulation transfer function (MTF) of the display may account for the blurring effect of the display. By solving the optimization problem, the system may generate three sets of masks by minimizing a mean-squared error caused by the dead pixel in an opponent color space as modulated by the modulation transfer function (MTF) of the display and human eyes.

In particular embodiments, the system may generate the three sets of masks by solving an optimization problem as represented by the following equation:

$$\underset{x}{\operatorname{argmin}} \| W_1 C(W_2 F\{x\} - F\{I\}) \|^2 \quad (5)$$

where, x is the scaling factor value of the mask, I is the identify matrix, F{ } is the Fourier transform in an RGB color space, C is a color space transform for transforming an RGB color space into an opponent color space, $W_1$ is a filter in the opponent color space corresponding to a first modulation transfer function of human eyes, and $W_2$ is a filter in the opponent color space corresponding to a second modulation transfer function (MTF) of the display system. In Equation (3), the $W_2$ may be applied to the Fourier transform of the mask before subtracting the mask to the Fourier transform of the identify matrix I. The optimized masks may be generated by solving either Equation (4) or Equation (5) to minimize a mean-squared error caused by the dead pixel in an opponent color space as modulated by the modulation transfer function (MTF) of the display. By considering the MTF of the display and human vision during the optimization process, the system may generate the optimized masks which allow the dead pixels to have lower visibility as displayed by the display and as perceived by human eyes.

In particular embodiments, the system may solve the optimization problem as represented by Equations (4) or (5) under a constraint condition for the mask value range as represented by the following expression:

$$\beta - 1 \leq x \leq \beta \quad (6)$$

where, $\beta$ is an overall scaling factor for scaling down all pixel values of the image (e.g., before applying the set of three masks for correcting dead pixels) to allow the pixel values to have enough headroom (e.g., 20% headroom for $\beta=0.8$). The overall scaling factor $\beta$ may correspond to the peak brightness reduction of the image. By solving the optimization equations under this constraint condition, the system may generate optimized masks having scaling factors values that allow the modified pixel value of the image to be no greater than the maximum pixel values as supported by the display. Consequently, the system may modify the image by directly applying the set of three masks to the three color channels without clipping the modified pixel values to the normalized range of [0, 1] after the modification.

In particular embodiments, the system may modify the images to be output by the display by applying a set of three masks to the three color channels of the image. The masks may have pre-determined size and may be centered at the dead pixel position. The size of the masks may be determined based on the likely minimum pixel distance of the dead pixels of the display. For example, if a display has a minimum pixel distance of 5 times of a pixel size (e.g., a pixel length along the X or Y dimension), the system may generate masks having a size of 5×5 pixels which may correspond to a pixel region that contains a single dead pixel. In particular embodiments, the mask may be generated to minimize the mean-squared error over the support (i.e., real-valued functions being the subset of the domain containing elements that are not mapped to zero) of the mask based on a point spread function that is matched to human vision and the modulation transfer function (MTF) of the display. The masks may be circularly symmetric as determined by the point spread function of human vision. As an example and not by way of limitation, each mask may include an N×N array of scaling factors corresponding to an N×N pixel array. It is notable that the minimum dead pixel distance of the display for applying masks with a corresponding size is for example purpose only. The application of the masks is not limited to the displays having a corresponding minimum dead pixel distance. Even if a display does not satisfy the minimum dead pixel distance corresponding the mask size, the masks may still be applied to that display to correct a subset of the dead pixels. For example, a display may have some dead pixels having a minimum dead pixel distance smaller than 5 pixels. The masks having a size of 5×5 pixels may still be applied to the display to correct the dead pixels that have a distance greater than 5 pixels.

Figure 8A:
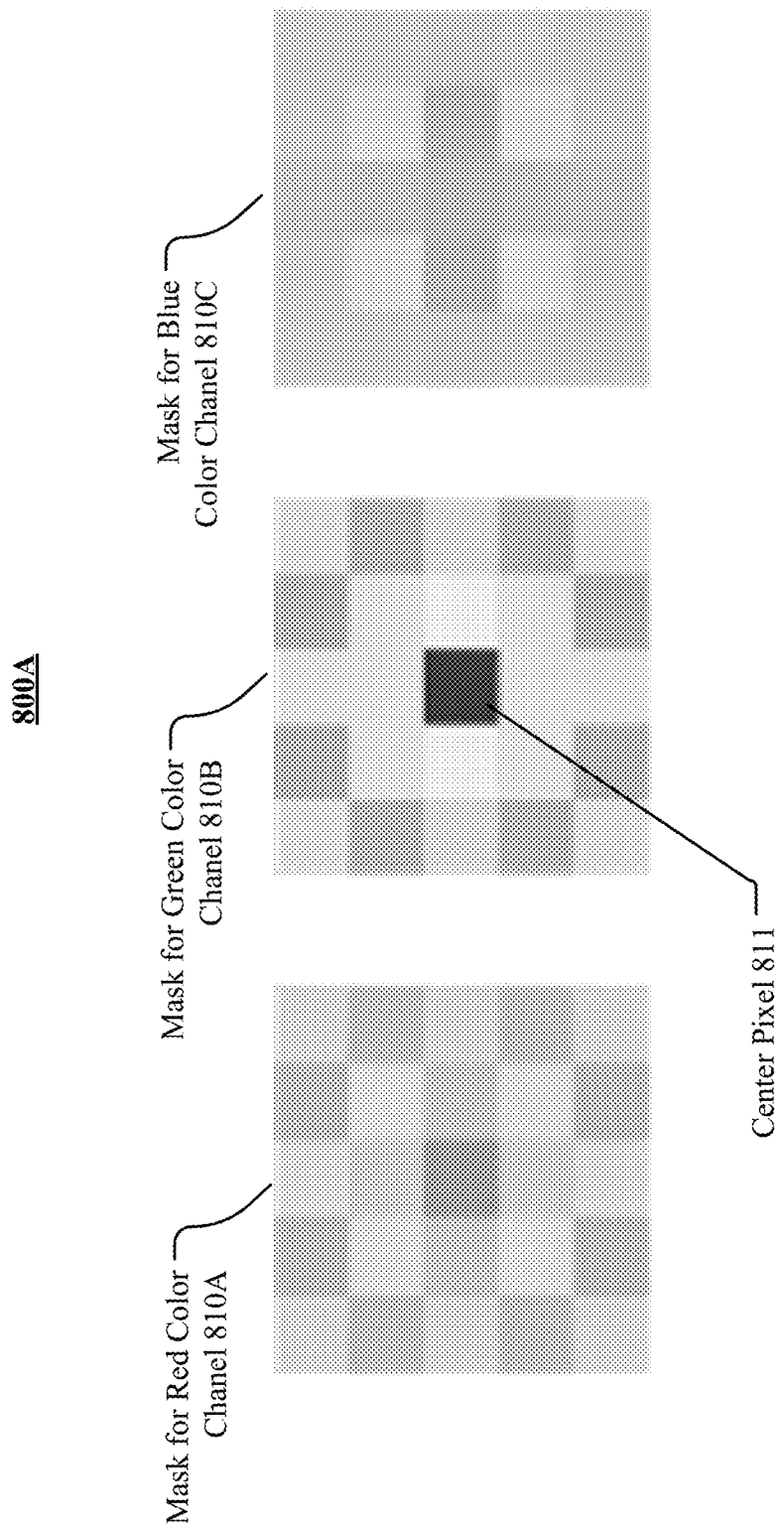
FIG. 8A illustrates an example set of three masks for correcting a green dead pixel.

FIG. 8A illustrates an example set of three masks 810A, 810B, and 810C for correcting a green dead pixel. In particular embodiments, the system may generate three sets of masks for correcting dead pixels of three color channels. Each set of masks may include three masks for altering the pixel values of the image in three color channels, respectively. As an example and not by way of limitation, the system may generate a set of three masks 810A, 810B, and 810C, as shown in FIG. 8A, for correcting dead pixels of a green color channel. The set of three masks 810A, 810B, and 810C may correspond to a pixel region including an array of 5×5 pixels. The set of three masks 810A, 810B, and 810C may be applied to a corresponding pixel region of the image in respective color channels. For example, the mask 810A may be applied to the red color channel of the image for altering the red pixel values of the image in the corresponding pixel region containing the dead pixel position. The mask 810B may be applied to the green color channel of the image for altering the green pixel values of the image in the corresponding pixel region containing the dead pixel position. The mask 810C may be applied to the blue color channel of the image for altering the blue pixel values of the image in the corresponding pixel region containing the dead pixel position. It is notable that, although the dead pixel in this example is only in the green color channel, the pixel values of all three color channels of the images may be altered by respective masks. This is because the optimization of the masks are performed in the opponent color space (L, $O_1$, $O_2$) for human vision perception. To adjust or alter any component value (e.g., L, $O_1$, or $O_2$) of the opponent color space, two or more components of the RGB color space may need to be altered or adjusted correspondingly.

FIG. 8B illustrates example mask values for the set of three masks 810A, 810B, and 810C for correcting a green dead pixel. It is notable that the mask values as shown in FIG. 8B are not the scaling factor values that are directly multiplied by the pixel values. Instead, for a mask value x, the system may determine a corresponding scaling factor (1−x) by subtracting the mask value x from 1. The system may multiply the corresponding pixel values by the scaling factor of (1−x). For example, the first mask 810A for the red color channel may have a center mask value of zero. The corresponding center pixel of the red color channel may be multiplied by (1-0) and therefore may have no change by this mask value. As another example, the second mask 810B for the green color channel may have a center mask value of 1. The corresponding value of the center pixel of the green color channel, which corresponds to the dead pixel, may be multiplied by (1-1) and therefore may have zero value as a result. As another example, the third mask 810C for the blue color channel may have a center mask value of 0. The corresponding value of the center pixel of the blue color channel may be multiplied by (1-0) and therefore may have its value unchanged. Similarly, for applying each mask of the set of three masks to a corresponding color channel, the system may access each mask value x and determine a corresponding scaling factor by (1−x) which will be multiplied by the corresponding pixel value to be altered.

Comparing the mask values between the set of three masks 810A, 810B, and 810C, which are for correcting the dead pixels of green color channel, the mask 810B for the green color channel may have relative larger deviation amplitudes from 1 with respect to the other two masks 810A and 810C. In other words, for correcting dead pixels of the green color channel, the pixel values of the green color channel may have greater changes than those of the red and blue color channels. In this example, the pixel value for the dead green pixel may be zero as altered by the corresponding mask value 1 (and the scaling factor of (1-1)). The pixel value for the red and blue pixel at the dead pixel position may be unchanged. All other pixel values in the mask region may be altered respectively based on the corresponding mask values to compensate for the dead pixel defect. As a result, the modified image after being output by the display may cause the green dead to have reduced visibility.

FIG. 8C illustrates example mask values for a set of three masks 820A, 820B, and 820C for correcting a red dead pixel. In this example, the first mask 820A for the red color channel may have a center mask value of 1. The corresponding center pixel of the red color channel, which is the dead pixel, may be multiplied by (1-1) and therefore may be zero as a result. The second mask 820B for the green color channel may have a center mask value of 0. The corresponding value of the center pixel of the green color channel may be multiplied by (1-0) and therefore may have its value unchanged. The third mask 820C for the blue color channel may have a center mask value of 0. The corresponding value of the center pixel of the blue color channel may be multiplied by (1-0) and therefore may have its value unchanged. Comparing the mask values between the set of three masks 820A, 820B, and 820C, which are for correcting the red dead pixels, the mask 810A for the red color channel may have relative larger deviation amplitudes from 1 with respect to the other two masks 820B and 810C. In other words, for correcting red dead pixels, the pixel values of the red color channel may have greater changes than those of the green and blue color channels. In this example, the pixel value for the red dead pixel may be zero as altered by the corresponding mask value 1 (and the scaling factor of (1-1)). The pixel value for the green and blue pixel at the dead pixel position may be unchanged. All other pixel values in the mask region may be altered respectively based on the corresponding mask values to compensate for the dead pixel defect. As a result, the modified image after being output by the display may cause the red dead pixel to have reduced visibility.

FIG. 8D illustrates example mask values for a set of three masks 830A, 830B, and 830C for correcting a blue dead pixel. In this example, the first mask 830A for the red color channel may have a center mask value of 0. The corresponding center pixel of the red color channel may be multiplied by (1-0) and therefore may have it value unchanged. The second mask 820B for the green color channel may have a center mask value of 0. The corresponding value of the center pixel of the green color channel may be multiplied by (1-0) and therefore may have its value unchanged. The third mask 820C for the blue color channel may have a center mask value of 1. The corresponding value of the center pixel of the blue color channel, which corresponds to the dead pixel, may be multiplied by (1-1) and therefore may be zero as a result. Comparing the mask values between the set of three masks 830A, 830B, and 830C, which are for correcting the blue dead pixels, the mask 830C for the blue color channel may have relative larger deviation amplitudes from 1 with respect to the other two masks 830A and 830B. In other words, for correcting blue dead pixels, the pixel values of the blue color channel may have greater changes than those of the red and green color channels. In this example, the pixel value for the blue dead pixel may be zero as altered by the corresponding mask value 1 (and the scaling factor of (1-1)). The pixel value for the red and green pixel at the dead pixel position may be unchanged. All other pixel values in the mask region may be altered respectively based on the corresponding mask values to compensate for the dead pixel defect. As a result, the modified image after being output by the display may cause the blue dead pixel to have reduced visibility.

Comparing the three masks of 810A, 820B, and 830C, the mask values in 820B may have relative smaller deviation amplitudes from 1 than the mask 810A (which may have relative smaller deviation amplitudes from 1 than the mask 830C). This is because human eyes are more sensitive to green light than red and blue light. For correcting a green dead pixel, the pixel values may be altered in relative smaller amplitudes than the red dead pixel or the blue dead pixel. In particular embodiments, since the mask values are optimized to the final results as displayed by display and as perceived by human vision, the deviation amplitudes of the mask values from 1 may depend on a sensitivity of the human eyes to the color channel being associated with the corresponding dead pixels.

In particular embodiments, for applying a set of three masks to an image, the system first scale all pixel values of the image by an overall scaling factor $\beta$ (e.g., 0.8) to allow the pixel values to have appropriate headroom (e.g., 20%). Scaling by the overall scaling factor may result in a reduced overall brightness of the image (e.g., 20%). Because the mask values are generated by solving the optimization equations under the constraint condition of $1-\beta \leq x \leq \beta$, the mask values may allow the modified pixel values of the image to be no greater than the maximum pixel value as supported by the display. The system may access a dead pixel position corresponding to a dead pixel being associated with a particular color channel of the display. Then system may access an image including pixel values for three color channels as represented by the following equation:

$$P = (P_r, P_g, P_b) \tag{7}$$

where, P is the pixel value matrix of the image, $P_r$, $P_g$, and $P_b$ are the pixel value matrixes for RGB color channels. The system may select a set of three masks based on the color channel associated with the dead pixel. The system may modify the image by applying the set of three masks to a pixel region of the image containing a particular pixel value with a position that corresponds to the dead pixel position. As an example and not by way of limitation, for correcting a green dead pixel, the system may choose the set of three masks 810A, 810B, and 810C (as shown in FIG. 8B) from the nine masks generated during the optimization process. Similarly, for correcting a red dead pixel, the system may choose the set of three masks 820A, 820B, and 820C as shown in FIG. 8C. For correcting a blue dead pixel, the system may choose the set of three masks 830A, 830B, and 830C as shown in FIG. 8D. The selected set of three masks may be respectively applied to three color channels of pixel values in the pixel region of the image. The set of three masks may be configured to minimize a mean-squared error caused by the dead pixel in an opponent color space.

In particular embodiments, the system may determine the modified pixel values by applying masks having a size of 5×5 pixels using processes as represented in the following equations:

$$P_{rx-2:rx+2, ry-2:ry+2} = P_{rx-2:rx+2, ry-2:ry+2} \cdot (1 - F_r) \tag{8}$$

$$P_{gx-2:gx+2, gy-2:gy+2} = P_{gx-2:gx+2, gy-2:gy+2} \cdot (1 - F_g) \tag{9}$$

$$P_{bx-2:bx+2, by-2:by+2} = P_{bx-2:bx+2, by-2:by+2} \cdot (1 - F_g) \tag{10}$$

where, $P_{rx\ ry}$ is the red pixel value at the position of (x, y), $P_{gx\ gy}$ is the green pixel value at the position of (x, y), $P_{bx\ by}$ is the blue pixel value at the position of (x, y), Fr is the corresponding mask value for red color channel, $F_g$ is the corresponding mask value for green color channel, Fb is the corresponding mask value for red color channel. In other words, for applying the set of three masks to respective color channels of the image in the pixel region, the system may select an associated color-specific mask from the set of three masks for an associated color channel. The system may access each pixel value of the associated color channel of the image in the pixel region and modify a pixel value of each pixel of the associated color channel of the image in the pixel region by multiplying that pixel value by a scaling factor that is determined based on a corresponding mask value of the color-specific mask.

Figure 9:
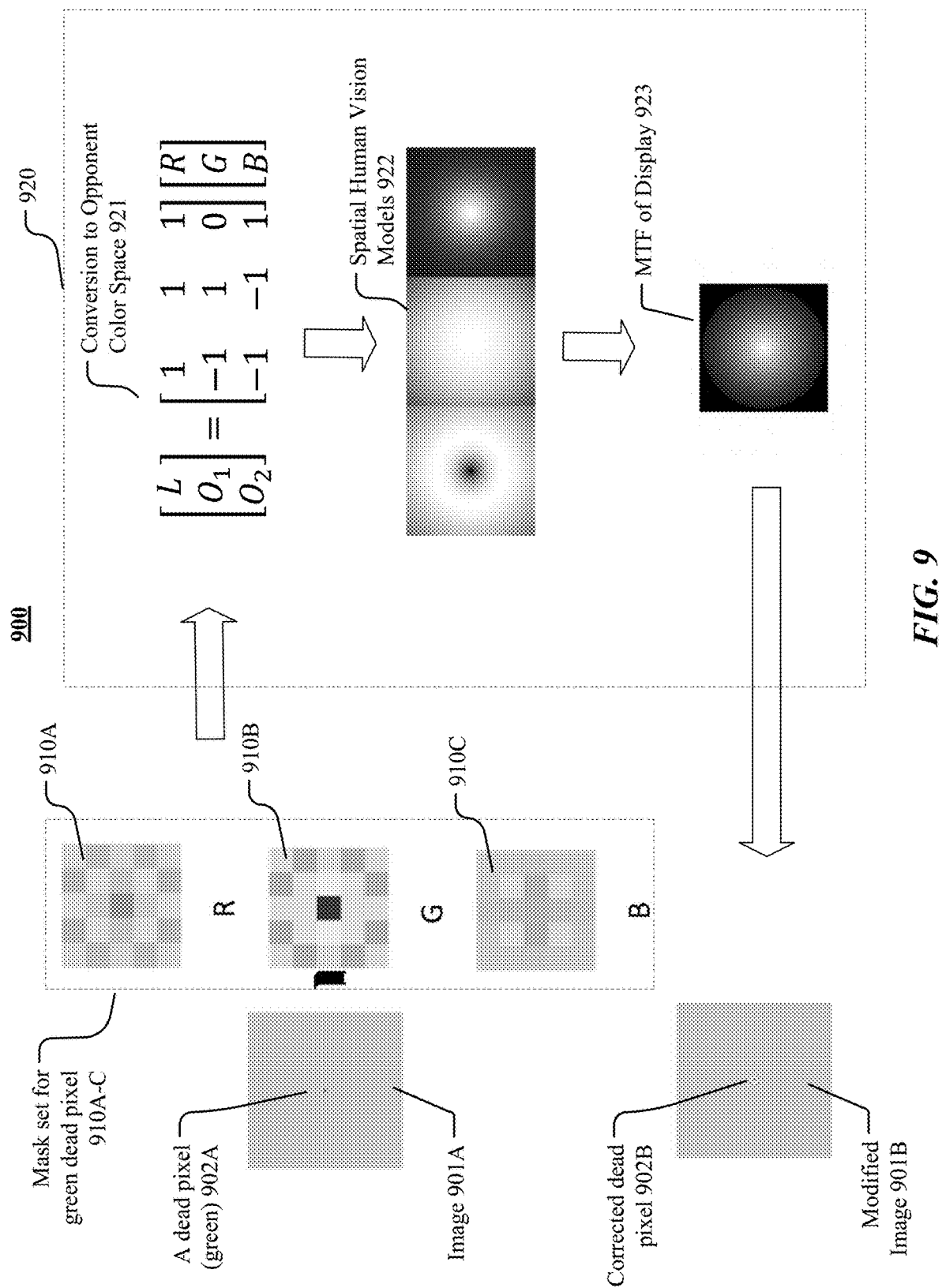
FIG. 9 illustrates an example process for applying a set of three masks for correcting a green dead pixel.

FIG. 9 illustrates an example process for applying a set of three masks (e.g., 910A, 910B, 910C) for correcting a green dead pixel. As an example and not by way of limitation, the image 901A may be displayed on a display having a dead pixel 902A in the green color channel. For correcting the green dead pixel 902A, the system may select a set of three masks 910A-C for modifying the pixel values of the image 901A. The set of three masks 910 may be selected from a number of sets of masks which may be generated for correcting dead pixels of different color channels. The masks may be generated by solving an optimization problem to minimize the mean-squared error caused by the dead pixel in Fourier-opponent space. The system may access the three masks of 910A, 910B, and 910C and apply them to the image 901A in a pixel region containing the dead pixel position 902A. In particular, the system may access each mask value x in each mask and multiply a corresponding pixel value p by a scaling factor (1−x) as determined based on that mask value x. The three mask 910A, 910B, and 910C may be applied to the image 901A in RGB color channels, respectively. After being modified by the set of three masks, the image 901A may be output by the display and viewed by users. The mathematical principle of the displaying and viewing processes may be simulated by one or more algorithms as described by the processes 920. The algorithms may first convert the modified image from the RGB color space to an opponent color space in the color space conversion step 921. Then, the algorithms may apply the spatial human vision models 922 to the image 901A in the opponent color space. The spatial human vision models may be different for different color channels and the models may be applied to the three color channels, respectively. Then, the algorithms may apply the modulation transfer function of the display 923 to the image 901A in the luminance channel. As a result, the image 901B may represent what may be perceived by users when the modified image is displayed on the display. As shown in FIG. 9, the corrected dead pixel 902B may have a reduced visibility than the dead pixel 902A before being corrected.

Figure 10:
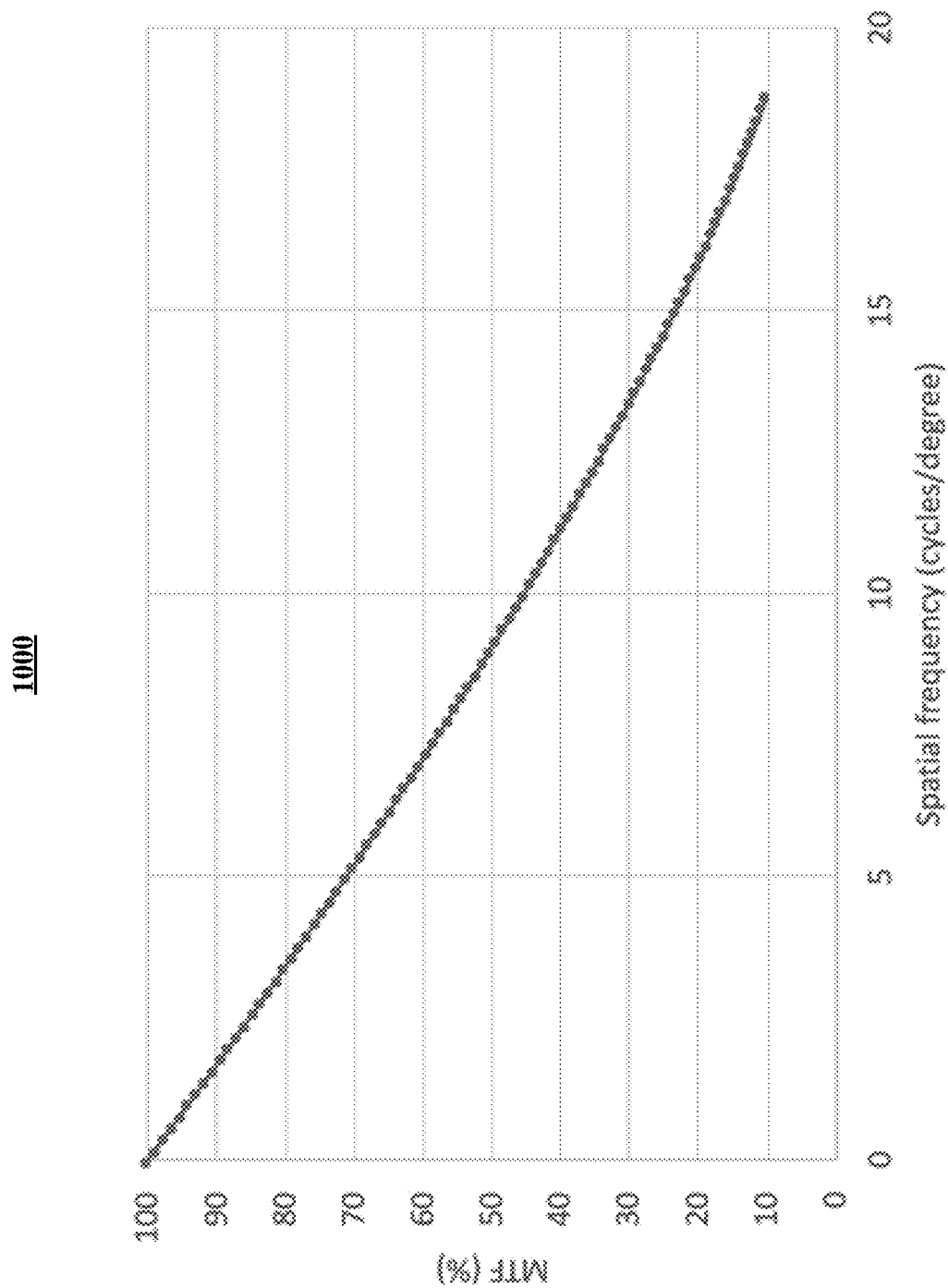
FIG. 10 illustrates an example modulation transfer function (MTF) of the display.

FIG. 10 illustrates an example modulation transfer function (MTF) of the display. In particular embodiments, the masks may be optimized taking into consideration of the modulation transfer function (MTF) of the display. As an example and not by way of limitation, the percentage value of the MTF function of the display may decline when the spatial frequency increases, as shown in FIG. 10. In this example, the percentage value of the MTF function may be about 10% when the spatial frequency reaches about 18.5 cycles/degree.

Figure 11B:
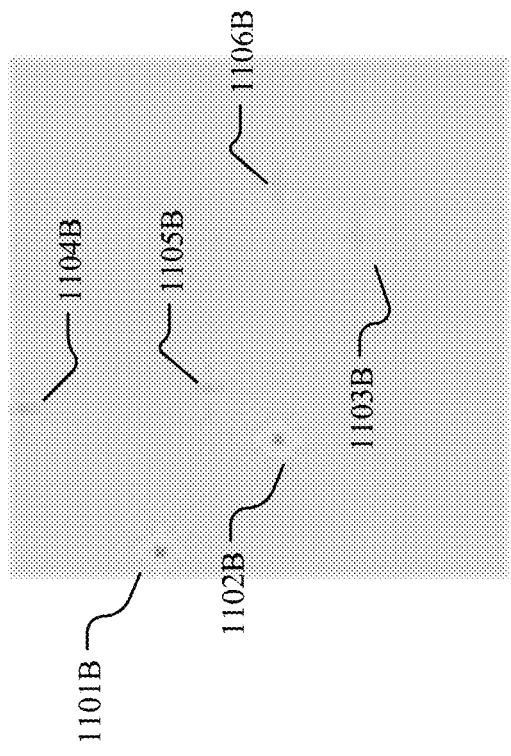
FIGS. 11A-11B illustrate example images with corrected dead pixels before and after applying the modulation transfer function (MTF) of the display.
Figure 11A:
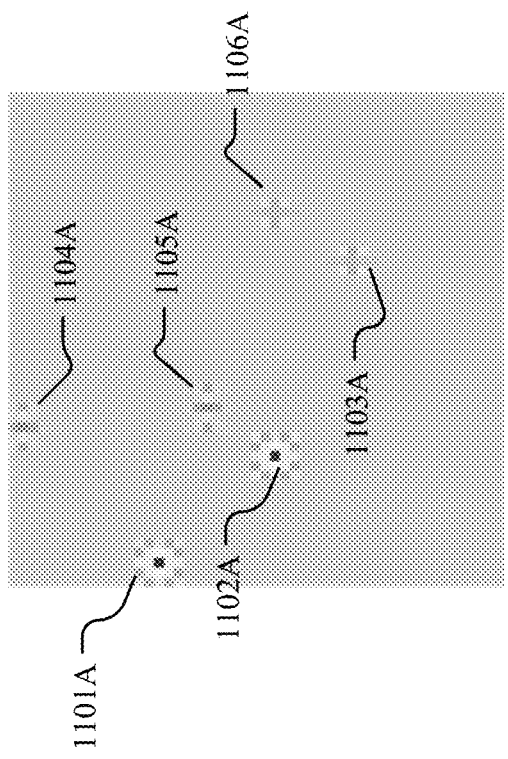

FIGS. 11A-11B illustrate example images 1100A and 1100B with corrected dead pixels before and after applying the modulation transfer function (MTF) of the display. As an example and not by way of limitation, the image 1100A may include six dead pixel positions each being associated with a particular color channel. The distance between any two dead pixels may be no less than the size of the masks (e.g., 5×5 pixels). The system may select a set of three masks for each dead pixel based on the associated color channel and apply the six sets of masks to the image in the respective pixel regions containing the dead pixel positions. As a result, the image may have altered pixel values in the pixel regions containing the dead pixel positions to compensate for the dead pixel defect. The image 1100B shows the corrected dead pixels before the modulation transfer function (MTF) of the display is applied. The image 1100B shows the corrected dead pixels after the modulation transfer function (MTF) of the display is applied. The image 1100B may include the blur effect by the modulation transfer function (MTF) of the display. As shown in FIG. 11B, the corrected dead pixels may have much lower visibility after being corrected by corresponding set of masks. By using a different mask for each color channel of the image, the system may have better result (e.g., lower visibility) in the corrected dead pixels than using a single luminance mask for all three color channels.

Figure 12:
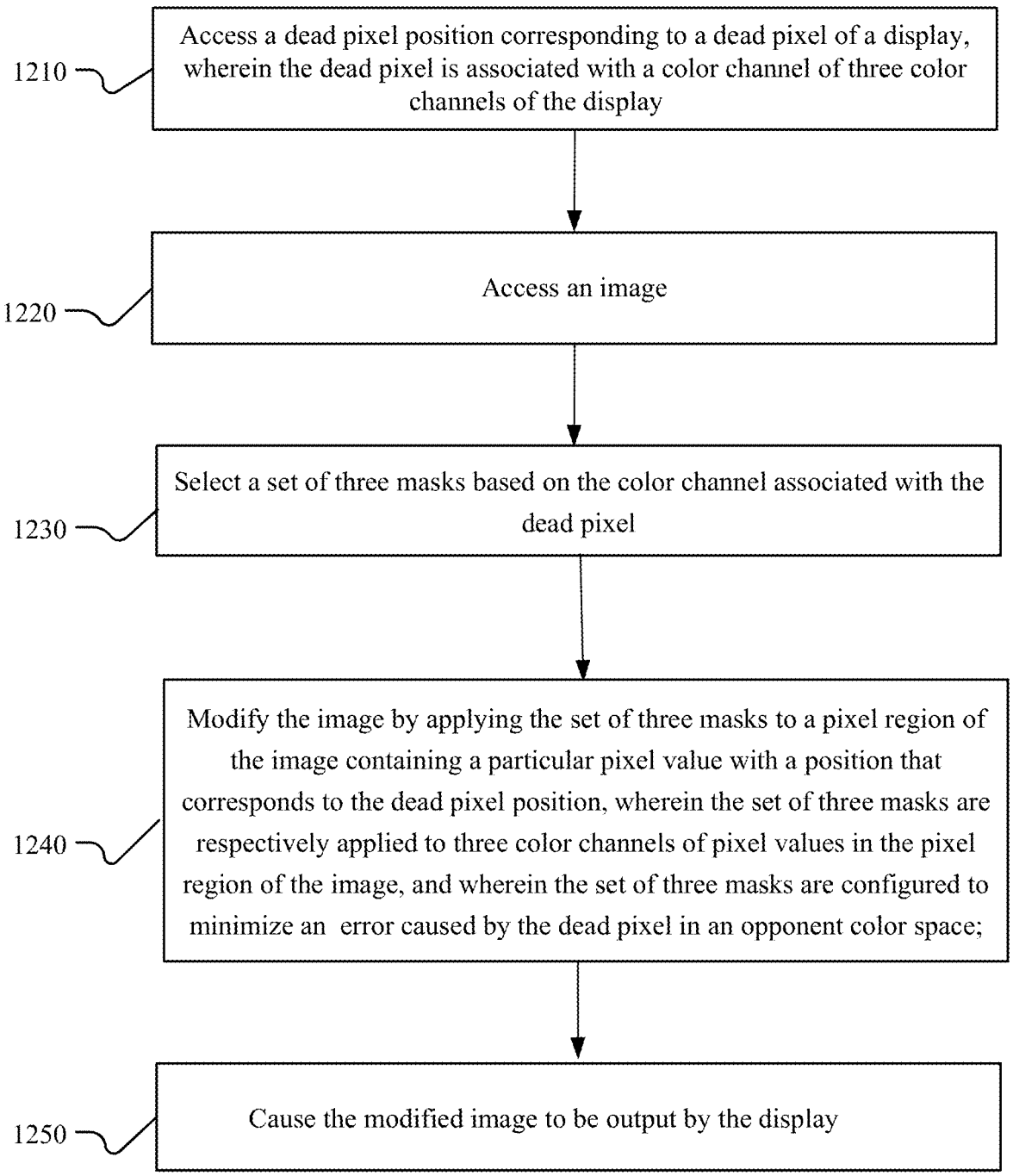
FIG. 12 illustrates an example method for correcting dead pixels using a set of three masks for RGB color channels of the image.

FIG. 12 illustrates an example method 1200 for correcting dead pixels using a set of three masks for RGB color channels of the image. The method 1200 may begin at step 1210, where the system may access a dead pixel position corresponding to a dead pixel of a display. The dead pixel may be associated with a color channel of three color channels of the display. At step 1220, the system may access an image to be displayed on the display having the dead pixel. At step 1230, the system may select a set of three masks based on the color channel associated with the dead pixel. At step 1240, the system may modify the image by applying the set of three masks to a pixel region of the image containing a particular pixel value with a position that corresponds to the dead pixel position. The set of three masks may be respectively applied to three color channels of pixel values in the pixel region of the image. The set of three masks may be configured to minimize an error caused by the dead pixel in an opponent color space. At step 1250, the system may cause the modified image to be output by the display.

In particular embodiments, the error that the set of three masks are configured to minimize may be a mean-squared error caused by the dead pixel in the opponent color space as modulated by a point spread function of human vision. In particular embodiments, the mean-squared error caused by the dead pixel may be minimized in the opponent color space as modulated by the point spread function of human vision and a modulation transfer function of the display. In particular embodiments, each mask of the set of three masks may include an array of mask values for determining an array of scaling factors for scaling pixel values of an associated color channel of the image in the pixel region. The array of scaling factors may be configured to brighten or dim the pixel values of the associated color channel of the image in the pixel region. In particular embodiments, each mask of the set of three masks may be circular symmetric as determined by a point spread function of human vision.

In particular embodiments, the modified image may cause the dead pixel of the display to have a lower visibility level than the image before being modified. The set of three masks may be selected from three sets of masks and each set of the three sets of masks may be for a particular color channel that the dead pixel is associated with. In particular embodiments, the three sets of masks are generated by solving an optimization equation of $$\operatorname{argmin}_{x} \|W_1 C(W_2 F\{x\} - F\{I\})\|^2,$$

where the $F\{x\}$ is a Fourier transform, $W_1$ is a first modulation transfer function of human vision, $W_2$ is a second modulation transfer function of the display, $C$ is a color space transform for transforming a RGB color space to an opponent color space, the I is an identity matrix. In particular embodiments, the optimization equation may be subjected to a constraint condition of β−1≤x≤β, wherein β is an overall scaling factor for pixel values of the image. In particular embodiments, the system may scale each pixel value of the image by the overall scaling factor β before or after applying the masks for correcting dead pixels.

In particular embodiments, the set of three masks may be applied to respective color channels of the image in the pixel region by: selecting a color-specific mask from the set of three masks for an associated color channel, accessing each pixel value of the associated color channel of the image in the pixel region, and modifying a pixel value of each pixel of the associated color channel of the image in the pixel region by multiplying that pixel value by a scaling factor that is determined based on a corresponding mask value of the color-specific mask. In particular embodiments, the display may be a micro-LED display having a single dead pixel within a display region corresponding to a mask size of the set of three masks. In particular embodiments, the pixel region of the image may be centered at the dead pixel position corresponding to the dead pixel of the display. Each mask of the set of three masks may have a same size to the pixel region containing the dead pixel position.

In particular embodiments, the image may be modified by one or more processes of a graphic pipeline implemented on a display engine. In particular embodiments, the graphic pipeline may include one or more steps of, for example, but are not limited to, warping one or more surfaces associated with the image, determining one or more pixel values of the image by sampling a plurality of texels, correcting one or more distortions of the image, propagating, by one or more spatial or temporal dithering processes, quantization errors of the image spatially or temporally. In particular embodiments, the image may be modified before being processed by the one or more spatial or temporal dithering processes for propagating the quantization errors. In particular embodiments, the dead pixel of the display may be a green pixel associated with a green color channel and the green pixel may have a size smaller than pixels of red and blue color channels. In particular embodiments, the dead pixel of the display may be a red or blue pixel and the dead pixel may have a larger size than pixels of a green color channel. In particular embodiments, the system may access three pixel correction matrixes each comprising an array of scaling factors for scaling pixel values of an associated color channel to correct pixel non-uniformity. The system may combine each of the set of three masks into a corresponding pixel correction matrix by multiplying each mask value in that mask to an associated scaling factor of the corresponding pixel correction matrix. The mask value and the associated second scaling factor may be associated with a same pixel. In particular embodiments, the system may apply the three pixel correction matrixes to respective color channels of the image by multiplying each matrix value to a corresponding pixel value of an associated color channel of the image to correct pixel non-uniformity and the dead pixel using a same process and at the same time.

Particular embodiments may repeat one or more steps of the method of FIG. 12, where appropriate. Although this disclosure describes and illustrates particular steps of the method of FIG. 12 as occurring in a particular order, this disclosure contemplates any suitable steps of the method of FIG. 12 occurring in any suitable order. Moreover, although this disclosure describes and illustrates an example method for correcting dead pixels using a set of three masks for RGB color channels of the image including the particular steps of the method of FIG. 12, this disclosure contemplates any suitable method for correcting dead pixels using a set of three masks for RGB color channels of the image including any suitable steps, which may include all, some, or none of the steps of the method of FIG. 12, where appropriate. Furthermore, although this disclosure describes and illustrates particular components, devices, or systems carrying out particular steps of the method of FIG. 12, this disclosure contemplates any suitable combination of any suitable components, devices, or systems carrying out any suitable steps of the method of FIG. 12.

In particular embodiments, the pixels of the AR/VR display may non-uniform capability for emitting lights. For example, the pixels of the display may emit light in different intensity ranges with different maximum light intensity. Some pixels of the display may have a relative higher maximum light intensity than other pixels of the display. As a result, different pixels of the display may emit light with different luminance levels even if they are provided the same pixel values. When an image is displayed by these non-uniform pixels, the displayed image may be distorted by the non-uniformity of the pixels and may appear different from what it is intended to be.

In particular embodiments, the system may use a matrix of scaling factors to scale pixel values of the image to be displayed to compensate for pixel non-uniformity. In particular embodiments, the system may determine (e.g., using an optical measurement system or a computer vision system) the quantified pixel non-uniformity (e.g., during manufacture or calibration stages of the system). For example, the system may determine a light emitting coefficient for each pixel of the display. In particular embodiments, the light emitting coefficient may be a normalized maximum light intensity with respect to the strongest pixel (i.e., the pixel having the highest maximum light intensity level). For example, a light emitting coefficient of 1 may correspond to the strongest pixel with the greatest maximum light intensity. A light emitting coefficient of 0.8 may correspond to 80% emitted light intensity with respect to the strongest pixel. Then, the system may calculate a uniformity scaling factor for each pixel based on the light emitting coefficient value of that pixel. To allow all pixels of the display to emit light in the same intensity range, the system may calculate the uniformity scaling factor values with respect to the weakest pixel (i.e., the pixel having the lowest maximum light intensity). Given $p_0$ as the light emitting coefficient of the weakest pixel and $p_x$ as the light emitting coefficient of a current pixel, the uniformity scaling factor of that pixel may be determined by dividing $p_0$ by $p_x$. For example, assuming the weakest pixel has a light emitting coefficient value of 0.6, the pixels having light emitting coefficients of 0.9, 0.8, 0.7, and 0.6 may have the uniformity scaling factor values of 0.67, 0.75, 0.86, and 1, respectively. The system may repeat this calculation and determine a uniformity scaling factor for each pixel of each color channels of the display. The calculated scaling factors may be stored in a pixel correction matrix corresponding to a color channel. The system may generate three pixel correction matrixes for RGB color channels of the display, respectively. The matrixes may be stored into the memory storage of the system. At run time, the system may access the scaling factors from the pixel correction matrixes and scale the pixel values of the image to be displayed based on the respective scaling factors. The system may apply the three pixel correction matrixes to RGB color channels of the image, respectively. The pixel values of the image after being scaled by the scaling factors may be uniformly within the same light intensity range corresponding to the weakest pixel of the display. In other words, the pixel values for the pixels with higher maximum light intensity than the weakest pixel may be scaled down to match the weakest pixel. As a result, the image after being modified by the pixel correction matrixes may eliminate the non-uniformity caused by the non-uniform pixels and may provide better displayed quality (e.g., displayed image being closer to the original image).

In particular embodiments, the pixels of the display may degrade over time. For example, the pixels of the display may gradually have lower maximum light intensity depending on the number of hours that the display have been in turn-on state. The display having degraded pixels may display images with less brightness and therefore negatively impact the display quality and user experience. In particular embodiments, the system may adjust the scaling factors in the pixel correction matrix based on the number of hours that the display has been turned on. The relationship between the light emitting coefficients of the pixels and the number of hours being turned on may be pre-determined based on empirical data or measurement data. For example, the system may determine a mathematic function which correlate the pixel light emitting coefficient to the number of hours being turned on based on empirical data or measurement data. At run time, the system may periodically (e.g., each N hours of usage of the display) re-generate the pixel correction matrixes with re-calculated scaling factors based on the mathematical function and the number of hours being used. In particular embodiments, the system may re-generate the pixel correction matrix based on a sensor input or user input indicating that the display has become dimmer than an optimal brightness. Then, the system may apply the re-generated pixel correction matrixes to the images to be displayed. The re-generated scaling factors may cause the pixel values of the images to be adjusted to compensate for the pixel degradation. As a result, the system may provide a more consistent display quality and image effect over time even if the pixels of the display have degraded.

In particular embodiments, the system may combine the pixel correction matrixes for correcting non-uniformity with a luminance mask for correcting dead pixels. In particular embodiments, the non-uniformity correction may be performed by a separate process from the process for correcting the dead pixels. In particular embodiments, the non-uniformity correction and the dead pixel correction may be performed in the same process. For example, the system may combine the luminance mask to the three pixel correction matrixes for RGB color channels by multiplying each mask value to an associated scale factor in the correction matrix. The system may use the three pixel correction matrices (after being multiplied by the luminance mask values) to alter the pixels values of respective color channels of the image. As a result, the dead pixels and the pixel non-uniformity may be corrected at the same time.

As an example and not by way of limitation, the system may access three pixel correction matrixes each comprising an array of second scaling factors for scaling pixel values of an associated color channel of the image for correcting pixel non-uniformity of the display. The system may combine the luminance mask into each pixel correction matrix by multiplying each mask value in the mask to an associated second scaling factor of that pixel correction matrix. The mask value and the associated second scaling factor may be associated with the same pixel. In particular embodiments, the system may apply the three pixel correction matrixes to respective color channels of the image by multiplying each matrix value to a corresponding pixel value of the image to correct pixel non-uniformity and the dead pixel using the same process and at the same time. As a result, the dead pixels and the pixel non-uniformity may be corrected at the same time.

In particular embodiments, the system may combine the pixel correction matrixes for correcting non-uniformity with the color masks for correcting dead pixels of respective color channels. In particular embodiments, the non-uniformity correction may be performed by a separate process from the process for correcting the dead pixels. In particular embodiments, the non-uniformity correction and the dead pixel correction may be performed in the same process. For example, the system may combine each color mask to a corresponding pixel correction matrix of the same color channel by multiplying each color mask value to an associated with sale factor of the correction matrix. Then, the system may use the three pixel correction matrices (as combined with the color masks) to alter the pixels values of respective color channels of the image. As a result, the dead pixels and the pixel non-uniformity may be corrected at the same time.

As an example and not by way of limitation, the system may access three pixel correction matrixes each comprising an array of scaling factors for scaling pixel values of an associated color channel to correct pixel non-uniformity. The system may combine each of the set of three masks into a corresponding pixel correction matrix by multiplying each mask value in that mask to an associated scaling factor of the corresponding pixel correction matrix. The mask value and the associated second scaling factor may be associated with a same pixel. In particular embodiments, the system may apply the three pixel correction matrixes to respective color channels of the image by multiplying each matrix value to a corresponding pixel value of an associated color channel of the image to correct pixel non-uniformity and the dead pixel using a same process and at the same time. As a result, the dead pixels and the pixel non-uniformity may be corrected at the same time.

In particular embodiments, in addition to the luminance mask or the set of masks for different color channels, the system may further combine the overall scaling factor $\beta$ (e.g., $\beta<1$), which is for scaling down all pixel values of the image to allow the pixel values to have appropriate headroom (e.g., 20% for $\beta=0.8$), into the pixel correction matrixes. For example, the system may further multiply each matrix value in the pixel correction matrixes by $\beta$ and apply these matrixes to the image. By applying the pixel correction matrixes to the image, the system may perform pixel non-uniformity correction, scaling all pixel values for headroom, and correcting dead pixels using the same process and at the same time. Because the pixel correction matrixes include the overall scaling factor $\beta$, the matrix values in the combined pixel correction matrixes may be within the normalized range of [0, 1]. In particular embodiments, the combined pixel correction matrixes may correspond to a display region including an arbitrary number of dead pixels (not limited to a single dead pixel per N×N pixels since the pixel correction matrixes may be combined with any number of dead pixel correction masks). Furthermore, the locations of the dead pixels may be arbitrary, and the combined pixel correction matrixes may effectively correct an arbitrary number of dead pixels at arbitrary locations. As a result, by applying the combined pixel correction matrixes to the image, the pixel non-uniformity, the overall scaling on pixel values, and the correction of dead pixels may be completed in the same process at the same time.

The performance of AR/VR displays (e.g., µLED displays) may be negatively affected by temperature changes or/and display aging effect. For example, if a portion of the light-emitting element array (e.g., µLED array) becomes hot, the light-emitting elements (e.g., µLEDs) in that portion may become less efficient for emitting light (e.g., having reduced light intensity with the same driving current/voltage levels). Moreover, the performance of the light-emitting elements (e.g., µLEDs) may degrade over time with some light emitting elements (e.g., µLEDs) degrading faster than other light emitting elements because of the different usage frequencies. The display having degraded light-emitting elements may display dimmer or less uniform images and therefore negatively impact the display quality and user experience.

In particular embodiments, the system may determine a scaling factor for each light-emitting element to scale an image pixel to be output on that light-emitting element to compensate for the light-emitting element degradation. The system may determine the scaling factors based on a mathematic function which correlates the pixel intensity to the number of hours being turned on based on empirical data or measurement data. At run time, the system may apply the scaling factors to corresponding image pixels of an image to be displayed. In particular embodiments, the system may determine the scaling factors based on one or more sensor inputs or user inputs indicating that the display has become dimmer than an optimal brightness. In particular embodiments, the system may determine the scaling factors based on temperature (e.g., measured by one or more sensors) of the light-emitting element arrays and apply the scaling factors to the images to be displayed. The scaling factors may cause the pixel values of the images to be adjusted to compensate for the light-emitting element degradation.

Particular embodiments of the system may compensate for the display degradation caused by either temperature change or time of usages. Particular embodiments of the system may provide a more consistent display quality and image visual effect over time even if the light-emitting elements of the display have degraded or the temperature changes have caused the light-emitting element array to have reduced light-emitting efficiency. Particular embodiments of the system may provide better display quality and better user experience by compensating display degradation.

Figure 13:
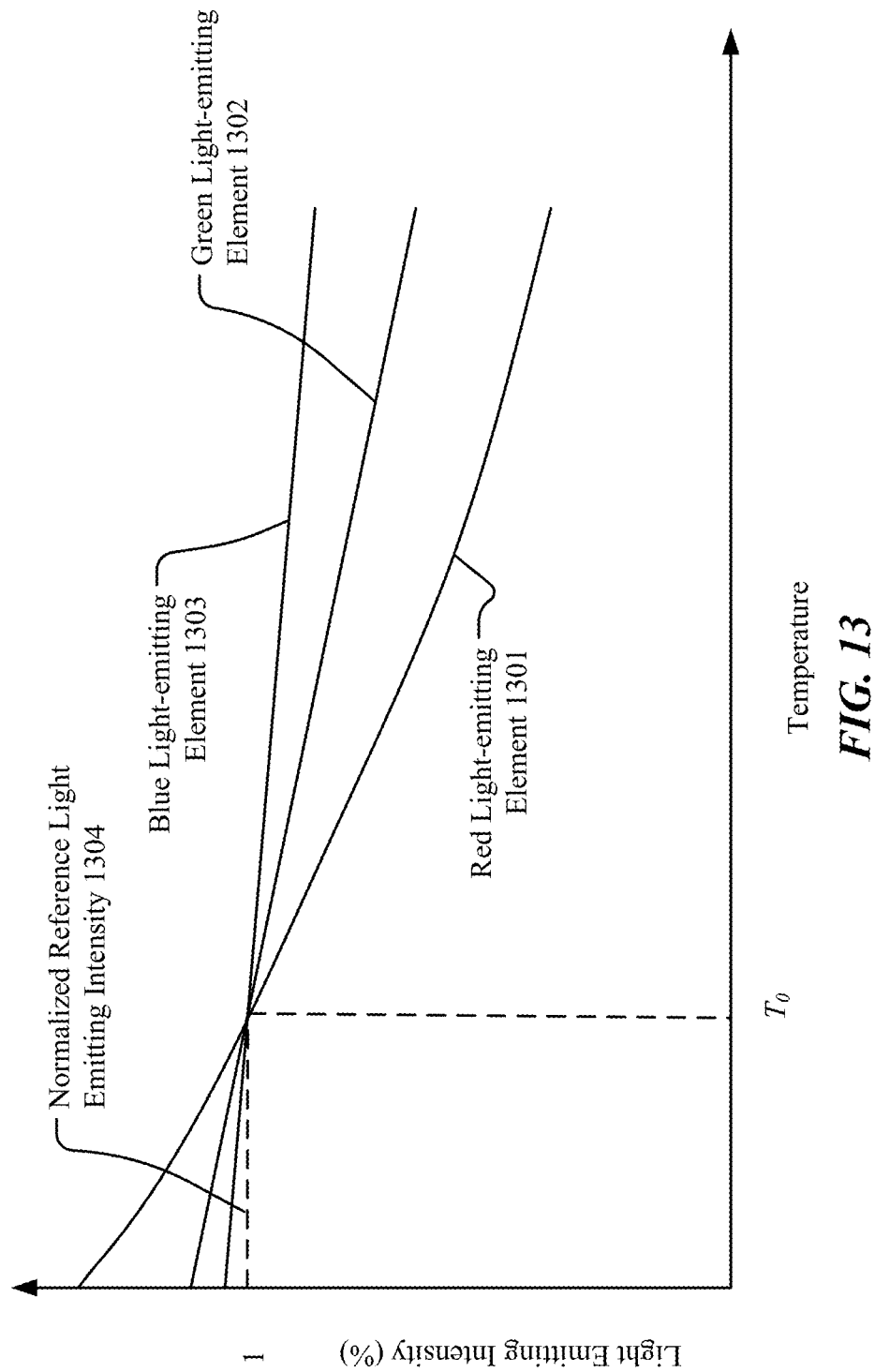
FIG. 13 illustrates example functions correlating temperature to light-emitting efficiencies of light-emitting elements.

FIG. 13 illustrates example functions (e.g., 1301, 1302, 1303) correlating temperature to light-emitting efficiencies of light-emitting elements. In particular embodiments, the system may determine the display degradation levels caused by one or more short-term factors or environmental parameters such as operating temperature. In particular embodiments, each light-emitting element of the display may have a light emitting intensity that is dependent on operating temperature (e.g., junction temperature, environment temperature, etc.). In this disclosure, the light emitting intensity of a light-emitting element may refer to an absolute light intensity or a relative light intensity (e.g., in percentages) with respect to a reference light intensity of the light-emitting element. The reference light intensity may refer to a light intensity when the light-emitting element is working in a reference temperature condition (e.g., 25° C.). The light emitting intensity of a light-emitting element with different temperatures may be determined by measuring the light outputs of the light-emitting element under different temperatures while keeping all other working conditions (e.g., current levels, voltage levels, PWM rates, pixel values) the same. In this disclosure, when the light emitting intensity reduction caused by temperature or aging is discussed, other parameters (e.g., corresponding image pixel value) may be assumed to be fixed and constant.

As an example and not by way of limitation, the red, green, and blue light-emitting elements of the display may have their light-emitting efficiencies varying with the temperature following the correlation functions of 1301, 1302, and 1303, respectively, as shown in FIG. 13. It is notable that the light-emitting efficiencies of the light-emitting elements of different colors may have different dependencies on temperature. The reference light emitting intensity 1304 may correspond to the light emitting efficiencies of the red, green, and blue light-emitting elements when working under a reference temperature $T_0$. As shown FIG. 13, the light emitting efficiencies of the light-emitting elements may decrease when the temperature increases. For example, when the temperature is higher than the reference temperature $T_0$, the light-emitting elements of all three colors may have lower light emitting efficiencies with respect to the reference light emitting intensity 1304. In other words, the light-emitting elements may have reduced or degraded light-emitting efficiencies when the temperature increases. Given a temperature value, the light-emitting efficiencies may be determined based on the corresponding correlation functions (e.g., 1301, 1302, 1303). In particular embodiments, the correlation functions (e.g., 1301, 1302, 1303) of the light emitting efficiencies to temperature may be determined based on theoretical models or empirical measurement data of the light-emitting elements. It is notable that the correlation functions between the light-emitting efficiencies and temperature herein are for example purpose only and the correlation functions between the light-emitting efficiencies and temperature are not limited thereto. The correlation functions between the light-emitting efficiencies and temperature can be any suitable functions as determined based on theoretical models or empirical measurement data of the light-emitting elements.

In particular embodiments, the system may compensate for the display degradation caused by temperature change based on an overall temperature (e.g., an average temperature) of the display or the AR/VR system. As an example and not by way of limitation, the system may determine an overall temperature (e.g., an average temperature, an estimated temperature) of the light-emitting elements of the display. The overall temperature may be determined based on one or more temperature sensors associated with the display or the AR/VR system, one or more user inputs, or temperature information received from an associated system. The system may determine a degradation level (e.g., a reduced light emitting intensity) for the light-emitting elements of each color channel based on the overall temperature and a pre-determined correlation function for that color channel which maps temperature to light emitting intensity. Then, the system may determine an overall scaling factor for all light-emitting elements of each color channel based on the degradation level. For example, the system may determine that light-emitting elements of the three color channels (e.g., RGB) have reduced light emitting efficiencies of 70%, 80%, 90%, respectively, with respect to their reference light emitting efficiencies. The system may determine three overall scaling factors of 1.43, 1.25, and 1.11 for the light-emitting elements of the red, green, and blue color channels. The scaling factor values may be determined by dividing the normalized reference light emitting intensity 1 by the reduced light emitting efficiencies of 0.7, 0.8, 0.9, respectively. Before displaying an image, the system may apply these scaling factors to the image to be displayed to adjust the pixel values corresponding to three color components (e.g., RGB). For example, the system may apply the scaling factor of 1.43, 1.25, and 1.11 to the red, green, and blue pixel color components of the image, respectively. Once applied, these scaling factors may adjust the pixel values of the image to compensate for the display degradation caused by the temperature change. The system may periodically (or in response to a temperature change trigger) re-generate the scaling factors based on up-to-date temperature information and apply the re-generated scaling factors to images to compensate for the temperature caused degradation. In particular embodiments, instead of using the scaling factors, the system may adjust one or more display control parameters, for example, a PWM (pulse-width modulation) parameter (e.g., a duty cycle), a current level, a voltage level, a current/voltage offset level to compensate for the display degradation. The system may determine these display control parameters based on a current operating temperature and control the display to compensate for the temperature caused degradation accordingly.

In particular embodiments, the system may use one or more temperature sensors associated with the display to determine temperature values at a number of locations in the light-emitting element arrays. The system may determine a temperature distribution across the light-emitting element arrays based on the temperature values at different locations. In particular embodiments, the system may use a mesh grid to determine the scaling factors for image pixels to compensate for the temperature caused display degradation. The scaling factors may be determined based on the mesh grid and the temperature distribution across the light-emitting element array. In particular embodiments, each mesh grid region of the mesh grid may include a pre-determined number of pixels (e.g., 32 pixels by 32 pixels, 16 pixels by 16 pixels, 4 pixels by 4 pixels, etc.). The pixels of the same color channel within each mesh grid may have a same scaling factor value.

Figure 14A:
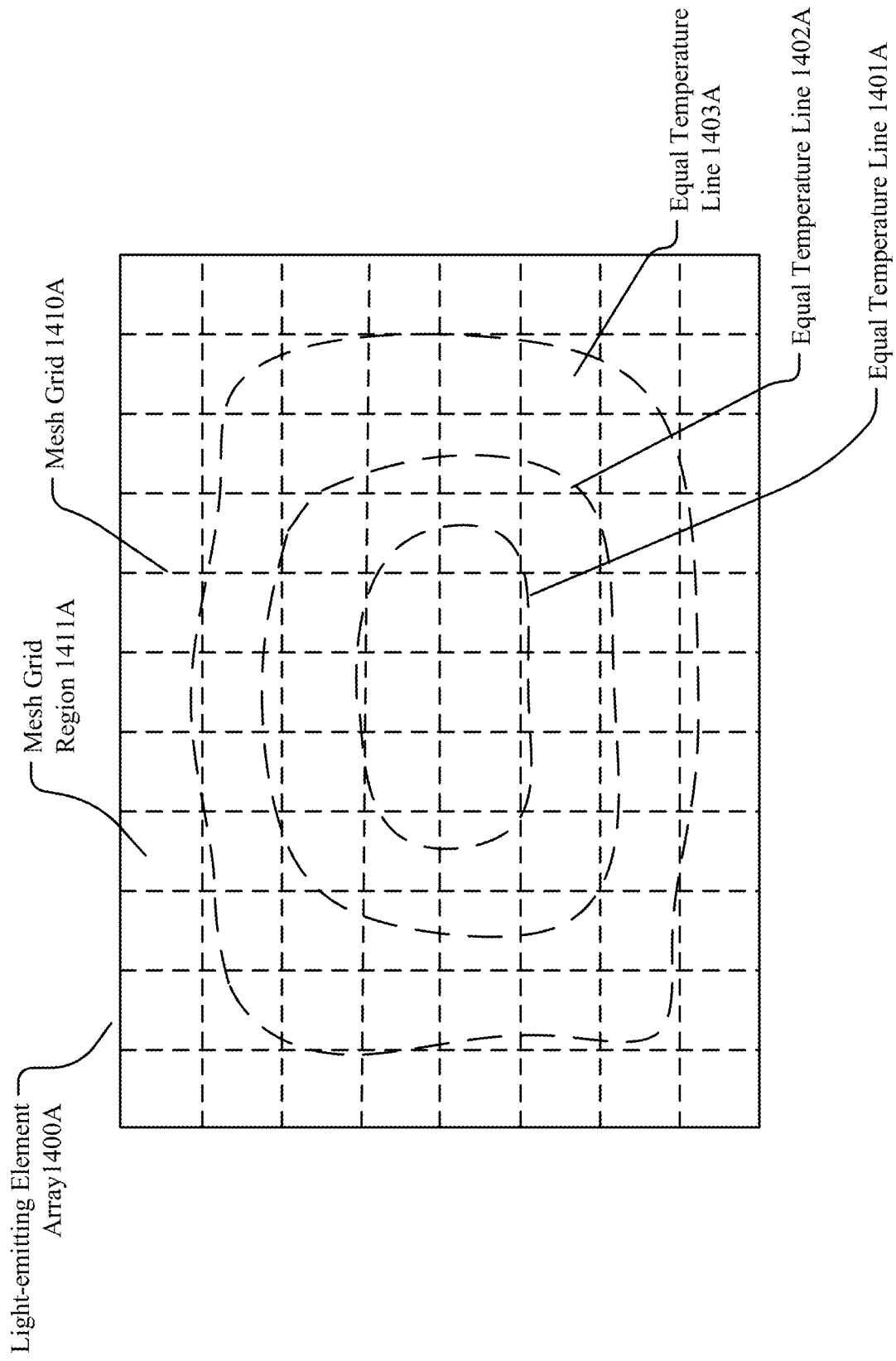
FIG. 14A illustrates an example mesh grid for determining scaling factors to compensate for temperature caused degradation.

FIG. 14A illustrates an example mesh grid 1410A for determining scaling factors to compensate for temperature caused degradation. As an example and not by way of limitation, the temperature distribution across the light-emitting element array 1400A may be illustrated by the equal temperature lines of 1401A, 1402A, and 1403A. In this example, the center area of the light-emitting element array 1400A may have a relative higher temperature than other areas and the temperature may gradually decrease from the center area toward each edge area. The system may estimate, based on the temperature distribution, an average temperature value in each mesh grid region (e.g., 1411A). Then, the system may use that average temperature value to determine three scaling factors for the three color channels of that mesh grid region (e.g., 1411A). For example, for the mesh grid region 1411A, the system may estimate that the average temperature value in this mesh grid region 1411A. Then, the system may use the correlation functions between the light-emitting efficiencies and temperature of light-emitting elements of each color channel to calculate the respective reduced light emitting intensity values. After that, the system may determine, for the mesh grid region 1411A, a scaling factor for each color channel based on the calculated reduced light emitting efficacy value of that color channel.

As an example and not by way of limitation, for the mesh grid region 1411A, the system may estimate that the average temperature value in this mesh grid 1411A is 60° C. and may determine that the light-emitting element of the red color channel has a reduced light emitting intensity of 70%. The system may determine a scaling factor of 1.43 for the red color channel by dividing the normalized reference light-emitting efficiency 1 by the reduced light emitting intensity of 70%. Similarly, the system may determine that the light-emitting element of the green color channel has a reduced light emitting intensity of 90%. The system may determine a scaling factor of 1.11 for the green color channel by dividing the normalized reference light-emitting efficiency 1 by the reduced light emitting intensity of 90%. Similarly, the system may determine that the light-emitting element of the blue color channel has a reduced light emitting intensity of 97%. The system may determine a scaling factor of 1.03 for the green color channel by dividing the normalized reference light-emitting efficiency 1 by the reduced light emitting intensity of 97%.

In particular embodiments, the system may repeat this process to determine three scaling factors for the three color channels of each mesh grid region of the mesh grid 1410A. Each mesh grid region may have a same scaling factor for all the pixels of a same color channel. Before displaying an image, the system may apply the scaling factors, as determined based on the mesh grid 1410A and the temperature distribution, to corresponding image areas of the image to be displayed. The scaling factors for RGB color channels may be applied to RGB color components of the corresponding image pixels. The scaling factors, once applied, may adjust the pixel values of the image and effective compensate for the degradation caused by temperature change. After that, the system may output the image to be displayed to the light-emitting element arrays. As a result, the displayed image may have better display quality with the temperature caused display degradation being effectively compensated. It is notable that the temperature distribution as shown in FIG. 14A is for example purpose only and the temperature distribution of the display is not limited thereto. For example, the display may have a hot area located in any location of the light-emitting element array (e.g., center areas, edge areas, corner areas, etc.) and the temperature may vary according to any possible distribution profiles.

Figure 14B:
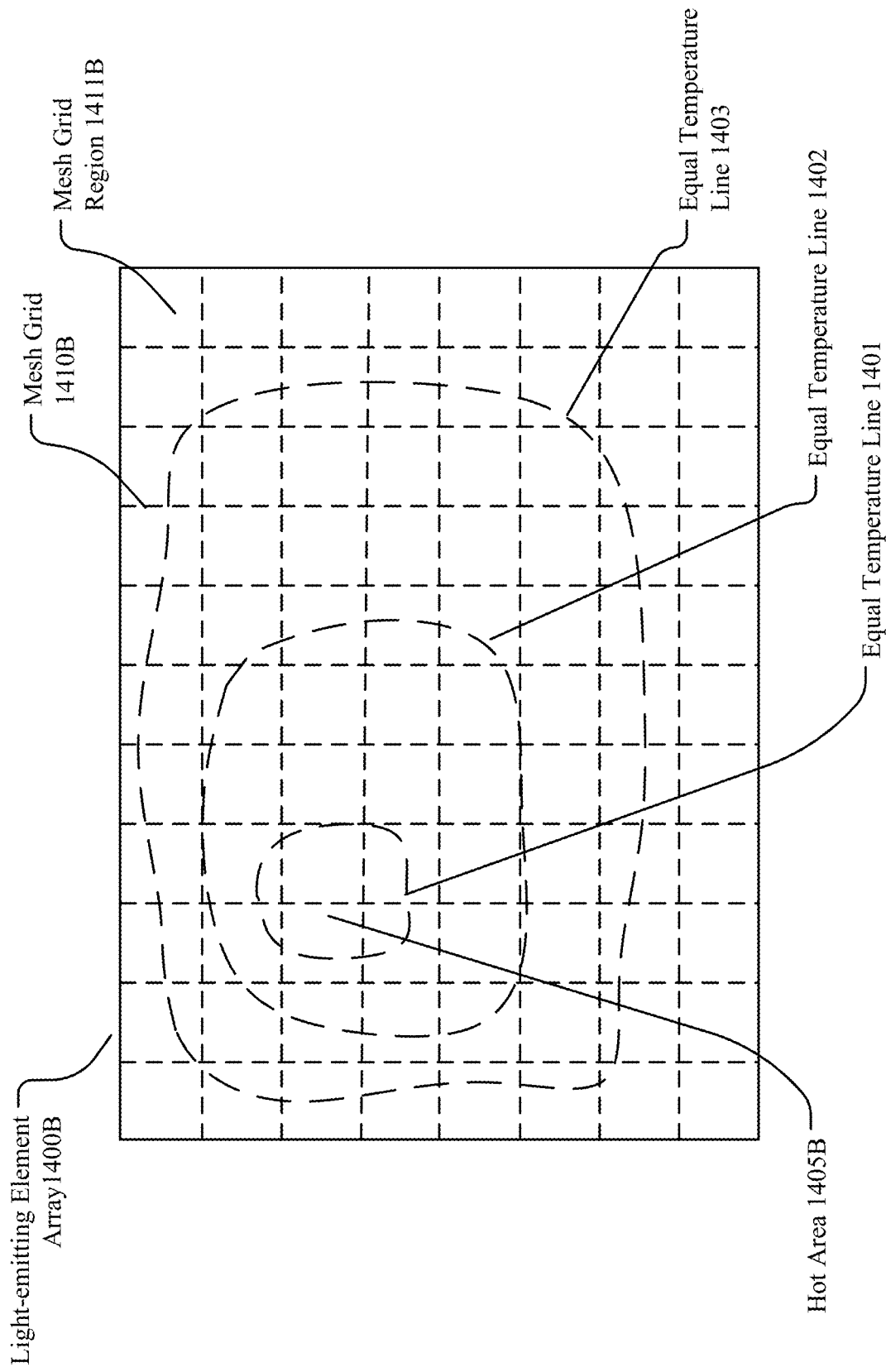
FIG. 14B illustrates another example mesh grid for determining scaling factors for image pixels to compensate for temperature caused degradation.

FIG. 14B illustrates another example mesh grid 1410B for determining scaling factors for image pixels to compensate for temperature caused degradation. As an example and not by way of limitation, the temperature distribution across the light-emitting element array 1400B may be illustrated by the equal temperature lines of 1401B, 1402B, and 1403B. In this example, the hot area 1405B of the light-emitting element array 1400B may be at a location close to a corner of the light-emitting element array 1400B and the temperature may gradually decrease from the hot area 1405B toward other areas. The system may estimate, based on the temperature distribution, an average temperature value in each mesh grid region (e.g., 1411B). Then, the system may use that average temperature value to determine three scaling factors for the three color channels of that mesh grid region (e.g., 1411B). Then, the system may use the correlation functions between the light-emitting efficiencies and temperature of light-emitting elements of each color channel to calculate the respective reduced light emitting intensity values. After that, the system may determine, for the mesh grid region 1411B, a scaling factor for each color channel based on the calculated reduced light emitting efficacy value of that color channel.

As an example and not by way of limitation, for the mesh grid region 1411B, the system may estimate that the average temperature value in this mesh grid 1411B is 45° C. and may determine that the light-emitting element of the red color channel has a reduced light emitting intensity of 78%. The system may determine a scaling factor of 1.28 for the red color channel by dividing the normalized reference light-emitting efficiency 1 by the reduced light emitting intensity of 78%. Similarly, the system may determine that the light-emitting element of the green color channel has a reduced light emitting intensity of 95%. The system may determine a scaling factor of 1.05 for the green color channel by dividing the normalized reference light-emitting efficiency 1 by the reduced light emitting intensity of 95%. Similarly, the system may determine that the light-emitting element of the blue color channel has a reduced light emitting intensity of 98%. The system may determine a scaling factor of 1.02 for the green color channel by dividing the normalized reference light-emitting efficiency 1 by the reduced light emitting intensity of 98%.

In particular embodiments, the system may repeat this process to determine the scaling factors for each mesh grid region of the mesh grid 1410B. Each mesh grid region may have the same set of three scaling factors for the pixels of three color channels in that mesh grid region. Before displaying an image, the system may apply the scaling factors, as determined based on the mesh grid 1410B and the temperature distribution, to corresponding image areas of the image to be displayed. The scaling factors for RGB color channels may be applied to the RGB color components of corresponding image pixels. The scaling factors, once applied, may adjust the pixel values of the image and effectively compensate for the degradation caused by temperature change. After that, the system may output the image to be displayed to the light-emitting element arrays. As a result, the displayed image may have a better display quality with temperature caused display degradation being effectively compensated.

In particular embodiments, the system may determine a scaling factor for each pixel of each color channel based on a temperature value associated with a corresponding light-emitting element. In particular embodiments, the system may measure or estimate a temperature for each light-emitting element of the display based on outputs of temperature sensors associated with the display. For example, temperature sensors may be embedded in the light-emitting element arrays to accurately measure the temperature of each light-emitting element. As another example, the temperature of a light-emitting element may be determined based on a correlation between the electrical current and electrical voltages applied to that light-emitting element. The system may use the measured temperature and a correlation function (which maps temperature to light emitting intensity) to calculate the light emitting intensity value of that light-emitting element. Then, the system may determine a scaling factor for the pixel corresponding to that light-emitting element. The system may repeat this process to determine a scaling factor for each light-emitting element of each color channels of the display. The scaling factor may be stored in a compensation matrix and may be applied to the pixels of the image to be displayed. The scaling factors for RGB color channels may be applied to RGB color component of corresponding image pixels. After that, the system may output the image to the light-emitting element arrays. As a result, the displayed image may have a better display quality with temperature caused display degradation being effectively compensated.

As an example and not by way of limitation, the system may determine that a light-emitting element of a red color channel has a temperature of 40° C. The system may determine that the light-emitting element of red color channel has a reduced light emitting intensity of 80%. The system may determine a scaling factor of 1.25 by dividing the normalized reference light emitting intensity 1 by the reduced light emitting intensity of 80%. The scaling factor of 1.25, which when applied to the pixel value for that light-emitting element, may compensate for the reduced light emitting intensity (e.g., 0.8×1.25=1.0) to the reference light emitting intensity. The system may determine a scaling factor for each individual light-emitting element in the array. The scaling factors may be incorporated into a correction matrix and may be applied to the pixel values of the images to be displayed through the correction matrix. By applying the scaling factors to the pixel values of the images, the displayed images may have better display quality and uniformity with the temperature caused degradation being compensated.

Figure 15:
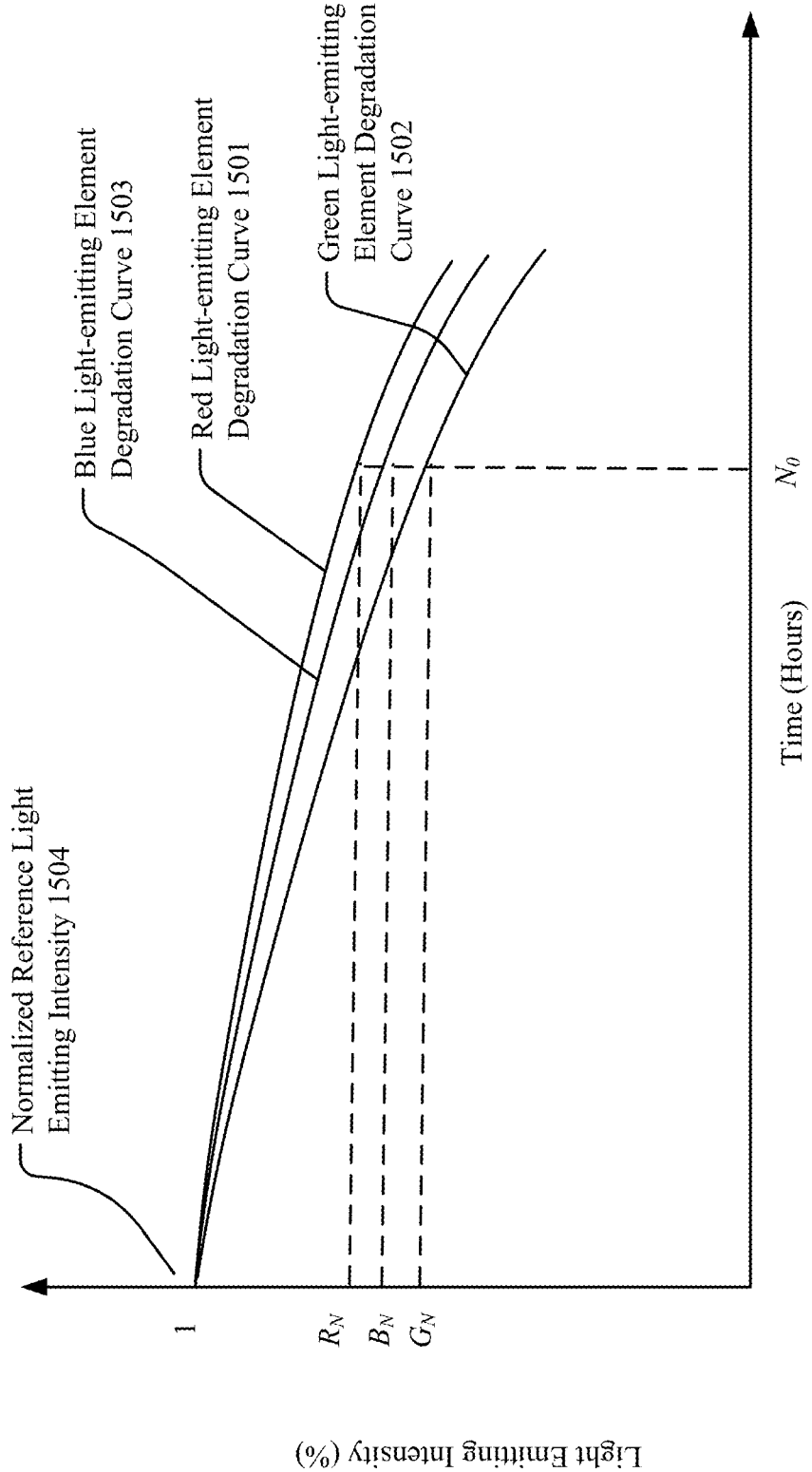
FIG. 15 illustrates example degradation curves of RGB light-emitting elements over time.

FIG. 15 illustrates example degradation curves (e.g., 1501, 1502, 1503) of RGB light-emitting elements over time. In particular embodiments, the system may determine degradation levels of the light-emitting elements based on one or more long-term factors such as accumulative usage hours or ages of the display. The light-emitting elements of the display may degrade over time and different color channels may have different degradation speeds. As an example and not by way of limitation, the red, green, and blue light-emitting elements may degrade over time following the degradation curves of 1501, 1502, and 1503, respectively. At usage hour of $N_0$, the light emitting efficiencies may degrade to $R_N$, $B_N$, $G_N$ with respect to the normalized reference light emitting intensity 1504. It is notable that the degradation curves described herein are for example purpose only and the degradation curves of the light-emitting elements are not limited thereto. The degradation curve of the light-emitting elements may be any suitable curves with any suitable trend. In particular embodiments, the system may determine the degradation curves based on theoretical models, measurement data, empirical data, etc. In particular embodiments, the system may use the degradation curves to determine the degradation levels of the light-emitting elements.

As an example and not by way of limitation, the system may determine an overall degradation level for all light-emitting elements of each color channel the display based on an age of the display system (e.g., days from manufacture date, days from first time usage, etc.). The system may determine a reduced light emitting intensity for each color channel of the display based on an associated degradation curve (e.g., 1501, 1502, 1503). Then, the system may determine, for each color channel, an overall scaling factor based on the reduced light emitting intensity of that color channel and apply the overall scaling factors to corresponding color channel of image pixels to compensate for the display degradation. As a result, the displayed image may have better display quality with display degradation being compensated.

As another example and not by way of limitation, the system may determine a degradation level for light-emitting elements of each color channel based on an accumulative usage duration (e.g., accumulative usage hours). The system may determine a reduced light emitting intensity for each color channel of the display based on the accumulative usage duration and an associated degradation curve of that color channel (e.g., degradation curve 1501 for red light-emitting elements, degradation curve 1502 for green light-emitting elements, degradation curve 1503 for blue light-emitting elements). Then, the system may determine, for each color channel, a scaling factor based on the reduced light emitting intensity of that color channel and apply the scaling factors to corresponding color channel of image pixels to compensate for the display degradation. As a result, the displayed image may have better display quality with display degradation being compensated.

Figure 16:
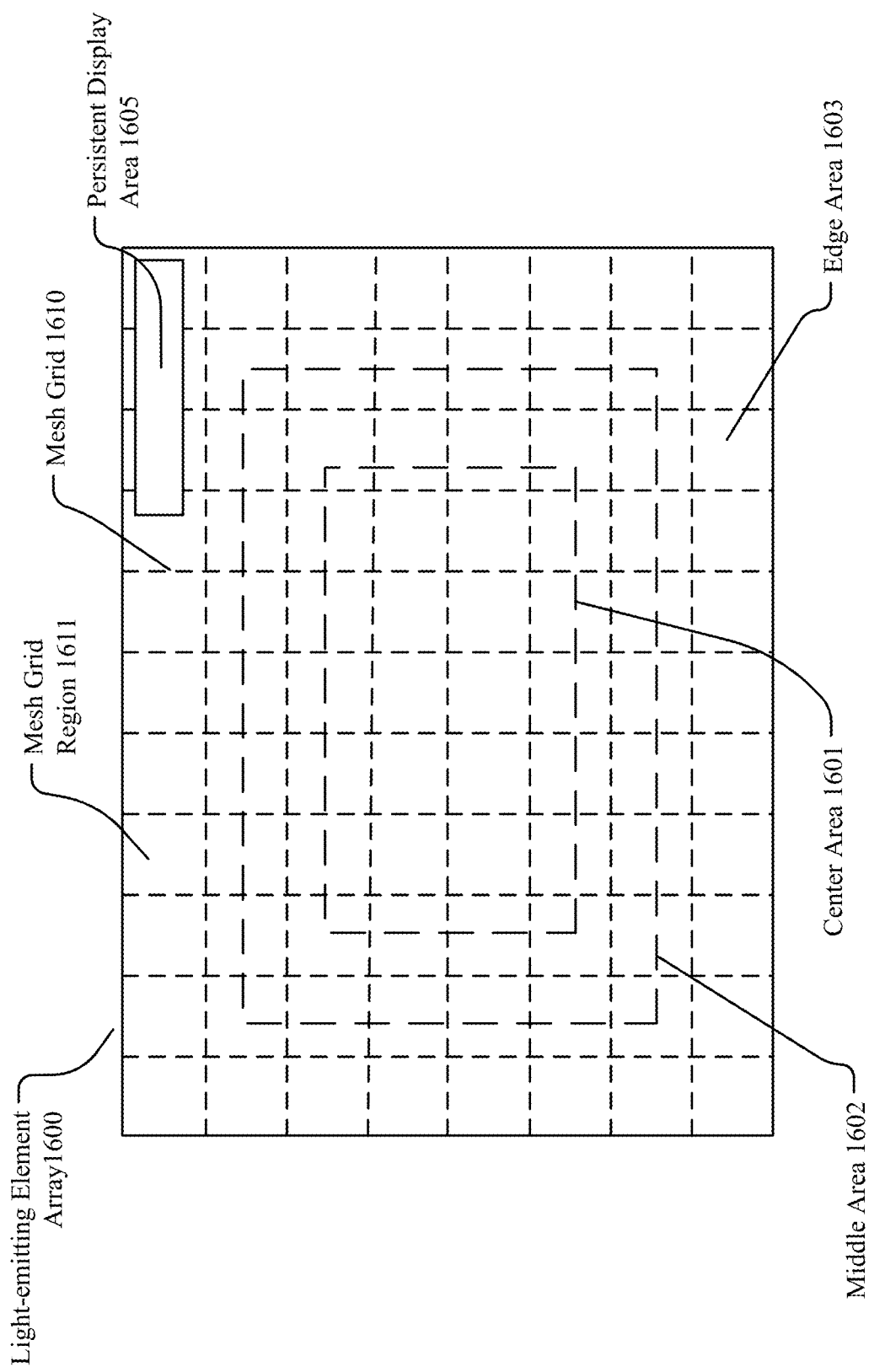
FIG. 16 illustrates an example light-emitting element array having different degradation levels in different array regions.

FIG. 16 illustrates an example light-emitting element array 1600 having different degradation levels in different array regions. In particular embodiments, the light-emitting elements at different locations of the display screen may have different degradation levels because of usage patterns and usage frequencies. As an example and not by way of limitation, because of usage frequency differences, the light-emitting elements in the center area 1601 may have higher degradation levels than the light-emitting elements in the middle area 1602. The light-emitting elements in the middle area 1602 may have higher degradation levels than the edge area 1603. The degradation levels may gradually change from one area to another area.

In particular embodiments, the system may use a mesh grid to determine the degradation levels and corresponding scaling factors to compensate for display degradation. As an example and not by way of limitation, the system may use the mesh grid 1610 to determine the degradation levels of light-emitting elements within each mesh grid region (e.g., 1611) based on: (1) the accumulative usage hours or age of display system, (2) degradation curves of RGB color channels, and (3) the location of that mesh grid within the light-emitting element array 1600. In particular embodiments, each mesh grid may include 32 pixels by 32 pixels. The system may determine an average degradation level for the light-emitting elements of each color channel in each mesh grid region based on an associated degradation curve of that color channel. The system determines a corresponding scaling factor based on the average degradation level for that particular color channel of that mesh grid region. The light-emitting elements of the same color channel in the same mesh grid region may share a same scaling factor. The system may determine the scaling factor for each color channel of each mesh grid region, apply these scaling factors to corresponding image regions to compensate for the display degradation, and output the compensated image to the light-emitting element arrays. As a result, the displayed image may have better display quality with the display degradation being compensated.

In particular embodiments, the system may determine a scaling factor for each pixel of each color channel of the image to be displayed. In particular embodiments, the display may have a persistent display area for displaying particular contents including, for example, but not limited to, time indicators, logos, status bars, icons, subtitles, etc. The light-emitting elements in the persistent display area may have particular degradation patterns based on the displayed contents. For example, for the light-emitting elements fall in background areas of the time indicator, these light-emitting elements may be only turned on to display the background color (e.g., being turned off for back background color). For the light-emitting elements fall in foreground areas of the time indicators, these light-emitting elements may be turned to display the foreground areas of the time indicator. As a result, different light-emitting elements may have different degradation levels based on the usage patterns. The system may determine the degradation level of each pixel of each color channel and perform a pixel level compensation for the pixels in the persistent display area.

As an example and not by way of limitation, the persistent display area 1605, as shown in FIG. 16, may be an area for displaying a time indicator with a particular display pattern. The degradation pattern in this persistent area 1605 may depend on the display pattern of the time indicator. For example, the time indicator may display time numbers with red color and a black background. For the light-emitting elements fall in background areas of the time indicator, these light-emitting elements may be turned off for back background color. For the light-emitting elements fall in foreground areas of the time indicators, the red light-emitting elements may be turned on to display the time numbers with the light-emitting elements of the other two channels being turned off. The system may determine a degradation level of each pixel of each color based at least on this display pattern and perform a pixel level compensation in a corresponding image area before display the image. As a result, the displayed image may have better display quality with display degradation being compensated at each pixel level.

As described in earlier sections of this disclosure, in particular embodiments, the system may use scaling factors that are greater than 1 to scale up image pixel values to compensate the display degradation caused by temperature or aging. It is notable that a pixel having a degradation level of X % may have a reduced maximum light intensity of X % with respect to the original maximum light intensity. Using the scaling-up methods described above, the system may determine a scaling factor of 100/X where X is smaller than 100 and 100/X is greater than 1. It is notable that, for a scaling factor of 100/X greater than 1, a pixel value corresponding to X % of the maximum pixel value may correspond to the reduced maximum light intensity. As a result, any image pixel values that are greater than X % of the maximum pixel value may be flatted by the reduced maximum light intensity once scaled by the scaling factor of 100/X The image details corresponding to these flatted pixel values may be not visible in the displayed image. As a result, to keep all the image information for the scaled images using the scaling factor of 100/X (greater than 1), the scaling-up methods may need a precondition which requires the image pixel to be smaller than or equal to X % of the maximum pixel value. For example, for a pixel having a degradation level of 80%, the corresponding scaling factor of 1.25 may be applied to the corresponding image pixel having a value that is smaller than or equal to 80% of the maximum pixel value without losing any image information. Otherwise, if that image pixel value is greater than 80% of the maximum pixel value, the image pixel value after scaled by 1.25 may be flatted to the reduced maximum light intensity of the pixel with the corresponding image portions being flatted by the reduced maximum light intensity.

In particular embodiments, instead of scaling up the image pixel values, the system may use scaling factor smaller than 1 to scale down the image pixel values to compensate the display degradation caused by temperature or aging. When one or more light-emitting elements of the display have degraded, the system may identify the light emitting-element that has the highest degradation level (e.g., lowest maximum light density or lowest light-emitting efficiency) with respect to other light-emitting elements. The system may use a unity scaling factor (i.e., scaling factor of 1) for the image pixel corresponding to the light-emitting element having the highest degradation level and use scaling factors smaller than 1 for scaling down other image pixels. The image pixels after being scaled by respective scaling factors may be output to the respective light-emitting elements of the display. As a result, the displayed image may be dimmer than the scenario when the image is not scaled but may keep the same relative contrast for the different portions of the image. The displayed image whose image pixel values have been scaled down may include the all the details of the original image (because no pixel values have been flatted by the reduced maximum light intensity).

As an example and not by way of limitation, the display may have one or more areas of the display including light-emitting elements that have degraded. The system may identify the light-emitting element that has the highest level of degradation (e.g., having the lowest reduced maximum light intensity). Assuming the light-emitting element having the highest level of degradation has a reduced maximum light intensity which is X % of the original maximum light intensity. The system may use a unity scaling factor (i.e., scaling factor of 1) for the image pixel to be displayed by the light-emitting element having the highest level of degradation. For all other pixel values of the image, the system may use a scaling factor of X/100, which is smaller than 1, to scale these image pixel values down. Once the image pixel values are scaled by these scaling factors, the image pixels may be output to the respective light-emitting elements of the display. As a result, the displayed image whose pixel values have been scaled down (except the image pixel corresponding to the most degraded light-emitting element) may be dimmer than the original image but have the same relative contrast for different portion of the image.

In particular embodiments, the system may determine a scaling factor for each image pixel (e.g., a unity scaling factor for the image pixel corresponding to the most degraded light-emitting element, a scaling factor of X % for each of other image pixels). In particular embodiments, the system may use a mesh grid mapped to the display screen to determine scaling factors. Each mesh grid may cover a pre-determined number of image pixels (e.g., 4 pixels×4 pixels, 16 pixels×16 pixels, 32 pixels×32 pixels, etc.) The image pixels within the same mesh grid may share the same scaling factor. By using the mesh grid for determining and applying the scaling factors, the system may reduce the computation for scaling the image pixels. As an example and not by way of limitation, the system may determine a unity scaling factor for a mesh grid covering an area of the light-emitting elements that have the highest degradation level among all the light-emitting elements of the display. The system may determine that the light-emitting element(s) having the highest degradation level have a reduced maximum light intensity X % with respective to the original maximum light intensity. The system may determine a scaling factor of X/100 for each of the other mesh grids. The system may apply the same scaling factor value to the image pixels within the same mesh grid and therefore reduce the computer resources needed for computing and storing the scaling factors. Once the image pixel values are scaled by respective scaling factors, the image pixel values may be output to the respective light-emitting elements of the display. The displayed image may have a visual effect that is dimmer than the original image but have the display degradation compensated.

In particular embodiments, the system may determine the system may determine degradation levels of light-emitting elements of the display based on a combination of one or more influence factors related to degradation of the light-emitting elements of the display. In particular embodiments, the one or more influence factors related to degradation of the light-emitting element may include, for example, but are not limited to, color channels, a usage time duration, an accumulative usage time (e.g., hours of usage), display ages (e.g., days from the manufacture date), a current time and date, a usage frequency, a temperature distribution cross the light-emitting element arrays, an overall temperature of the display, a temperature for each light-emitting element, electrical current levels, voltage levels, correlations between electrical current and voltage levels, display contents, display patterns, persistent display areas, locations in a viewer space, relative locations within associated light-emitting element arrays, one or more sensor inputs, one or more user inputs, one or more feedback on display contents, a pre-determined mesh grid, etc. In particular embodiments, the system may determine an overall degradation level of the display based on a combination of one or more of the influence factors and determine an overall scaling factor for all light-emitting elements of each particular color channel. In particular embodiments, the system may determine a degradation level for each subgroup of light-emitting elements (e.g., each subgroup corresponding to a mesh grid region) and determine a scaling factor for each subgroup of light-emitting elements. In particular embodiments, the system may determine a degradation level for each light-emitting element of each color channel of the display based on a combination of one or more influence factors and determine a scaling factor for each light-emitting element of each color channel of the display.

In particular embodiments, the system may determine degradation levels of the light-emitting elements of the display based on a combination of one more influence factors using one or more heuristic rules. As an example and not by way of limitation, the system may determine a degradation pattern of the light-emitting element arrays based on a frequent activity of the user when using the display system (e.g., watching movies, browsing internet, playing games, etc.) As another example, the system may determine a degradation pattern of the light-emitting element arrays based on a determination that the display belongs to a batch of display products (e.g., associated with a particular manufacture date) of a certain display manufacturer. As another example, the system may determine a degradation pattern of the light-emitting element arrays based on a historical event (e.g., a partial damage caused by high temperature or physical forces). As another example, the system may determine a degradation pattern of the light-emitting element arrays based on one or more user inputs (e.g., user inputs indicating an abnormal display area) or one or more user responses to displayed contents (e.g., user repeatedly reduce or increase the brightness of display).

In particular embodiments, the system may store the scaling factors for compensating the display degradation in one or more compensation matrices. In particular embodiments, the system may include one or more correction masks or matrices for correcting the non-uniformity of the light-emitting elements of the display (e.g., correction matrices for dead pixel hiding, correction matrices for optical distortions, etc.). In particular embodiments, the system may incorporate the scaling factors for compensating the display degradation into the correction matrices for hiding dead pixels or/and correcting non-uniformity. At run time, the system may apply the combined correction matrices or compensation matrices to the images to be displayed to correct dead pixels, non-uniformity, and compensate for display degradation in the same process. In particular embodiments, the system may periodically (e.g., each N hours of usage of the display) re-generate the correction matrices or compensation matrices with re-calculated scaling factors based on updated influence factors (e.g., hours of usage, user inputs, temperature distributions). In particular embodiments, the system may re-generate the correction matrices or compensation matrices with re-calculated scaling factors based on updated influence factors (e.g., hours of usage, user inputs, temperature distributions) in response to one or more triggering conditions (e.g., a temperature change being above a threshold temperature, a user input indicating a display degradation, a software/firmware update event). In particular embodiments, the systems, methods, and processes as described in this disclosure may be implemented in one or more sub-modules of the hardware, software, or firmware of the system. For example, the degradation correction methods and processes may be implemented in an image process unit 275 and one or more sub-modules as shown in FIG. 2B-2D.

It is notable that, in particular embodiments, when the system uses the current/voltage offset levels to compensate for the display degradation, the changes in current/voltage offset levels may induce a wavelength shift in the display. In particular embodiments, the changes in current/voltage offset levels may cause the light-emitting elements of the whole display to shift from a first wavelength range to a second wavelength range. For example, the display may include a single display panel and the same current/voltage offset level may be applied to the all light-emitting elements of the signal display panel. The current/voltage offset level change may cause a global chance to the wavelength of all light-emitting elements of the display. This global wavelength shift of the whole display panel may cause a change to the color space of the display as represented by the color gamut. In particular embodiments, this color gamut change may be compensated by using a 3D look-up table (LUT) which maps the original color gamut to the color gamut with the global wavelength shift. The image pixel values may be compensated for the global wavelength shift by using the 3D LUT before being output to the light-emitting elements of the display.

In particular embodiments, the changes in current/voltage offset levels may cause a subgroup of (e.g., within a localized area) light-emitting elements of the display to have shifted wavelengths (rather than a global change in wavelength). For example, the display may be composed of light-emitting elements of a number of display panels (e.g., 2 panels×2 panels, 4 panels×4 panels). Each display panel may have independent current/voltage offset levels for that particular display panel. A change in the current/voltage offset levels may cause wavelength shift in an associated display panel without affecting other panels. As another example, the system may use the current control to adjust the degraded light-emitting elements for compensating the display degradation. The compensation using the current control may result in wavelength shifts in particular light-emitting elements without affecting other light-emitting elements. Since it is not a global wavelength shift of the display, the system may not use the 3D LUT method for wavelength compensation (which is for mapping one color gamut to another color gamut globally). Instead, the system may use build-in compensation logic in the pixel processing pipeline to compensate the non-global wavelength shift. For example, the system may add a wavelength compensation step in the pixel processing pipeline. The system may determine and record the wavelength shift of each light-emitting element or each sub-group of light-emitting elements based on the respective current control parameters (e.g., current levels). The system may compensate the non-global wavelength shift of selected light-emitting elements by adjusting the relative values of the RGB color components of the corresponding image pixel values. This wavelength compensation step may be performed before the image pixel values are output to the light-emitting elements for display.

Figure 17:
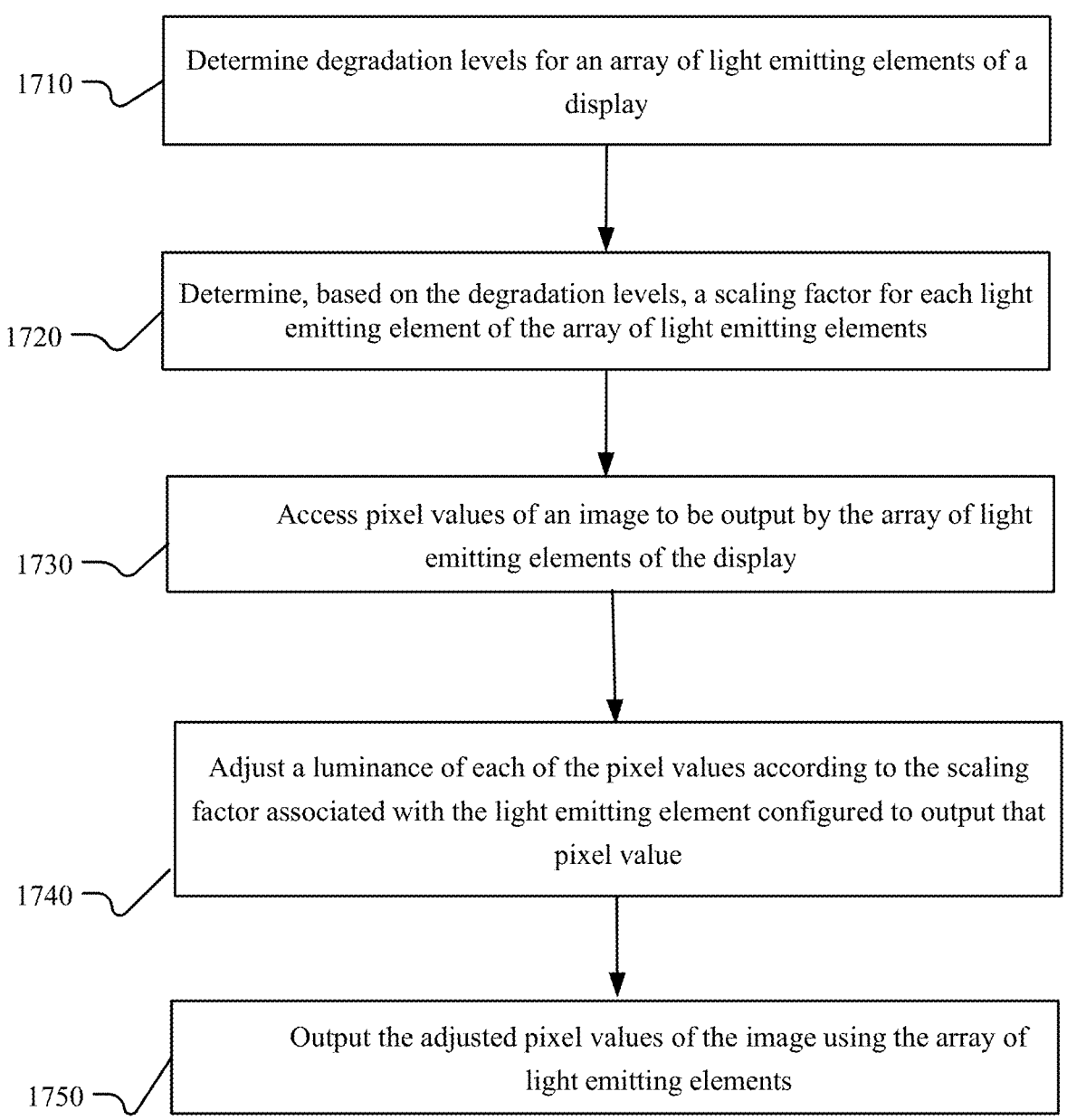
FIG. 17 illustrates an example method for compensating display degradation.

FIG. 17 illustrates an example method 1700 for compensating display degradation. The method may begin at step 1710, wherein a computing system may determine degradation levels for an array of light emitting elements of a display. At step 1720, the system may determine, based on the degradation levels, a scaling factor for each light emitting element of the array of light emitting elements. At step 1730, the system may access pixel values of an image to be output by the array of light emitting elements of the display. At step 1740, the system may adjust a luminance of each of the pixel values according to the scaling factor associated with the light emitting element configured to output that pixel value. At step 1750, the system may output the adjusted pixel values of the image using the array of light emitting elements. In particular embodiments, the degradation levels may be determined based on a combination of one or more short-term factors and one or more long-term factors related to degradation of the display. The one or more short-term factors may temperature information associated with the array of light emitting elements. In particular embodiments, the temperature information may include a temperature distribution across the array of light emitting elements, and wherein the temperature distribution is determined using one or more temperature sensors associated with the array of light emitting elements.

In particular embodiments, the degradation levels may be determined based on a pre-determined function mapping temperature values to degradation levels, and wherein each pre-determined function corresponds to a color channel of the display. In particular embodiments, the one or more long-term factors may include one or more of, for example, but not limited to, a usage time duration, an accumulative usage time, a current time, a manufacture date, a usage frequency, a usage history data, a location of a light emitting element in a field of view, or a relative position of a light emitting element in an associated light emitting element array. In particular embodiments, each degradation level may be determined based on a reduction level of a light emitting intensity of an associated light emitting element. In particular embodiments, the scaling factors may be determined based on a mesh grid, wherein each mesh grid region of the mesh grid comprises a subgroup of light-emitting elements, and wherein each subgroup of light-emitting elements of a same color channel corresponding a same mesh grid region share a same scaling factor. In particular embodiments, the degradation levels of the array of light emitting elements may be determined based on a display pattern of display contents. In particular embodiments, the scaling factors may be incorporated into a compensation matrix for compensating one or more of, for example, but not limited to, dead pixels of the display, non-uniformity of the array of light emitting elements, waveguide distortion of the display, or lens distortion of the display. In particular embodiments, the adjusted pixel values of the image may be output using the array of light emitting elements based on a 3D look-up table mapping a first color gamut to a second color gamut to compensate a global wavelength shift. In particular embodiments, the relative values of three color components of one or more pixel values may be adjusted to compensate a local wavelength shift. The adjustment of the relative values of the three color components of the one or more pixel values may be performed by a wavelength compensation step of a pixel processing pipeline before outputting the one or more pixel values using the light-emitting elements.

Particular embodiments may repeat one or more steps of the method of FIG. 17, where appropriate. Although this disclosure describes and illustrates particular steps of the method of FIG. 17 as occurring in a particular order, this disclosure contemplates any suitable steps of the method of FIG. 17 occurring in any suitable order. Moreover, although this disclosure describes and illustrates an example method for compensating display degradation including the particular steps of the method of FIG. 17, this disclosure contemplates any suitable method for compensating display degradation including any suitable steps, which may include all, some, or none of the steps of the method of FIG. 17, where appropriate. Furthermore, although this disclosure describes and illustrates particular components, devices, or systems carrying out particular steps of the method of FIG. 17, this disclosure contemplates any suitable combination of any suitable components, devices, or systems carrying out any suitable steps of the method of FIG. 17.

Figure 18:
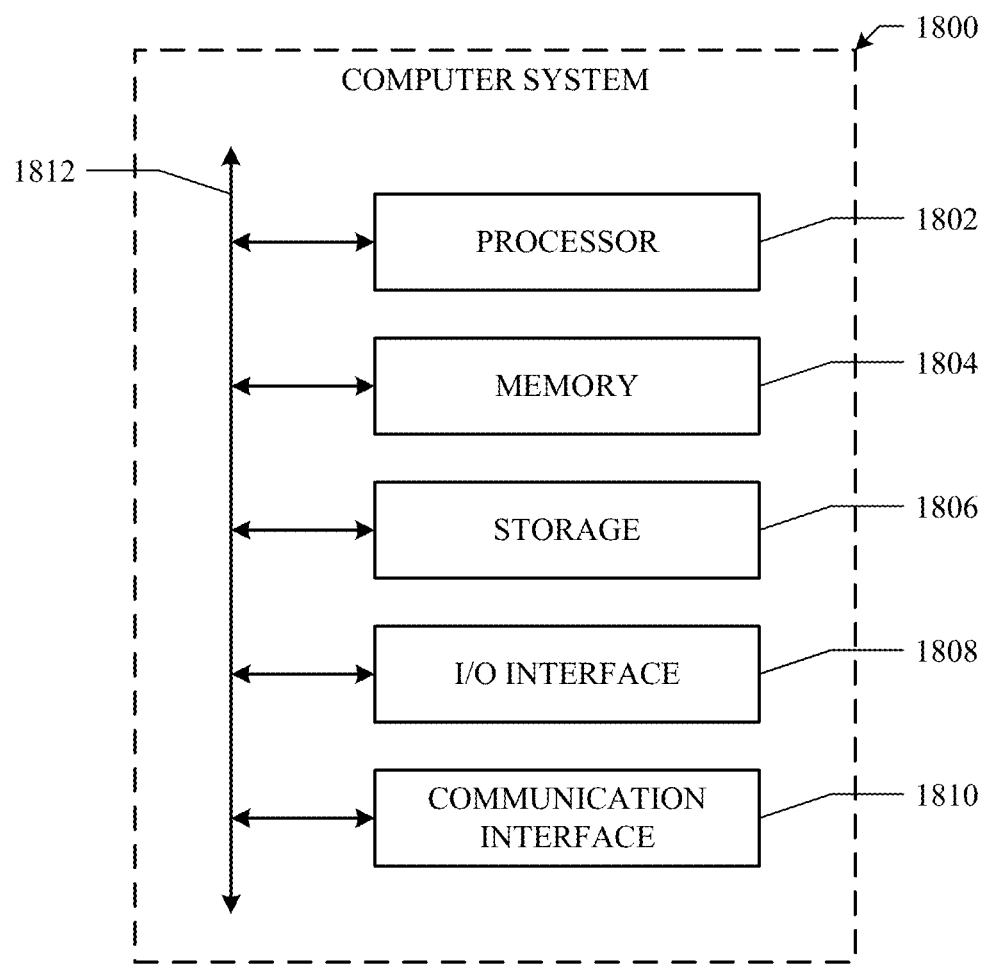
FIG. 18 illustrates an example computer system.

FIG. 18 illustrates an example computer system 1800. In particular embodiments, one or more computer systems 1800 perform one or more steps of one or more methods described or illustrated herein. In particular embodiments, one or more computer systems 1800 provide functionality described or illustrated herein. In particular embodiments, software running on one or more computer systems 1800 performs one or more steps of one or more methods described or illustrated herein or provides functionality described or illustrated herein. Particular embodiments include one or more portions of one or more computer systems 1800. Herein, reference to a computer system may encompass a computing device, and vice versa, where appropriate. Moreover, reference to a computer system may encompass one or more computer systems, where appropriate.

This disclosure contemplates any suitable number of computer systems 1800. This disclosure contemplates computer system 1800 taking any suitable physical form. As example and not by way of limitation, computer system 1800 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 1800 may include one or more computer systems 1800; be unitary or distributed; span multiple locations; span multiple machines; span multiple data centers; or reside in a cloud, which may include one or more cloud components in one or more networks. Where appropriate, one or more computer systems 1800 may perform without substantial spatial or temporal limitation one or more steps of one or more methods described or illustrated herein. As an example and not by way of limitation, one or more computer systems 1800 may perform in real time or in batch mode one or more steps of one or more methods described or illustrated herein. One or more computer systems 1800 may perform at different times or at different locations one or more steps of one or more methods described or illustrated herein, where appropriate.

In particular embodiments, computer system 1800 includes a processor 1802, memory 1804, storage 1806, an input/output (I/O) interface 1808, a communication interface 1810, and a bus 1812. Although this disclosure describes and illustrates a particular computer system having a particular number of particular components in a particular arrangement, this disclosure contemplates any suitable computer system having any suitable number of any suitable components in any suitable arrangement.

In particular embodiments, processor 1802 includes hardware for executing instructions, such as those making up a computer program. As an example and not by way of limitation, to execute instructions, processor 1802 may retrieve (or fetch) the instructions from an internal register, an internal cache, memory 1804, or storage 1806; decode and execute them; and then write one or more results to an internal register, an internal cache, memory 1804, or storage 1806. In particular embodiments, processor 1802 may include one or more internal caches for data, instructions, or addresses. This disclosure contemplates processor 1802 including any suitable number of any suitable internal caches, where appropriate. As an example and not by way of limitation, processor 1802 may include one or more instruction caches, one or more data caches, and one or more translation lookaside buffers (TLBs). Instructions in the instruction caches may be copies of instructions in memory 1804 or storage 1806, and the instruction caches may speed up retrieval of those instructions by processor 1802. Data in the data caches may be copies of data in memory 1804 or storage 1806 for instructions executing at processor 1802 to operate on; the results of previous instructions executed at processor 1802 for access by subsequent instructions executing at processor 1802 or for writing to memory 1804 or storage 1806; or other suitable data. The data caches may speed up read or write operations by processor 1802. The TLBs may speed up virtual-address translation for processor 1802. In particular embodiments, processor 1802 may include one or more internal registers for data, instructions, or addresses. This disclosure contemplates processor 1802 including any suitable number of any suitable internal registers, where appropriate. Where appropriate, processor 1802 may include one or more arithmetic logic units (ALUs); be a multi-core processor; or include one or more processors 1802. Although this disclosure describes and illustrates a particular processor, this disclosure contemplates any suitable processor.

In particular embodiments, memory 1804 includes main memory for storing instructions for processor 1802 to execute or data for processor 1802 to operate on. As an example and not by way of limitation, computer system 1800 may load instructions from storage 1806 or another source (such as, for example, another computer system 1800) to memory 1804. Processor 1802 may then load the instructions from memory 1804 to an internal register or internal cache. To execute the instructions, processor 1802 may retrieve the instructions from the internal register or internal cache and decode them. During or after execution of the instructions, processor 1802 may write one or more results (which may be intermediate or final results) to the internal register or internal cache. Processor 1802 may then write one or more of those results to memory 1804. In particular embodiments, processor 1802 executes only instructions in one or more internal registers or internal caches or in memory 1804 (as opposed to storage 1806 or elsewhere) and operates only on data in one or more internal registers or internal caches or in memory 1804 (as opposed to storage 1806 or elsewhere). One or more memory buses (which may each include an address bus and a data bus) may couple processor 1802 to memory 1804. Bus 1812 may include one or more memory buses, as described below. In particular embodiments, one or more memory management units (MMUs) reside between processor 1802 and memory 1804 and facilitate accesses to memory 1804 requested by processor 1802. In particular embodiments, memory 1804 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 1804 may include one or more memories 1804, where appropriate. Although this disclosure describes and illustrates particular memory, this disclosure contemplates any suitable memory.

In particular embodiments, storage 1806 includes mass storage for data or instructions. As an example and not by way of limitation, storage 1806 may include a hard disk drive (HDD), a floppy disk drive, flash memory, an optical disc, a magneto-optical disc, magnetic tape, or a Universal Serial Bus (USB) drive or a combination of two or more of these. Storage 1806 may include removable or non-removable (or fixed) media, where appropriate. Storage 1806 may be internal or external to computer system 1800, where appropriate. In particular embodiments, storage 1806 is non-volatile, solid-state memory. In particular embodiments, storage 1806 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 1806 taking any suitable physical form. Storage 1806 may include one or more storage control units facilitating communication between processor 1802 and storage 1806, where appropriate. Where appropriate, storage 1806 may include one or more storages 1806. Although this disclosure describes and illustrates particular storage, this disclosure contemplates any suitable storage.

In particular embodiments, I/O interface 1808 includes hardware, software, or both, providing one or more interfaces for communication between computer system 1800 and one or more I/O devices. Computer system 1800 may include one or more of these I/O devices, where appropriate. One or more of these I/O devices may enable communication between a person and computer system 1800. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 1808 for them. Where appropriate, I/O interface 1808 may include one or more device or software drivers enabling processor 1802 to drive one or more of these I/O devices. I/O interface 1808 may include one or more I/O interfaces 1808, where appropriate. Although this disclosure describes and illustrates a particular I/O interface, this disclosure contemplates any suitable I/O interface.

In particular embodiments, communication interface 1810 includes hardware, software, or both providing one or more interfaces for communication (such as, for example, packet-based communication) between computer system 1800 and one or more other computer systems 1800 or one or more networks. As an example and not by way of limitation, communication interface 1810 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 1810 for it. As an example and not by way of limitation, computer system 1800 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 1800 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 1800 may include any suitable communication interface 1810 for any of these networks, where appropriate. Communication interface 1810 may include one or more communication interfaces 1810, where appropriate. Although this disclosure describes and illustrates a particular communication interface, this disclosure contemplates any suitable communication interface.

In particular embodiments, bus 1812 includes hardware, software, or both coupling components of computer system 1800 to each other. As an example and not by way of limitation, bus 1812 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 1812 may include one or more buses 1812, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method comprising, by a computing system:
accessing an image to be displayed on a display;
determining one or more degradation effects associated with a subgroup of light-emitting elements of the display, wherein the subgroup of lighting-emitting elements are within a localized area of the display;
performing one or more compensation operations on the display, wherein the one or more compensation operations compensate for the one or more degradation effects of the display, and wherein the one or more compensation operations cause an offset to an electric signal level associated with the subgroup of light-emitting elements of the display;
determining a wavelength shift of the subgroup of light-emitting elements of the display, wherein the wavelength shift is caused by the offset of the electric signal level;
adjusting relative values of RGB color components of corresponding pixel values of the image based on the wavelength shift of the subgroup of light-emitting elements of the display using a wavelength compensation step of a pixel processing pipeline; and
outputting the pixel values with the adjusted relative values of the RGB color components to the subgroup of light-emitting elements within the localized area of the display, wherein the subgroup of the light-emitting elements emit lights with the wavelength shift, and wherein the pixel values with the adjusted relative values of the RGB color components compensate a consequential effect of the wavelength shift.

2. The method of claim 1, wherein the one or more light-emitting elements are mounted on a display panel, and wherein the change in the electrical signal level is associated with the display panel.

3. The method of claim 2, wherein the change in the electric signal level is associated with a current offset level or a voltage offset level for all light-emitting elements mounted on the display panel.

4. The method of claim 2, wherein the wavelength shift corresponds to a change of a color gamut of the display.

5. The method of claim 4, wherein the values of the RGB color components of the pixel values of the image are adjusted based on a 3D look-up table, and wherein the 3D look-up table maps the color gamut of the display to an adjusted color gamut.

6. The method of claim 5, wherein the adjusted color gamut has a color shift with respect to the color gamut of the display, and wherein the color shift corresponds to the wavelength shift of the one or more light-emitting elements of the display.

7. The method of claim 1, wherein the display comprises a plurality of display panels each comprising a subset of light-emitting elements.

8. The method of claim 7, wherein the subset of light-emitting elements on each display panel share a current offset signal or a voltage offset signal.

9. The method of claim 8, wherein the current offset signal or the voltage offset signal of a display panel is adjusted to compensate degradation effects of the subset of light-emitting elements mounted on that display panel.

10. The method of claim 7, wherein the values of RGB color components of the pixel values of the image are adjusted using a built-in compensation process in a pixel processing pipeline, and wherein the adjusted values of the RGB components of the pixels values of the images have different relative values for the RGB components.

11. One or more computer-readable non-transitory storage media embodying software that is operable when executed to:
access an image to be displayed on a display;
determine one or more degradation effects associated with a subgroup of light-emitting elements of the display, wherein the subgroup of lighting-emitting elements are within a localized area of the display;
perform one or more compensation operations on the display, wherein the one or more compensation operations compensate for the one or more degradation effects of the display, and wherein the one or more compensation operations cause an offset to an electric signal level associated with the subgroup of light-emitting elements of the display;
determine a wavelength shift of the subgroup of light-emitting elements of the display, wherein the wavelength shift is caused by the offset of the electric signal level;
adjust relative values of RGB color components of corresponding pixel values of the image based on the wavelength shift of the subgroup of light-emitting elements of the display using a wavelength compensation step of a pixel processing pipeline; and
output the pixel values with the adjusted relative values of the RGB color components to the subgroup of light-emitting elements within the localized area of the display, wherein the subgroup of the light-emitting elements emit lights with the wavelength shift, and wherein the pixel values with the adjusted relative values of the RGB color components compensate a consequential effect of the wavelength shift.

12. The media of claim 11, wherein the one or more light-emitting elements are mounted on a display panel, and wherein the change in the electrical signal level is associated with the display panel.

13. The media of claim 12, wherein the change in the electric signal level is associated with a current offset level or a voltage offset level for all light-emitting elements mounted on the display panel.

14. The media of claim 12, wherein the wavelength shift corresponds to a change of a color gamut of the display.

15. The media of claim 14, wherein the values of the RGB color components of the pixel values of the image are adjusted based on a 3D look-up table, and wherein the 3D look-up table maps the color gamut of the display to an adjusted color gamut.

16. A system comprising:
one or more non-transitory computer-readable storage media embodying instructions; and
one or more processors coupled to the storage media and operable to execute the instructions to:
access an image to be displayed on a display;
determine one or more degradation effects associated with a subgroup of light-emitting elements of the display, wherein the subgroup of lighting-emitting elements are within a localized area of the display;
perform one or more compensation operations on the display, wherein the one or more compensation operations compensate for the one or more degradation effects of the display, and wherein the one or more compensation operations cause an offset to an electric signal level associated with the subgroup of light-emitting elements of the display;
determine a wavelength shift of the subgroup of light-emitting elements of the display, wherein the wavelength shift is caused by the offset of the electric signal level;
adjust relative values of RGB color components of corresponding pixel values of the image based on the wavelength shift of the subgroup of light-emitting elements of the display using a wavelength compensation step of a pixel processing pipeline; and
output the pixel values with the adjusted relative values of the RGB color components to the subgroup of light-emitting elements within the localized area of the display, wherein the subgroup of the light-emitting elements emit lights with the wavelength shift, and wherein the pixel values with the adjusted relative values of the RGB color components compensate a consequential effect of the wavelength shift.

17. The system of claim 16, wherein the one or more light-emitting elements are mounted on a display panel, and wherein the change in the electrical signal level is associated with the display panel.

18. The system of claim 17, wherein the change in the electric signal level is associated with a current offset level or a voltage offset level for all light-emitting elements mounted on the display panel.

19. The system of claim 17, wherein the wavelength shift corresponds to a change of a color gamut of the display.

20. The system of claim 19, wherein the values of the RGB color components of the pixel values of the image are adjusted based on a 3D look-up table, and wherein the 3D look-up table maps the color gamut of the display to an adjusted color gamut.

* * * * *